United States Patent
Napau et al.

(10) Patent No.: US 9,221,113 B2
(45) Date of Patent: Dec. 29, 2015

(54) METHODS FOR GENERATING GEAR TEETH OF A DOUBLE INVOLUTE PINION-FACE GEAR DRIVE SYSTEM

(71) Applicant: GM Global Technology Operations LLC, Detroit, MI (US)

(72) Inventors: Ioan Napau, Rochester Hills, MI (US); Ileana Dacia Napau, Alba (RO); Mircea Napau, Sterling Heights, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 292 days.

(21) Appl. No.: 13/839,085

(22) Filed: Mar. 15, 2013

(65) Prior Publication Data

US 2014/0271010 A1    Sep. 18, 2014

(51) Int. Cl.
*B23F 5/22* (2006.01)
*B23F 9/10* (2006.01)
*B23F 15/00* (2006.01)

(52) U.S. Cl.
CPC . *B23F 5/22* (2013.01); *B23F 9/105* (2013.01); *B23F 15/00* (2013.01); *Y10T 409/101749* (2015.01)

(58) Field of Classification Search
CPC .............. B23F 9/00; B23F 9/08; B23F 9/082; B23F 9/10; B23F 9/105; B23F 9/14; B23F 5/22; B23F 15/00; Y10T 409/101749; Y10T 409/102703; Y10T 409/102862

USPC .................................................. 409/12, 18, 19
See application file for complete search history.

(56) References Cited

U.S. PATENT DOCUMENTS

| | | | |
|---|---|---|---|
| RE16,137 E | 8/1925 | Eberly | |
| 2,311,006 A | 7/1941 | Trbojevich | |
| 2,896,467 A | 7/1959 | Saari | |
| 4,211,511 A * | 7/1980 | Kotthaus | 409/26 |
| 4,238,970 A | 12/1980 | Carter | |
| 4,367,058 A | 1/1983 | Carter | |
| 5,178,028 A | 1/1993 | Bossler, Jr. | |
| 2013/0042711 A1 | 2/2013 | Napau et al. | |

* cited by examiner

*Primary Examiner* — Sunil K Singh
*Assistant Examiner* — Alan Snyder

(57) ABSTRACT

Methods for generating gear teeth of a double involute-face gear drive system, curved in their longitudinal direction in form of either shortened, normal or an extended involute curve, include methods for generating the teeth of both components. Methods for generating the teeth of a double involute pinion, shaped in form of a normal involute in their profile direction and curved in their longitudinal direction in form of an either shortened, a normal or an extended involute curve, include the use of one of the following tools (1) a face hob and (2) a conical hob. Methods for generating the teeth of a face gear curved in their longitudinal direction in form of an either shortened, a normal or an extended involute curve include the use of one of the following tools (1) a rack cutter, (2) a shaper cutter and (3) a conical hob.

9 Claims, 20 Drawing Sheets

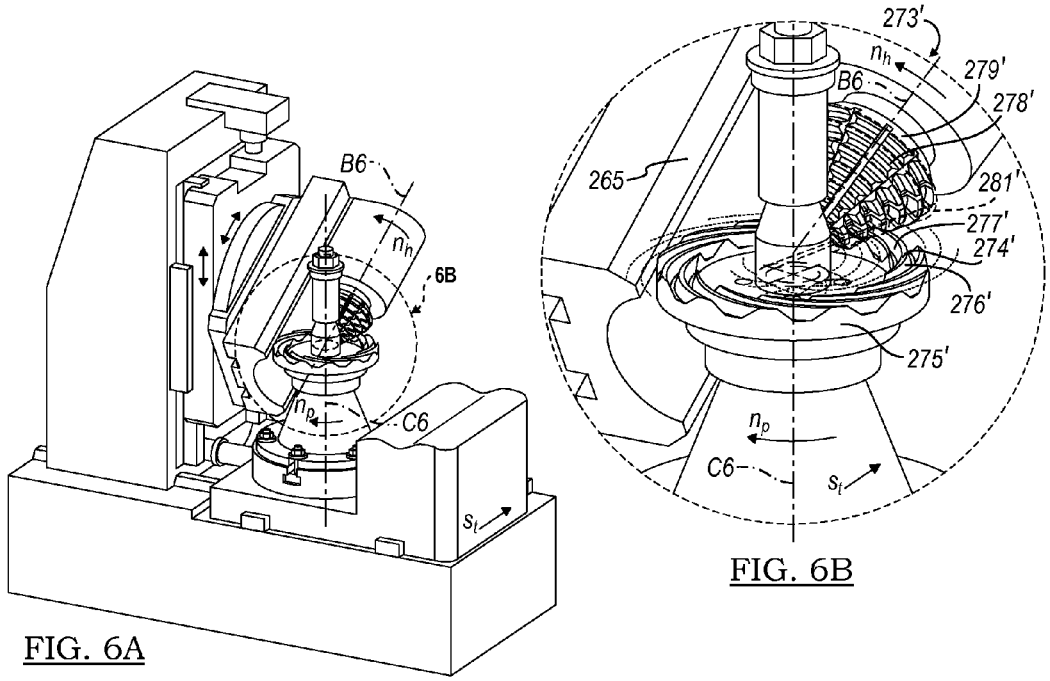
FIG. 6A
FIG. 6B
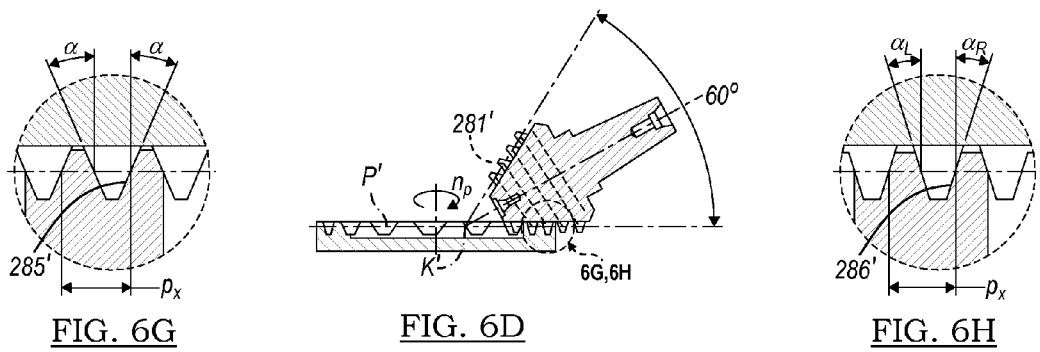
FIG. 6G
FIG. 6D
FIG. 6H
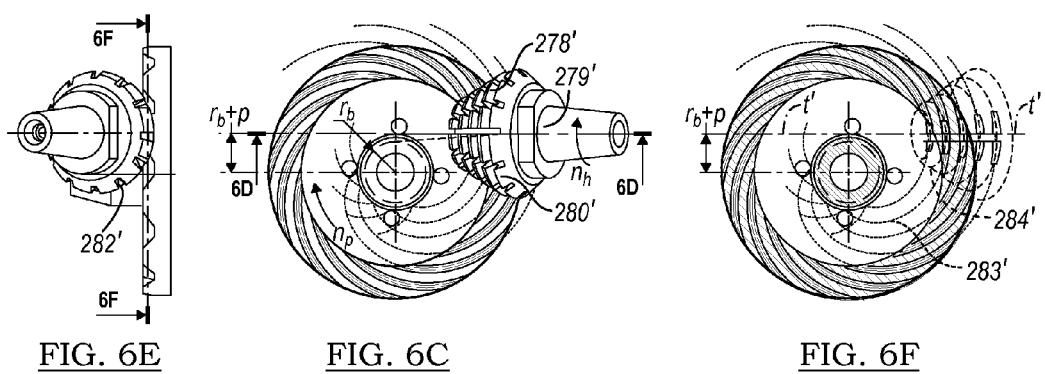
FIG. 6E
FIG. 6C
FIG. 6F

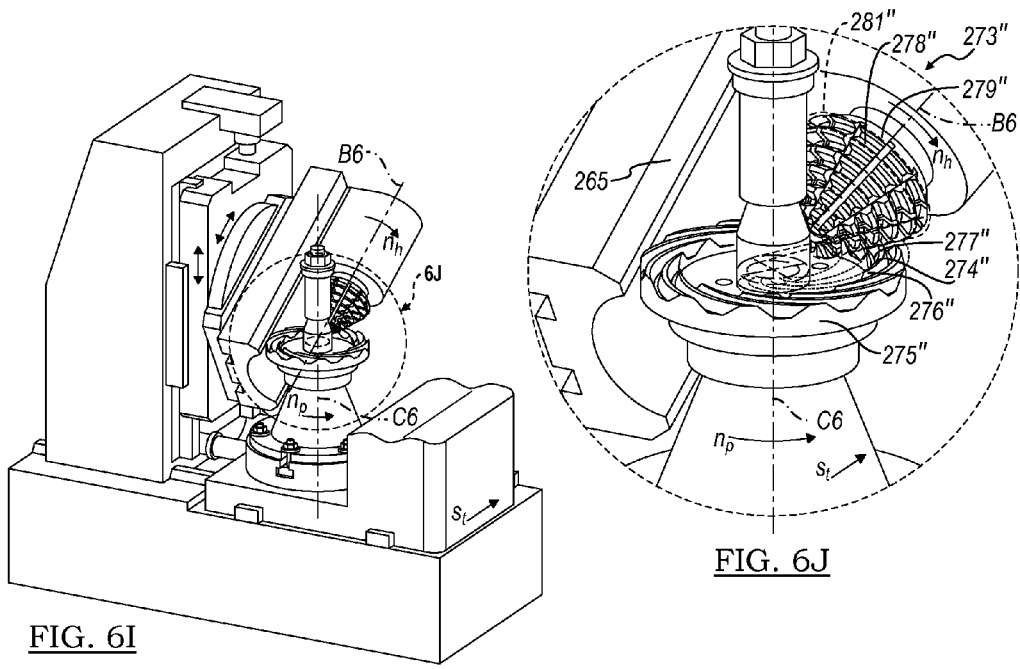
FIG. 6I
FIG. 6J
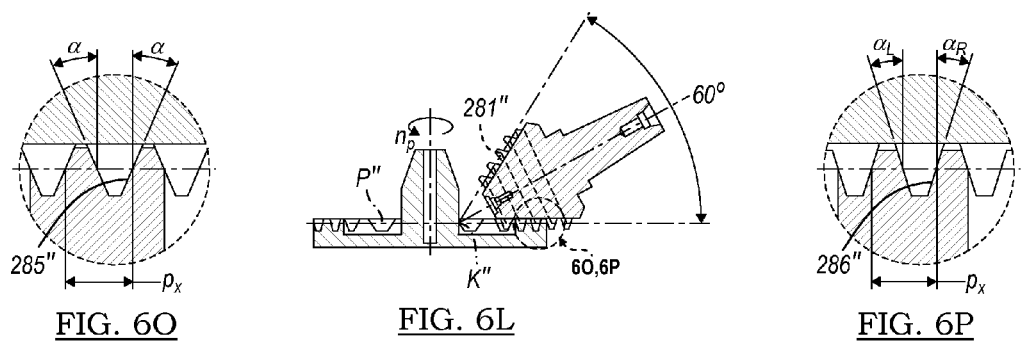
FIG. 6O
FIG. 6L
FIG. 6P
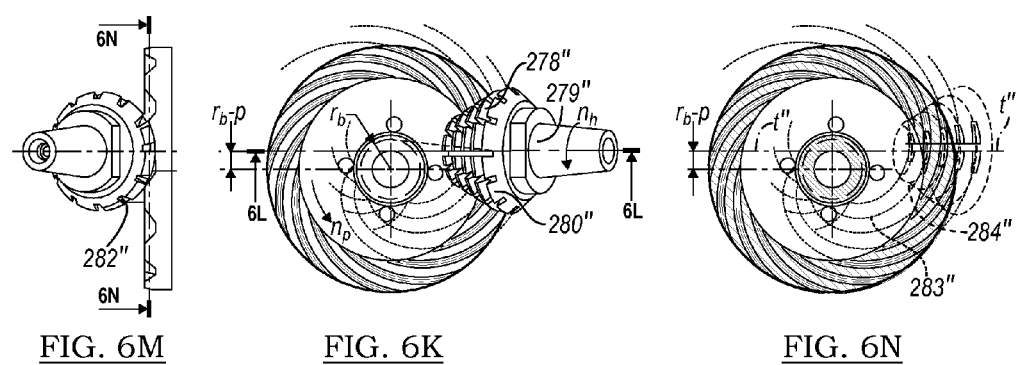
FIG. 6M
FIG. 6K
FIG. 6N

METHODS FOR GENERATING GEAR TEETH OF A DOUBLE INVOLUTE PINION-FACE GEAR DRIVE SYSTEM

FIELD

The present disclosure relates generally to a double involute pinion-face gear drive system, subject matter of our patent application Ser. No. 13/211,852 filed Aug. 17, 2011, having a cylindrical pinion with involute profile teeth, in mesh with the teeth of a face gear, the teeth of both components being curved in their longitudinal direction in form of an either shortened, a normal or an extended involute curve shape, and more particularly to methods of generating gear teeth for double involute pinion-face gear drive system components.

BACKGROUND

The statements in this section merely provide background information related to the present disclosure and may or may not constitute prior art.

Conventionally, cylindrical spur and helical gear pairs are routinely utilized to transfer torque and speed between parallel shafts. Bevel gear pairs are routinely utilized to transmit torque between a pair of shafts having intersecting axes that are disposed at an angle to one another, commonly at a right angle. Likewise, so called on-center face gear pairs can be use to transfer torque between intersecting shafts. Such a gear arrangement consists of a spur cylindrical pinion and a face gear mounted like bevel gears on shafts that intersect orthogonally to each other. When the cylindrical pinion teeth mesh with face gear teeth they act as bevel gears, their pitch surfaces being cones of rotation. Apart from the fact that they are less sensitive at mounting distance than bevel gears are, their main advantage is that the pinion bearings carry mostly radial load, while the gear bearings have both radial and thrust load. Due to operating pressure increases towards the outside diameter variation, while the depth of the tooth remains constant, the maximum usable outside diameter is the diameter at which the teeth become pointed. At the inside end, the limit is the radius at which the undercut becomes excessive.

It is generally a more difficult challenge to transmit torque between skew-axis shafts, which are neither parallel nor intersecting, and more particularly to non-intersecting shafts disposed offset at right angles. A significant difficulty is to transmit the torque and speed between non-intersecting orthogonal axes in both directions of rotation of the driving member, and moreover, to be able to interchange the two components status from drive to driven and vice-versa, within the same gear drive system. While most of skew-axis drives are bi-rotational not many can be bi-directional at the same time. As utilized herein, the term bi-rotational means that the gear assembly can transmit torque in either direction of rotation of the driving member, while the term bi-directional refers to whether a specific gear, e.g., the pinion gear, can operate as either the input or drive gear or the output or driven gear as well. Sometimes, within gear dedicated technical literature, the ability of a gear drive system to be non-bidirectional is called self-locking or anti-backdrive.

The most common prior art approach to the problem of torque transfer between non-intersecting orthogonal shafts involves the use of hypoid gears, especially in typical automobile differentials. They resemble bevel gears in some respects, but differ from true bevel gears in that their axes do not intersect. The distance between a hypoid pinion (in all practical cases, the driving member) axis and the axis of a hypoid gear (in all practical cases, the driven member) is called offset. Hypoid pinions may have as few as five teeth, compared with bevel gears that do not often have fewer than ten teeth, a fact that suggests their ability to realize high reduction gear ratios, and that they are seldom used as gear ratio multipliers. Hypoid gears are especially suited for transmitting large amounts of torque through angles with good efficiency and improved contact load capacity as disclosed by U.S. Pat. No. 2,961,888. Their use has also drawbacks. Hypoid gears are extremely sensitive to their components' relative location, being also adversely affected by small amounts of thermal growth during operation, as well as by deflections of the gear supporting structure under load. Such sensitivity requires also complex manufacturing, assembly, and gear mating procedures, limiting the speed reduction ratios for which they can be advantageously employed to low gear speed reduction ratios (ratios less than 4:1).

Hereinafter, the term pinion will be used for a gear drive system component, having the teeth disposed radially on a cylindrical or conical surface that has the axis of rotation identical with axis of rotation of the corresponding component. Usually, it is the smaller component in mesh and can be a cylindrical gear with helical teeth, a cylindrical gear with curved teeth along its axis, or a cylindrical or conical worm. The term gear, face gear or crown gear is usually used for the larger component in mesh, having the axis of rotation disposed offset at a right angle relative to the pinion axis, and the teeth formed on one of its side faces. The teeth can be disposed non-radially, having straight flanks or curved along a spiral curve, thus being provided with a convex and a concave flank. The tooth top land can lie in a plane, and the gear hence may be called a flat gear or on the surface of a cone. Likewise, the bottom land of gear tooth can lie also in a plane or on a surface of a cone.

A common prior art approach to the problem of torque transfer between non-intersecting orthogonal shafts involves the use of offset face gears, as partially disclosed by U.S. Pat. No. 5,178,028. The teeth of a cylindrical pinion disposed offset at a right angle relative to the face gear axis are helical, while the face gear teeth having straight edges are formed on one of its end faces and inclined from radial direction. The top and bottom land lie in two parallel planes. Although this type of gear system exhibits less sensitivity to the axial position of the pinion on the face gear, as well as more tolerance for movement toward or away from its driven face gear compared to an equivalent hypoid gear pair, due to the offset, the profile variations of face gear teeth are more pronounced. Like on-center face gears, the offset face gears have their outside and inside diameters limited by teeth pointing and undercutting phenomena. They can easily accommodate speed reduction ratios greater than 4:1. Another approach is disclosed by U.S. Pat. No. 2,311,006. Here, a spiral crown gear having a plurality of longitudinally curved teeth of ever increasing radii of curvature and a variable cross section throughout their length meshes with a cylindrical pinion having a plurality of helical teeth of a constant cross section throughout their length, though its pitch surface is a hyperboloid. Due to teeth asymmetry of both components, the novel gear drive allows for interference avoidance and for a prolonged contact. There is no mention of their bi-directional capability.

Another common prior art approach to the problem of torque transfer between non-intersecting orthogonal shafts involves the use of skew-axis gearings of so-called worm-face gears drives type. Characteristic of this type of gears is their high gear ratio in a compact arrangement and their good load-carrying capacity. Often they are recognized by their trademark names, the most known being Spiroid®, Helicon®, and Spiradrive® gear systems. Specific for all gear drives where the axes are either parallel or intersecting, the pitch diameters of the mating gears must be exactly proportional to their respective number of teeth and inversely proportional to the relative velocities. In this case of offset gear drives the respective pitch diameters are independent of the gear ratio. Where one of the members is a worm, as disclosed in U.S. Pat. No. 1,683,758, its pitch diameter may be changed at will by altering its thread angle. Thus, such gears have the advantage that the driving member or the worm may be made proportionately larger compared to bevel gears with intersecting axes having the same gear ratio. Here, the crown gear having longitudinally curved teeth of constant height mates with a cylindrical worm, the worm threads and the gear teeth being of opposite hand.

U.S. Pat. No. Re. 16,137 discloses a conventional gear system in which a conical worm or a beveled pinion meshes with a spiral beveled gear. The beveled gear teeth are shaped in the form of modified involutes of a circle. Specific for both mentioned gear systems, is the fact that the worm is the primary member. U.S. Pat. No. 2,896,467 discloses another conventional gear system capable of an unusually large offset, great area of contact and low reduction ratios. In this case, the gear is considered the primary member, rather than the worm. While the worm threads are curved, the face gear teeth are straight and non-radially disposed on one end face of the gear, with the top land in a plane and the bottom lands on a conical surface. A significant difficulty of all these combinations, although it can sometimes be a benefit, is that torque transfer can occur only from the worm to the beveled gear—the worm gear cannot be back driven. Thus, such a gear assembly, although bi-rotational, is not bi-directional.

Gear configurations for non-intersecting orthogonal shafts that are both bi-rotational and bi-directional do exist. Prior art is disclosed by U.S. Pat. Nos. 4,238,970 and 4,367,058 where a bevolute gear system is designed to be completely non-self-locking. The gear system includes a non-beveled pinion having the teeth shaped in the form of an involute spiral, and meshes with spiral involute curved teeth of a face gear positioned at approximately 90° relative to each other at an angle offset in the range of 50% to 75% of the pitch circle radius of the face gear. The pinion includes teeth which are shaped in the form of a normal involute spiral. The bevolute gear system includes a second gear which also includes teeth which are shaped in the form of a normal involute spiral and flat and in one plane, mounted on a non-intersecting axis at a right angle to the axis of the pinion gear. However, these configurations are strictly limited to: a normal involute spiral of the face gear base circle as the gears teeth longitudinally shape, gears speed ratio span, means to avoid their teeth interference in mesh and undercutting in the manufacturing process, means to improve the gears load capacity and efficiency while reducing their weight, contact stress and noise in operation.

It is desirable and often necessary to provide gear configurations for non-intersecting orthogonal shafts which are bi-rotational, can operate bi-directionally and also provide a relatively wide range of low gear speed ratios, including gear speed ratios as low as 1:1 and as high as 7.5:1. Also, it is desirable to provide gears configurations for non-intersecting orthogonal shafts which are bi-rotational, can operate bi-directionally and also avoid the interference in mesh and undercutting. By taking advantage of using combinations of modified and normal involute curves of a circle not only as the gears teeth profile shapes but also as their lengthwise shapes, the teeth curvature can be modified while imposing no restrictions on pinion centerline position relative to the face gear base circle. Because of all three types of involute spiral shapes as teeth profiles, a quiet and smooth gear action is produced.

Such a gear drive system, called hereinafter as a double involute pinion-face gear drive system is bi-directional, bi-rotational and provides a relatively wide range of speed ratios. The double involute pinion-face gear drive system provides torque and speed transmission between non-intersecting shafts at right angles to one another. Specifically, the invention is an orthogonal skew axis gearing system having a cylindrical pinion with teeth curved in their lengthwise direction parallel to the pinion axis, in mesh with a face gear that has also teeth curved in the lengthwise direction. The teeth of the cylindrical pinion, as well as the teeth of the face gear, can be curved in a shortened, normal or extended involute curve shape in their longitudinal direction, within the face gear pitch plane, which is perpendicular to the face gear axis and tangent to the pinion pitch cylinder. The face gear pitch circle lies on its pitch plane, contains its pitch point and usually its radius is considered to be located closed to the middle of the face gear width. Within this plane, often designated as the teeth longitudinal profile shape generating plane, the nature of the pinion and face gear teeth longitudinal shapes, as normal, extended or shortened involute curves can be visualized. Moreover, within this plane the mesh between pinion teeth and face gear teeth can be imagined as the mesh between two conjugate curved-racks with a curvilinear contact. Theoretically, the teeth of the pinion as well as the teeth of the face gear can be imagined as generated by rolling the pinion and the face gear blanks on their correspondingly curved rack-cutters.

As utilized herein, the term double involute pinion refers to a cylindrical pinion including a plurality of teeth which have involute shape profile in two specific perpendicular planes: the pinion teeth depth profile shape is a normal involute curve of the pinion base circle within its pitch plane, while the pinion teeth shape curve in their lengthwise direction, can be either a normal, extended or shortened involute curve of the mating face gear base circle within the face gear pitch plane.

As utilized herein, the term double involute pinion-face gear drive refers to an orthogonal skew-axis gearing for transmitting torque between non-intersecting axes disposed orthogonally offset at a predetermined centre distance, comprising a cylindrical pinion mounted on one of the said axes, in meshing engagement with a face gear mounted on the second said axis. The pinion has a cylindrical form including a plurality of radial teeth on its periphery with convex flanks, which are shaped in the form of a normal involute curve of the pinion base circle on their depth profile and, which are shaped also in their lengthwise direction in form of either: normal, extended or shortened involute curve of the mating face gear base circle. The face gear is a flat wheel with the teeth formed on one of its side faces, and is usually the larger component in the mesh. It should be mentioned that often the pinion may have more teeth than the mating face gear. The face gear teeth are disposed non-radially, having curved flanks along a spiral curve, in their lengthwise direction, being provided with convex and concave flanks. Like the pinion teeth longitudinal shape, the face gear teeth longitudinal shape can be a normal, extended or a shortened involute curve of the face gear base circle. The face gear teeth top and bottom lands lie in two parallel planes that are limiting the teeth constant height. The face gear depth profile shape is a straight-line but only within teeth depth profile generating planes.

As utilized herein, the term double involute pinion-face gear drive system refers to the entire class of possible different combinations of double involute pinion-face gear drives by choosing: a certain type of involute curve for the pinion and face gear teeth longitudinal shape, a particular left-hand or right-hand face gear teeth helix direction, a certain member as the drive or driven member and a certain grade of asymmetry for gears teeth.

It is critical important to provide certain methods of manufacturing the teeth for all types of gear components of a double involute pinion-face gear drive system, made out of: metal-by cutting, plastic materials-by injection molding and powder metal-by sintering process, thus extending their teeth manufacturing capabilities, in order to reduce the manufacturing cost and improve the manufacturing efficiency.

Prior art related to methods of generating the gears teeth of bevolute gear system components, curved longitudinally in a shape of a normal involute curve of a base circle is disclosed by both U.S. Pat. Nos. 4,238,970 and 4,367,058, respectively. The machining of the wheel gear is accomplished by placing a conventional gear-shaping cutter on the axis of the pinion and rotating the wheel-gear blank against the gear cutter. The rotating gear-blank is fed against the rotating cutter by moving their axes relative to each other as the shafts rotate at a certain prescribed rate. Further, the rotation of the gear-blank and cutter is geared to this movement, such that bevolute teeth, with a normal involute spiral to the full depth across the wheel face of the gear-blank will be cut. The machining of the pinion gear is easily accomplished by a rack cutter which has the same axis as the wheel gear and by mounting the pinion gear blank on the axis of the pinion gear. As the rack cutter and the pinion gear rotate together, the cutter will generate teeth which are shaped in the form of a normal involute spiral on the pinion gear-blank. The rack inserts or, the racks on a one-piece cutter obtained by gashing and relieving a hardened wheel gear, are tangent to the base circle of the bevolute wheel gear which will be used in combination with the generated pinion gear and, set at progressive positions along the tangent to ensure total machining of the pinion gear-blank. In addition, the pinion gear-blank and the pinion cutter must be rotated in the proper direction and with proper ratio to ensure total machining of the pinion. There is no mention of the in-feed movement type used at machining the pinion, as well as, any other method of gear teeth generation for either of the two components of a bevolute gear system as disclosed by the above mentioned patents.

Moreover, within technical literature there are no mentions of any gear teeth generation method for the two components of a double involute pinion-face gear drive system that used instead of a normal involute curve, as their teeth longitudinal shape, a shortened or an extended spiral involute curve of the same face gear base circle. The present invention is so directed.

SUMMARY

Thus, it is an aspect of the present invention to provide several methods of generating the teeth of both components of a left or right-hand double involute pinion-face gear drive system, the cylindrical pinion with involute profile teeth, in mesh with the teeth of the face gear, the teeth of both components being curved in their longitudinal direction in form of a shortened, a normal or an extended involute curve of the same base circle of the face gear.

The methods for generating the teeth of a double involute pinion that will mesh with the teeth of a face gear, the teeth of both components being curved in their longitudinal direction in form of a shortened, a normal or an extended involute curve of the same base circle of the face gear include (1) rotating the double involute pinion blank about its axis of rotation while engaging it, on a conventional hobbing machine, in a predetermined rotation ratio, with a rotary face hob set up at a desired center distance on a 90° non-intersecting shaft relative to the double involute pinion blank mounting shaft, the tool, which is specific designed for each of the three types of the system teeth longitudinally curved shapes, i.e. in form of a shortened, a normal, or an extended involute curve of the same base circle of the face gear having the teeth generator rack of symmetrical or asymmetrical type, being progressively and continuously fed radially toward the double involute pinion blank, in a direction parallel to its axis of rotation to the full depth of the double involute pinion teeth (the tool radial in-feed movement can also be imagined as the translation of the double involute pinion blank shaft support in a direction parallel to the tool axis of rotation), (2) rotating the double pinion blank about its axis of rotation while engaging it, on a conventional hobbing machine, in a predetermined rotation ratio, with a rotary face hob, set up at a certain depth of the teeth to be cut on a 90° non-intersecting shaft relative to pinion blank mounting shaft, the tool, which is specific designed for each of the three types of the system teeth longitudinally curved shapes, i.e. in form of a shortened, a normal, or an extended involute curve of the same base circle of the face gear, having the teeth generator rack of symmetrical or asymmetrical type, being progressively and continuously fed tangentially in a proper timed relation with the tool rotation, in a direction parallel to the common perpendicular to the double involute pinion blank and face hob axes, in addition, outside of forming engagement the tool being intermittently set up axially toward the pinion blank along the direction of its axis of rotation at a predetermined tooth depth until the pinion whole tooth depth is reached and (3), rotating the double involute pinion blank about its axis of rotation while engaging it, on a 6-axis CNC hobbing machine, in a predetermined rotation ratio, with a rotatable conical hob, having an axial rack section of symmetrical or asymmetrical type and constant pitch, the tool being specific designed for two types of the system teeth longitudinally curved shapes, i.e. a shortened or an extended involute curve of the same base circle of the face gear teeth that will mesh with the double involute pinion teeth being cut and using a tangential plunging in-feed movement defined as a result of combining in a timed relationship, the tangential translation of the double involute pinion blank spindle along a direction perpendicular to its axis and tangent to said face gear base circle, towards or away from said face gear base circle center, respectively with plunging rotation feed of conical hob tool axis projection on face gear imaginary pitch plane, around face gear teeth circle of radius (rb+p) or (rb−p), respectively.

The methods for generating the teeth of a face gear that will mesh with the teeth of a double involute pinion, the teeth of both components being curved in their longitudinal direction in form of a shortened, a normal or an extended involute curve of the same base circle of the face gear teeth to be cut include (1) multiple paths of correlating an active swing rotation of the face gear blank about its axis of rotation, on a conventional hobbing machine, that will allow the generation of the space between adjacent teeth by removing a certain amount of material stock on the entire width of the face gear blank, with a translation of a rack cutter along the common tangent line to the rack cutter tool pitch line located on its rake surface and to the face gear circle of radius (rb+p), rb, or (rb−p), respectively, where rb is the face gear base circle radius and p is the face gear teeth longitudinally modified involute curve polar subnormal (the translation of the tool can be also imagined as the translation of the face gear blank spindle, followed by a reverse idle swing rotation correlated with the reverse translation of both face gear blank and rack cutter, respectively, to their initial position, an indexing rotation of the face gear blank to the next space between two adjacent teeth to be machined, until all the spaces between the adjacent teeth of the face gear will be machined at the same depth, followed by a discretely protrusion in-feed of the rack cutter, outside of engagement, along the face gear blank axis, to the new tooth depth, until the tooth whole depth is achieved (2) rotating the face gear blank about its axis of rotation, while engaging it in a predetermined rotation ratio with a rotary shaper cutter disk tool, having the teeth generator rack of symmetrical or asymmetrical type, mounted on a 90° non-intersecting shaft relative to the face gear blank spindle, on a conventional hobbing machine, the face gear blank spindle being fed tangentially in a timed relation with the rotation of the tool, along the common tangent line to the pinion pitch cylinder and to the face gear circle of radius (rb+p), m, or (rb−p), respectively, where rb is the face gear base circle radius and p is the face gear teeth modified involute curve polar subnormal, such that the teeth of a shortened, a normal or an extended involute curve shape will be generated on the entire face gear width, in addition, outside of engagement the face gear blank being intermittently set up axially in the direction of its axis of rotation such that a certain amount of stock material on face gear space between the teeth will be progressively removed to the whole depth of the face gear teeth (3), rotating the face gear blank about its axis of rotation while engaging it with a conical hob in a predetermined rotation ratio, on a conventional hobbing machine, the tool having its axial rack section of symmetrical or asymmetrical type and constant pitch, specific designed for two types of the system teeth longitudinally curved shapes, i.e. a shortened or an extended involute curve of the same base circle of the face gear teeth that will be cut, angularly positioned on a special cutting head such that during the entire manufacturing process the conical hob pitch cone axial generatrix projection on the face gear pitch plane is tangent to the face gear circle of radius (rb+p) or (rb−p), respectively, the tool being radially fed in the direction parallel to face gear axis of rotation to the full depth of the face gear teeth and (4), rotating the face gear blank about its axis of rotation while engaging it with in a predetermined rotation ratio with a conical hob, on a 6-axis CNC hobbing machine, the tool having its longitudinal axial rack section of symmetrical or asymmetrical type and constant pitch, specific designed for two types of the system teeth longitudinally curved shapes, i.e. a shortened or an extended involute curve of the same base circle of the face gear teeth that will be cut and which will mesh with the pinion teeth, the face gear blank spindle being fed tangentially in a timed relation with the rotation of the tool, in the direction parallel to the common tangent line to the conical hob pitch cone axial generatrix and to the face gear circle of radius (rb+p) or (rb−p), respectively, in addition, outside of the face gear blank the tool being set up intermittently radially into the blank in the direction parallel to the face gear axis of rotation such that a certain amount of material stock will be removed until the whole depth of face gear space between the adjacent teeth is reached.

It is thus an aspect of the present invention to provide methods for manufacturing the double involute pinions teeth of a double involute pinion-face gear system, of left or right-hand and, of symmetrical or asymmetrical type, utilizing an one-piece or a built-up cutting tool, on a conventional or a 6-axis CNC hobbing machine, by a generating process.

It is thus a further aspect of the present invention to provide methods for manufacturing the face gears teeth of a double involute pinion-face gear system, of left or right-hand and, of symmetrical or asymmetrical type, utilizing an one-piece or a built-up cutting tool, on a conventional or a 6-axis CNC hobbing machine, by a generating process.

It is still a further aspect of the present invention to provide methods for manufacturing the double involute pinions teeth of a double involute pinion-face gear system, of symmetrical or asymmetrical type, longitudinally shaped in form of a shortened, a normal or an extended involute curve of the same base circle of the face gear teeth that will mesh with the double involute pinion teeth being cut, utilizing an one-piece or a built-up rotary face hob, with a radial in-feed movement, on a conventional hobbing machine.

It is still a further aspect of the present invention to provide methods for manufacturing the double involute pinions teeth of a double involute pinion-face gear system, of symmetrical or asymmetrical type, longitudinally shaped in form of a shortened, a normal or an extended involute curve of the same base circle of the face gear teeth that will mesh with the double involute pinion teeth being cut, utilizing an one-piece or a built-up rotary face hob, with a tangential in-feed movement, on a conventional hobbing machine.

It is still a further aspect of the present invention to provide methods for manufacturing the double involute pinions teeth of a double involute pinion-face gear system, of symmetrical or asymmetrical type, longitudinally shaped in form of a shortened or an extended involute curve of the same base circle of the face gear teeth that will mesh with the double involute pinion teeth being cut, utilizing a one-piece or a built-up rotary conical hob, with a tangential plunging in-feed movement, on a 6-axis CNC hobbing machine.

It is still a further aspect of the present invention to provide methods for manufacturing the face gears teeth of a double involute pinion-face gear system, of symmetrical or asymmetrical type, longitudinally shaped in form of a shortened, a normal or an extended involute curve of the same base circle of the face gear teeth being cut, that will mesh with the double involute pinion teeth, utilizing a one-piece or a built-up rack cutter, with a tangential in-feed movement, on a conventional hobbing machine.

It is still a further aspect of the present invention to provide methods for manufacturing the face gears teeth of a double involute pinion-face gear system, of symmetrical or asymmetrical type, longitudinally shaped in form of a shortened, a normal or an extended involute curve of the same base circle of the face gear teeth being cut, that will mesh with the double involute pinion teeth, utilizing a rotary one-piece or a built-up shaper cutter disk, with a tangential in-feed movement, on a conventional hobbing machine.

It is still a further aspect of the present invention to provide methods for manufacturing the face gears teeth of a double involute pinion-face gear system, of symmetrical or asymmetrical type, longitudinally shaped in form of a shortened or an extended involute curve of the same base circle of the face gear teeth being cut, that will mesh with the double involute pinion teeth, utilizing an one-piece or a built-up rotary conical hob, with a radial in-feed movement, on a conventional hobbing machine.

It is still a further aspect of the present invention to provide methods for manufacturing the face gears teeth of a double involute pinion-face gear system, of symmetrical or asymmetrical type, longitudinally shaped in form of a shortened or an extended involute curve of the same base circle of the face gear teeth being cut, that will mesh with the double involute pinion teeth, utilizing an one-piece or a built-up rotary conical hob, with a tangential in-feed movement, on a 6-axis CNC hobbing machine.

Further aspects, advantages and areas of applicability will become apparent from the description provided herein. It should be understood that the description and specific examples are intended for purposes of illustration only and are not intended to limit the scope of the present disclosure. Thus, it would be also understood that modifications can be made in the embodiments of the invention described and illustrated, to encompass other methods of manufacturing for both components of a left or right-hand double involute pinion-face gear drive system, such as: manufacturing from plastic materials by an injection molding process, from powder metal by a sintering process, without departing from the scope of the present invention.

DRAWINGS

The drawings described herein are for illustration purposes and for a better understanding of the invention objects set forth above and are not intended to limit the scope of the present disclosure in any way.

FIG. 1 is a diagrammatic view of a conventional hobbing machine suitable for generating the teeth of double involute pinions according to the present invention, longitudinally curved in form of a shortened, a normal or an extended involute curve of the face gear circle of radius rb, respectively, utilizing a face hob mounted in the machine cutting head, with a radial or a tangential in-feed movement;

Figure 1:
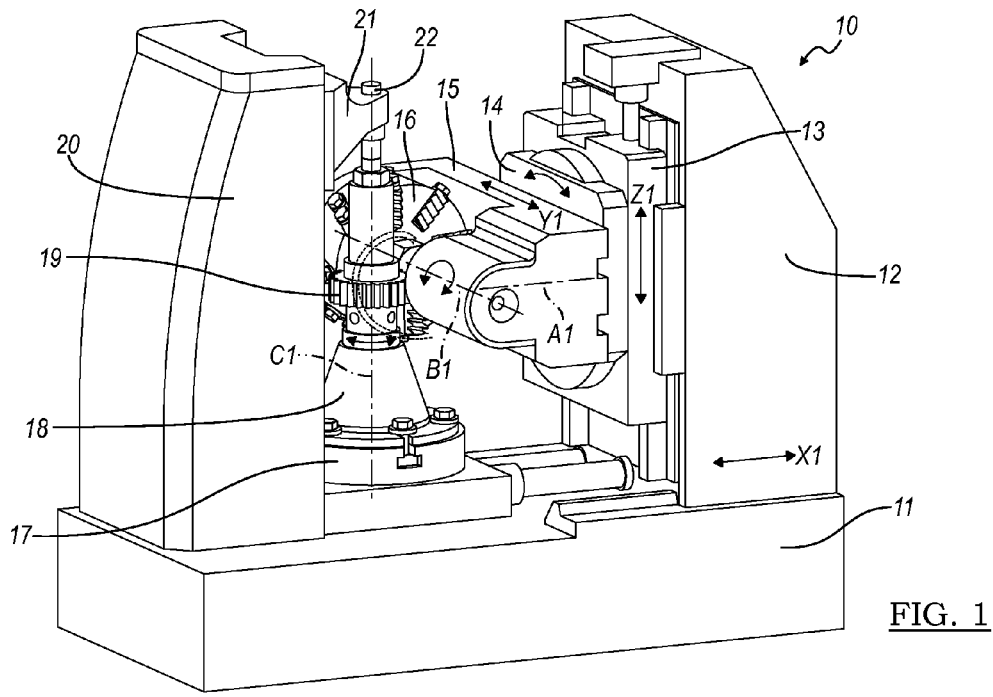
FIG. 1A is a perspective view of a first method of generating the teeth of a double involute pinion according to the present invention, longitudinally curved in form of a shortened involute curve of the face gear circle of radius rb, utilizing a built-up face hob of a specific design, with a radial or a tangential in-feed movement, on the conventional hobbing machine illustrated in FIG. 1.
FIG. 1B is a diagrammatic plane top view of the method of generating longitudinally curved teeth of a double involute pinion, as illustrated in FIG. 1A.
FIG. 1C is a diagrammatic cross-sectional view, through the face hob pitch plane, along the line 1C-1C, as illustrated in FIG. 1B.
FIG. 1D is a diagrammatic cross-sectional view, through the plane simultaneously perpendicular to the pinion blank axis and tangent to the face hob circle of radius (rb+p), along the line 1D-1D, as illustrated in FIG. 1C.
FIG. 1E is an enlarged partial detail of the cross-sectional view shown in FIG. 1D.
Figure 2:
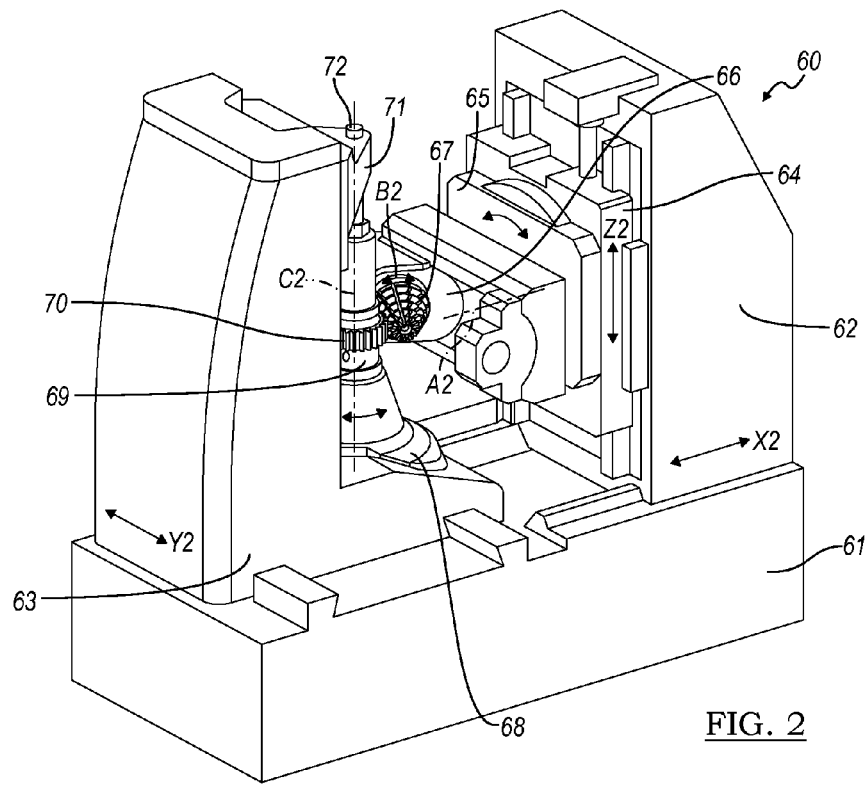
Figure 1F:
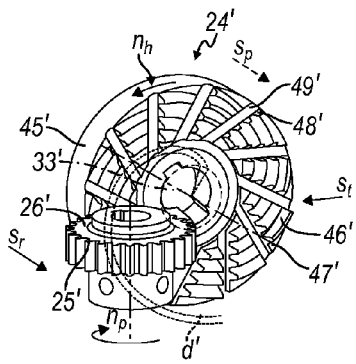
Figure 1D:
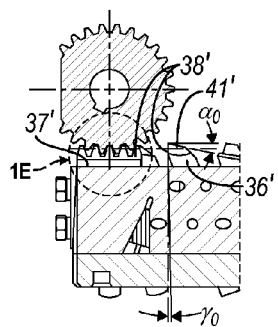
Figure 1C:
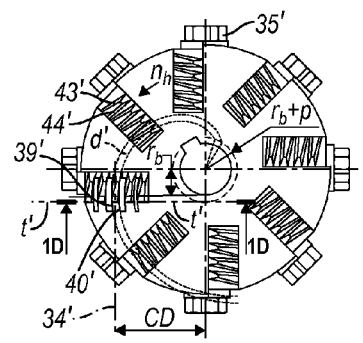
Figure 1A:
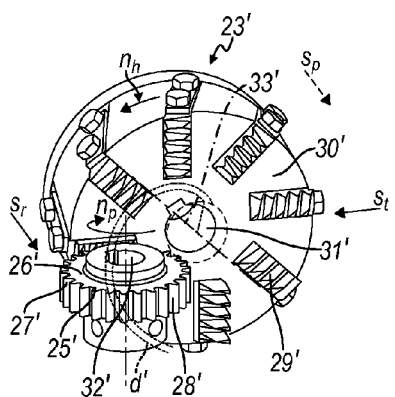
Figure 1E:
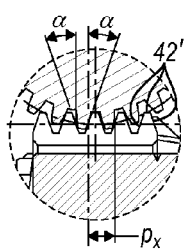
Figure 1B:
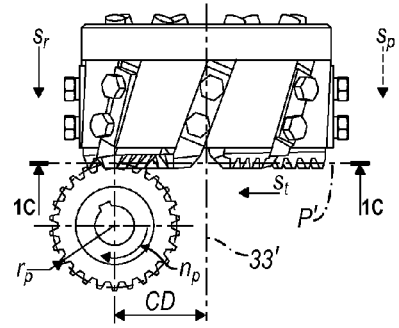
Figure 1G:
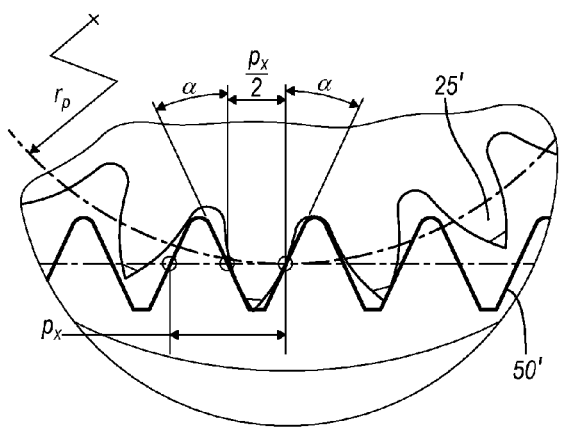
Figure 1H:
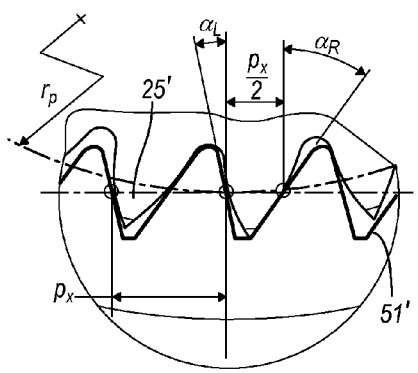
Figure 1N:
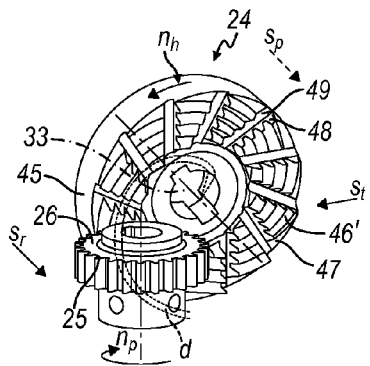
Figure 1L:
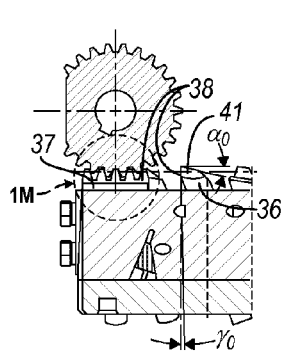
Figure 1K:
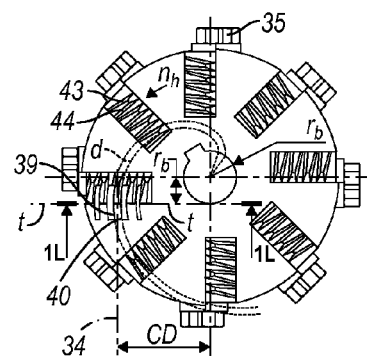
Figure 1I:
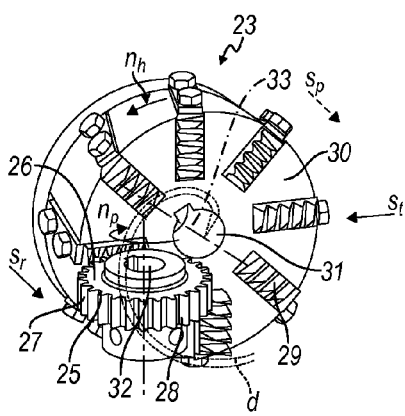
Figure 1M:
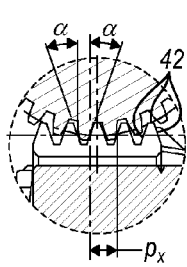
Figure 1J:
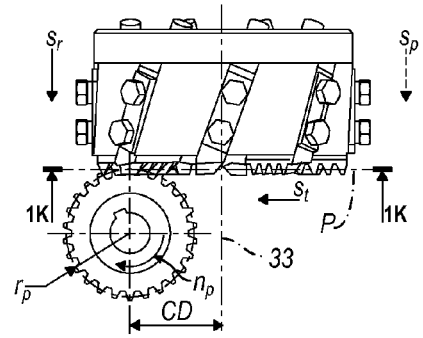
Figure 1O:
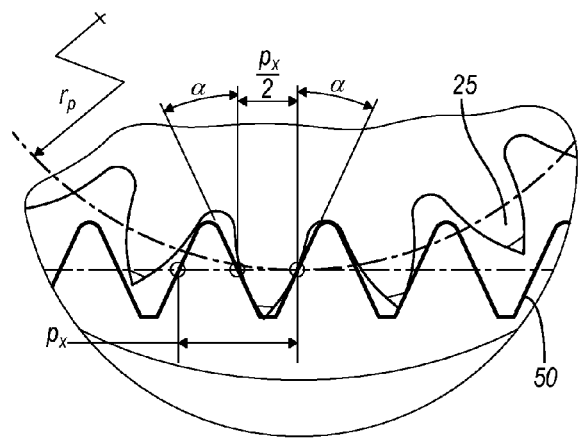
Figure 1P:
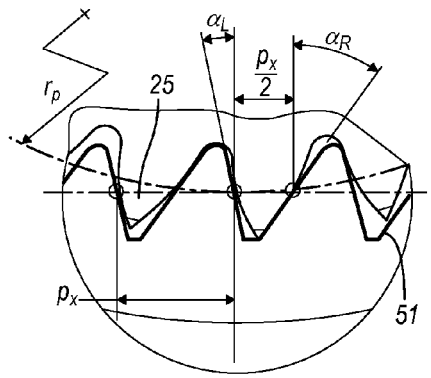
Figure 1V:
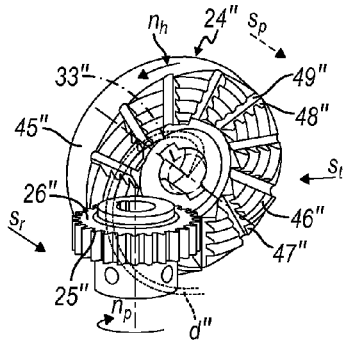
Figure 1T:
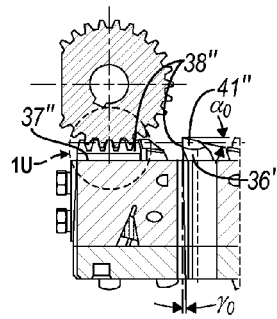
Figure 1S:
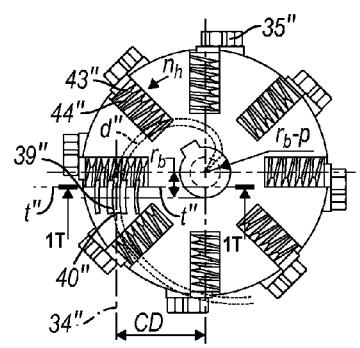
Figure 1Q:
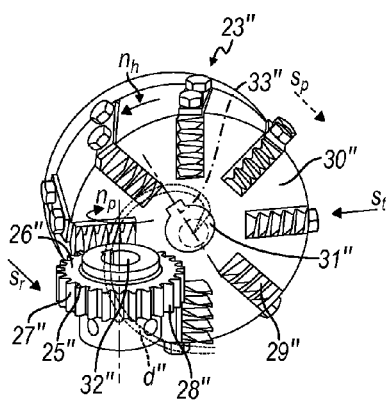
Figure 1U:
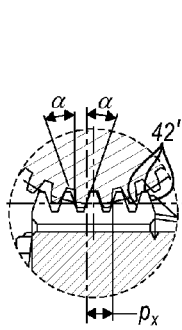
Figure 1R:
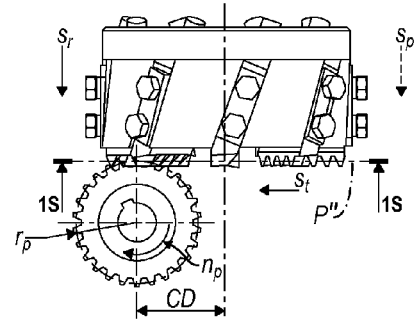
Figure 1W:
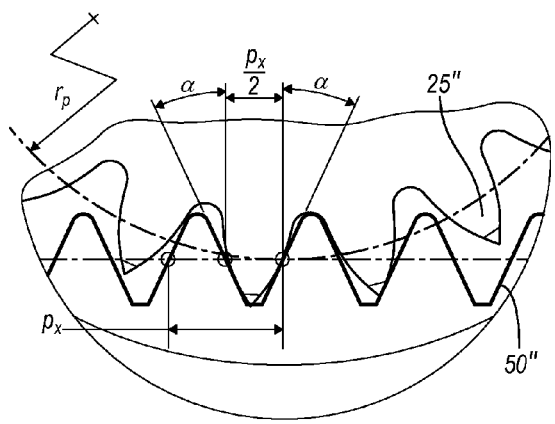
Figure 1X:
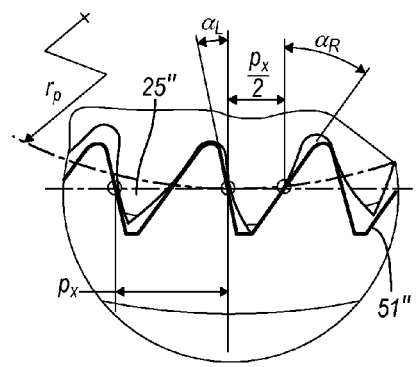
Figure 2A:
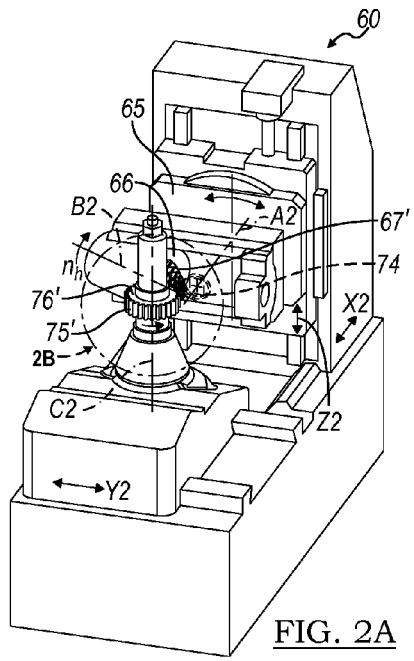
Figure 2B:
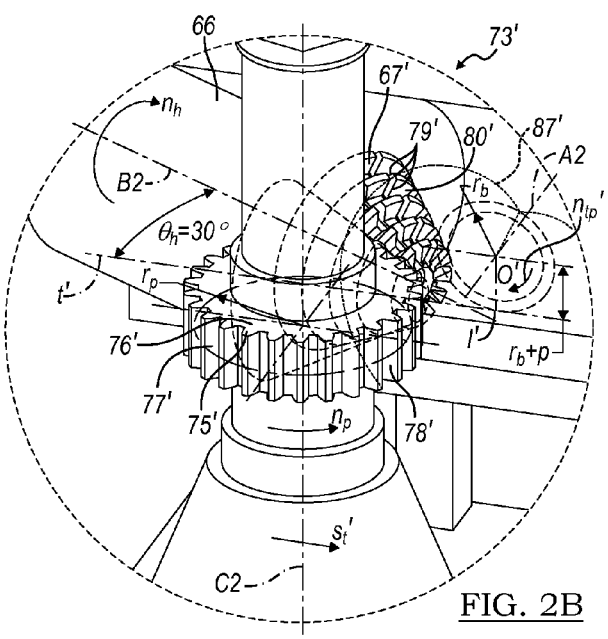
Figure 2G:
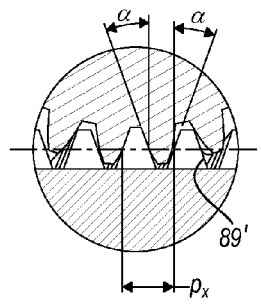
Figure 2D:
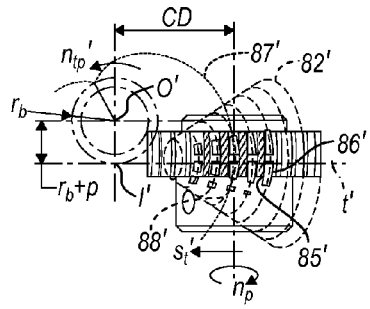
Figure 2H:
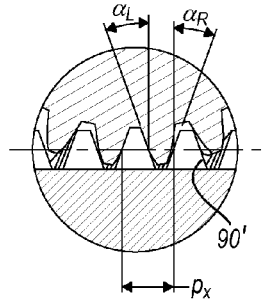
Figure 2E:
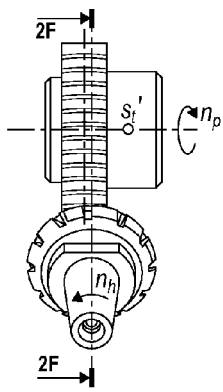
Figure 2C:
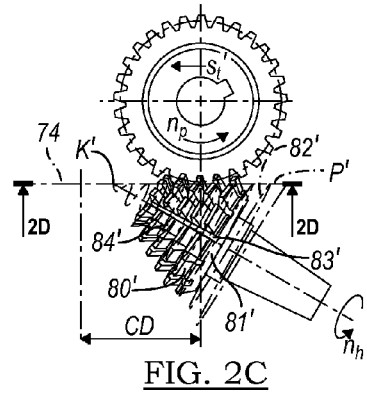
Figure 2F:
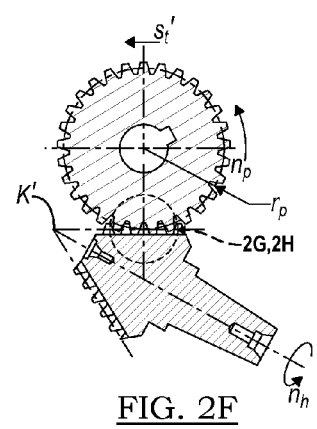
Figure 2I:
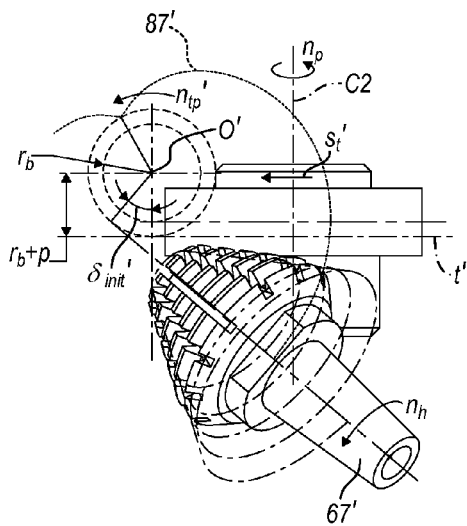
Figure 2K:
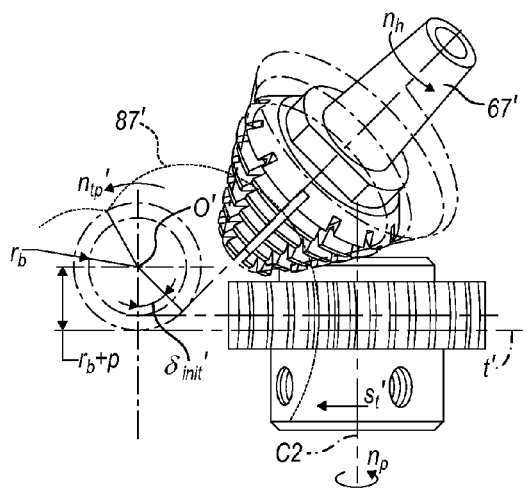
Figure 2J:
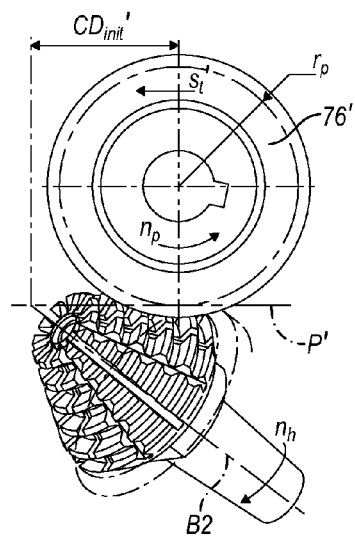
Figure 2L:
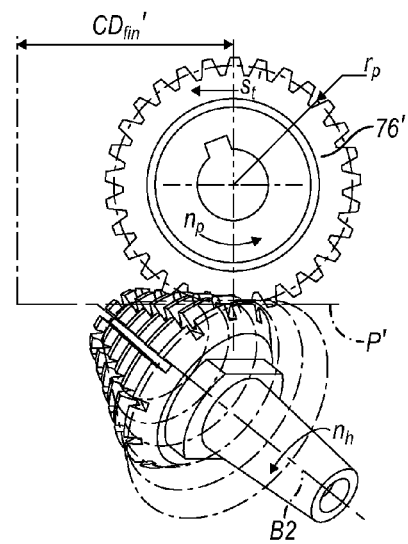
Figure 2M:
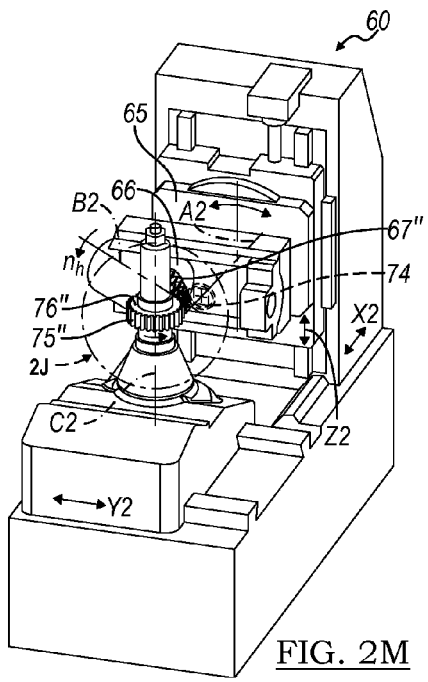
Figure 2N:
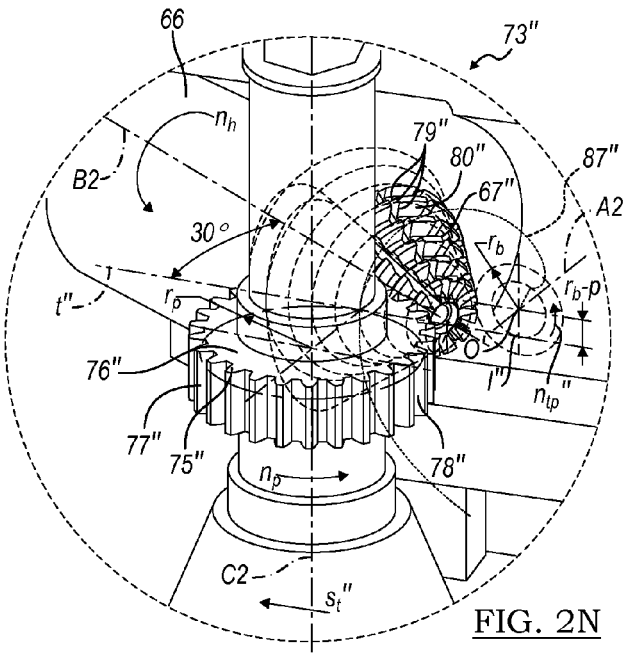
Figure 2S:
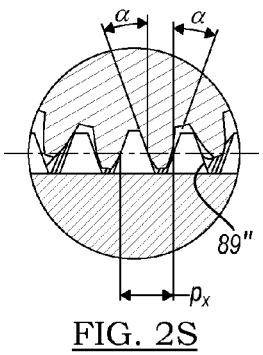
Figure 2P:
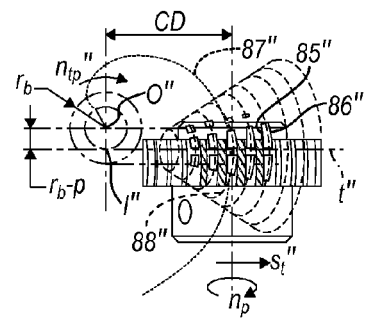
Figure 2T:
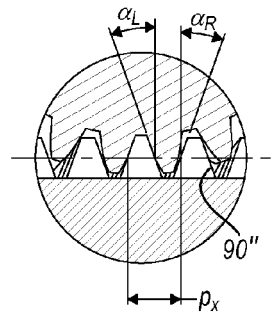
Figure 2Q:
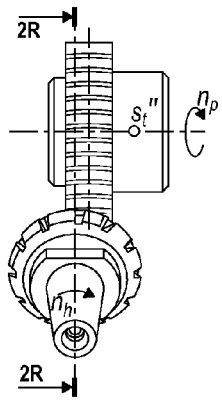
Figure 2O:
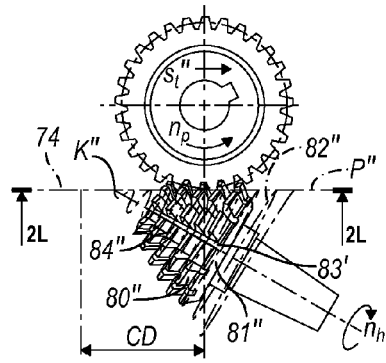
Figure 2R:
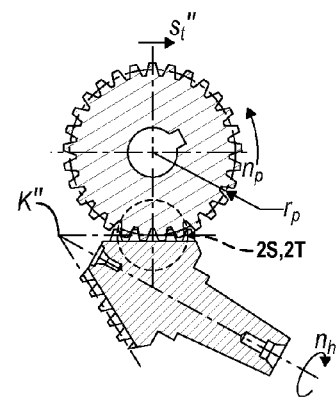
Figure 2U:
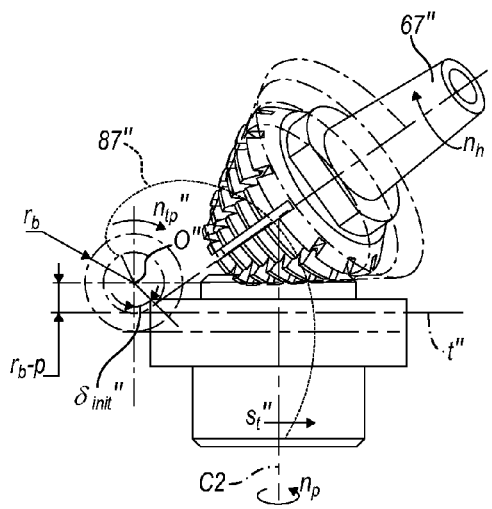
Figure 2W:
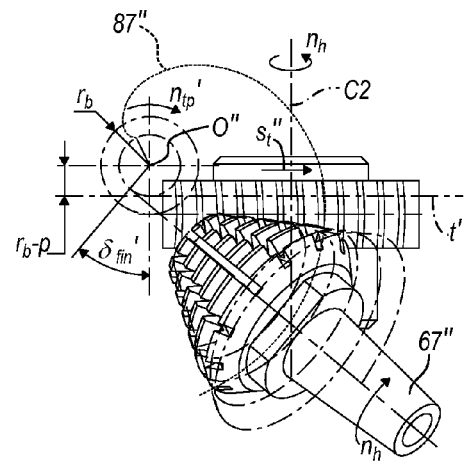
Figure 2V:
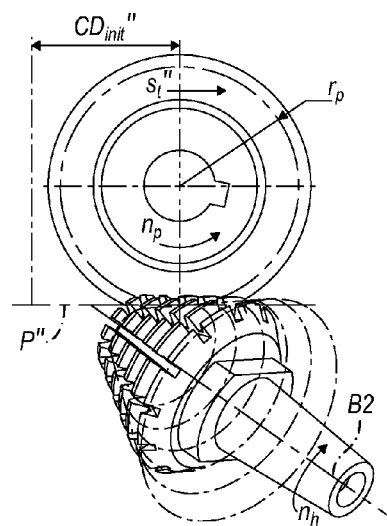
Figure 2X:
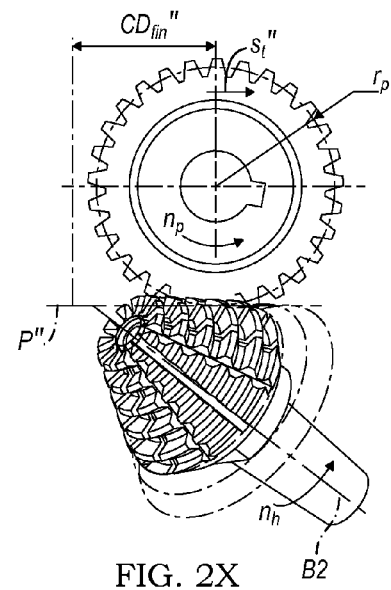
Figure 3:
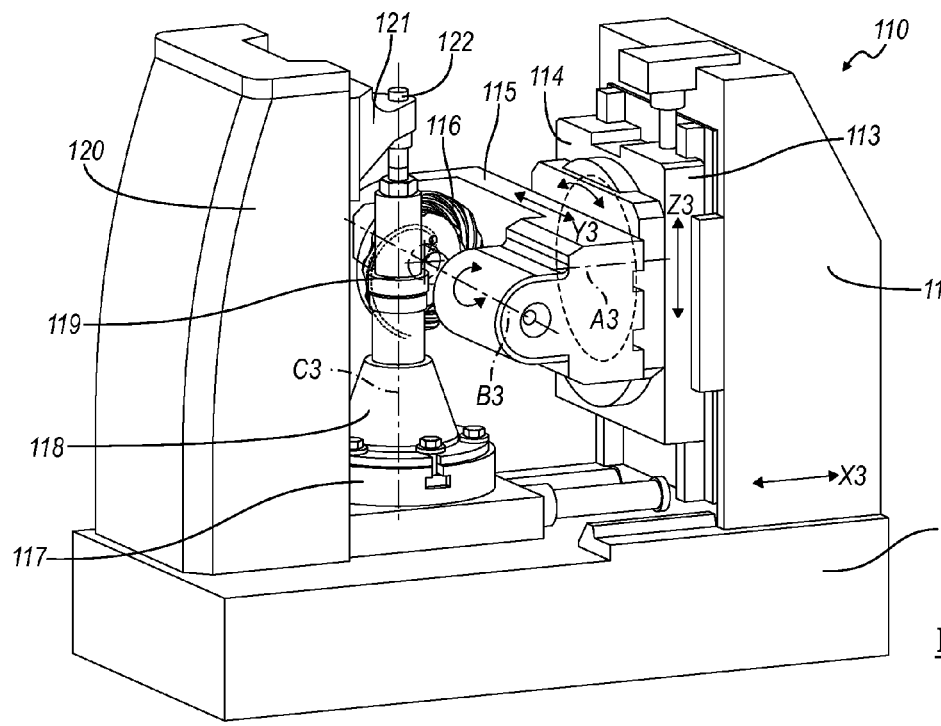
Figure 4:
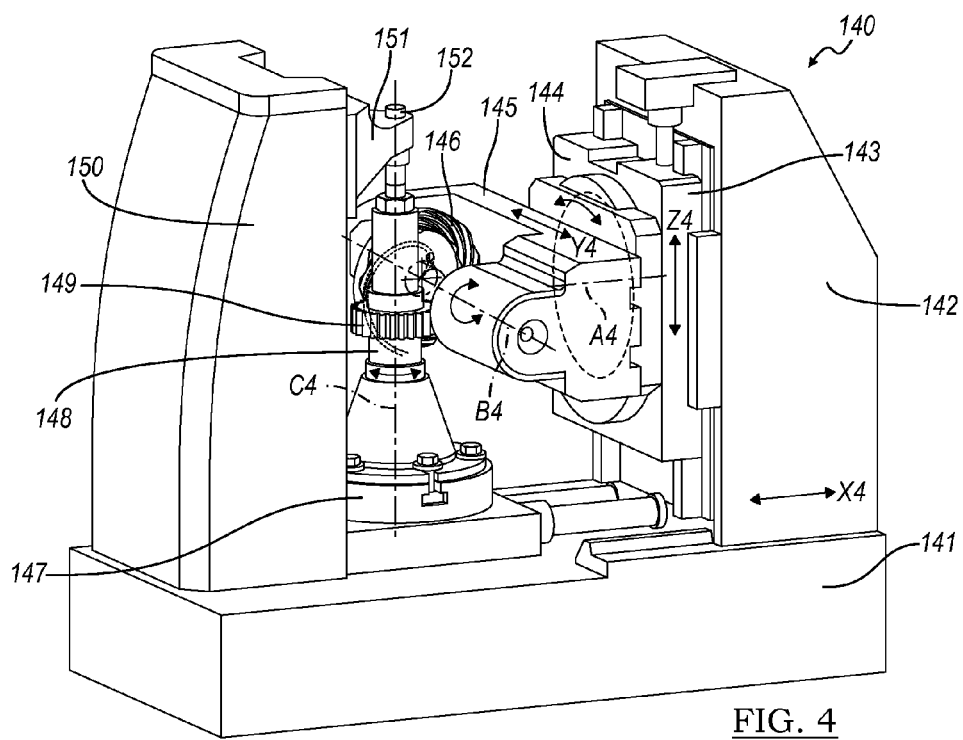
Figure 3D:
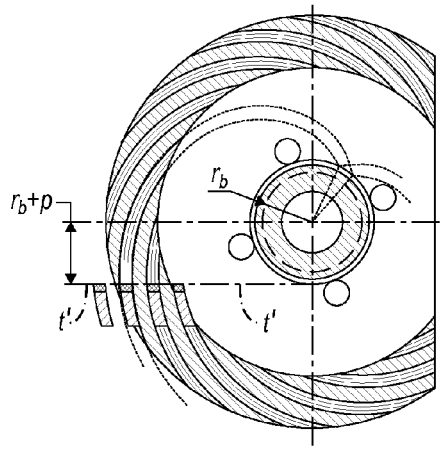
Figure 3B:
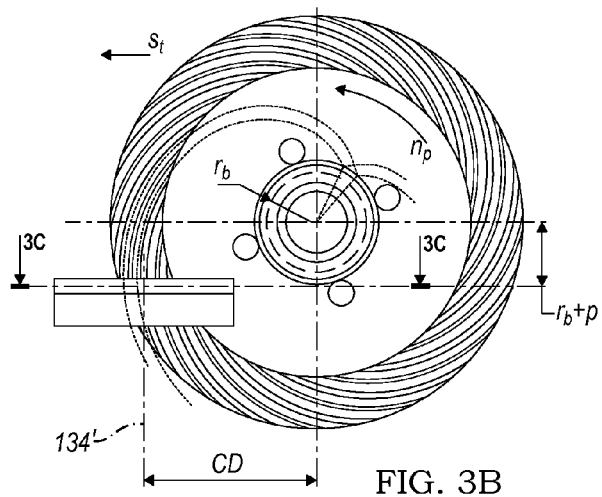
Figure 3A:
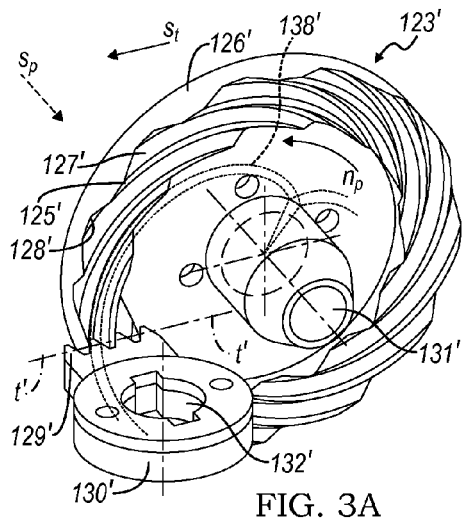
Figure 3C:
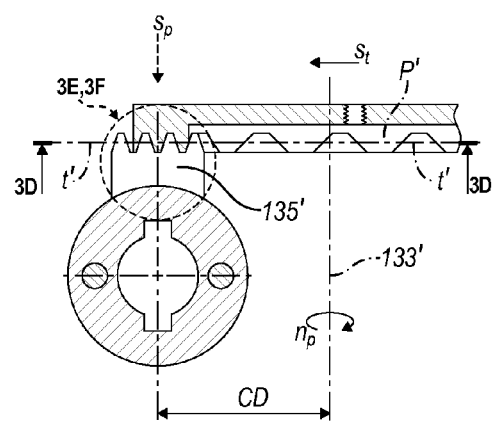
Figure 3E:
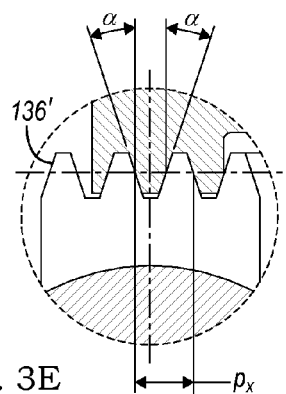
Figure 3F:
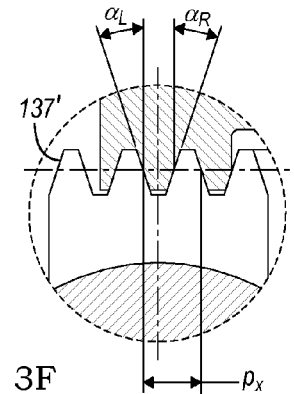
Figure 3J:
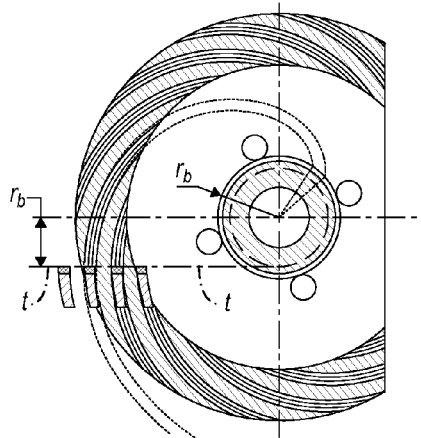
Figure 3H:
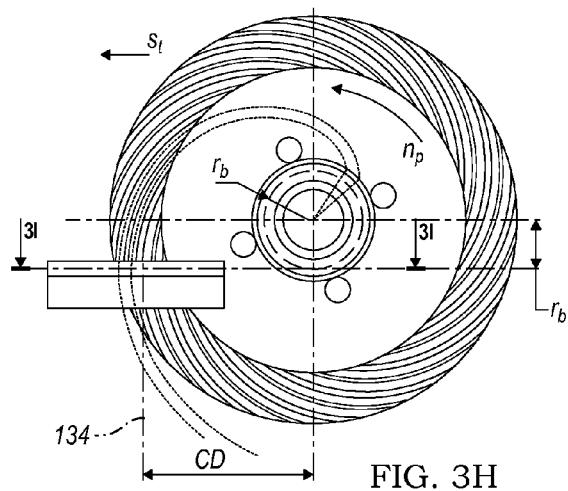
Figure 3G:
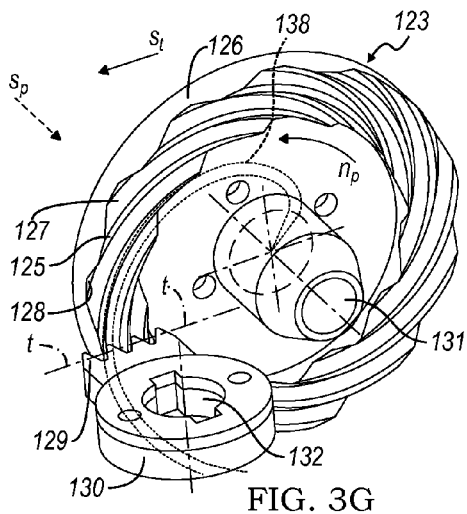
Figure 3I:
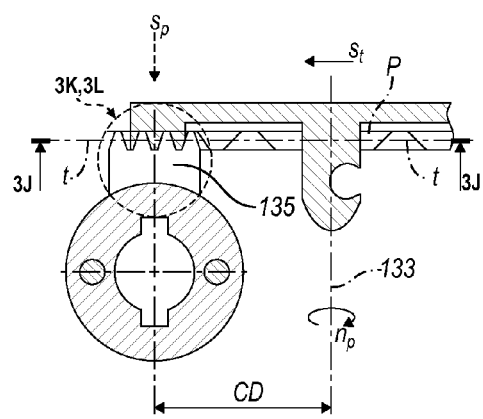
Figure 3K:
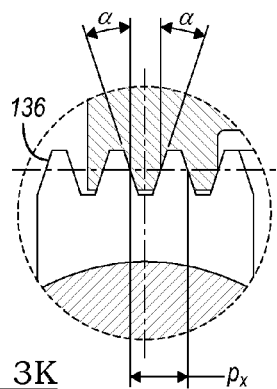
Figure 3L:
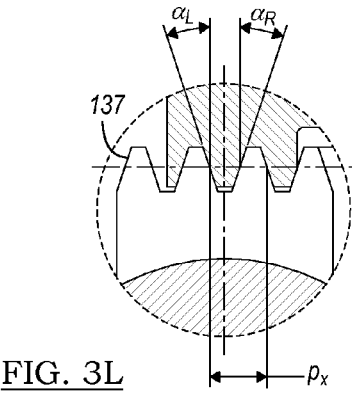
Figure 3P:
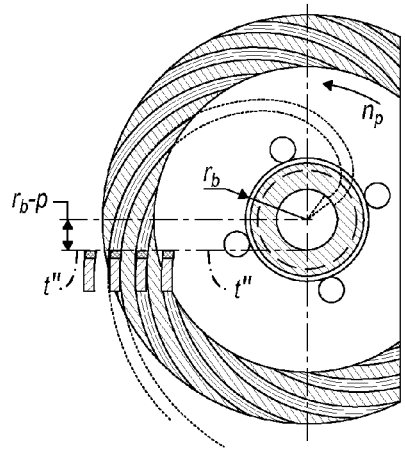
Figure 3N:
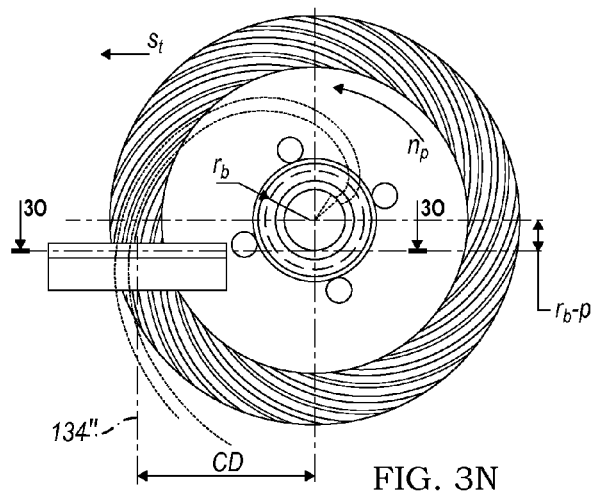
Figure 3M:
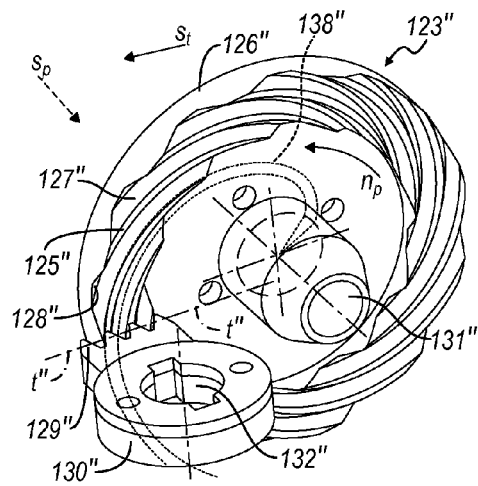
Figure 3O:
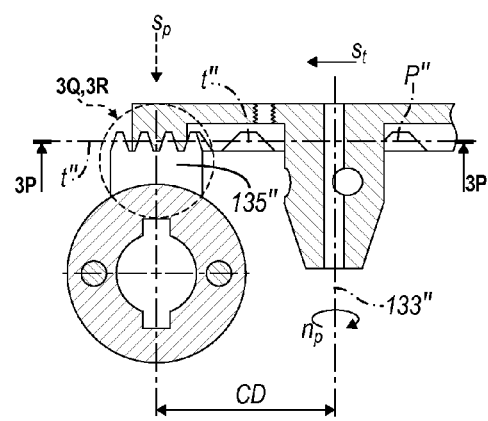
Figure 3Q:
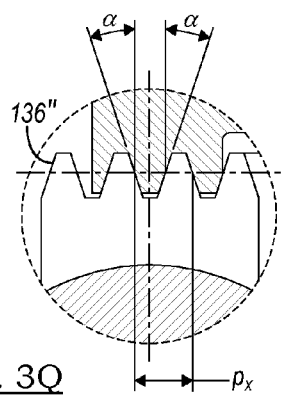
Figure 3R:
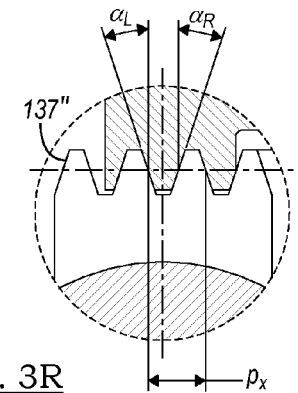
Figure 4A:
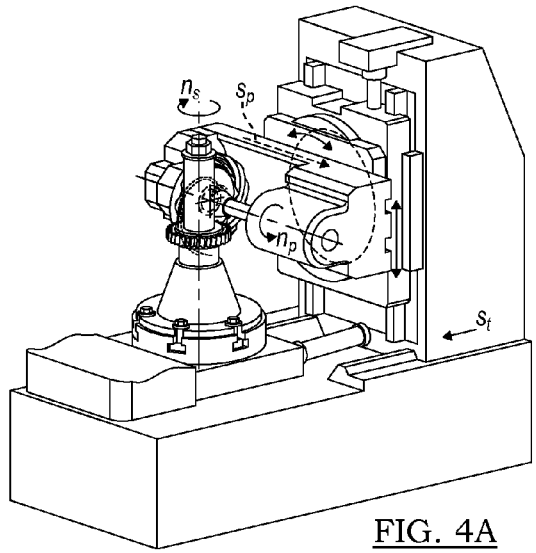
Figure 4C:
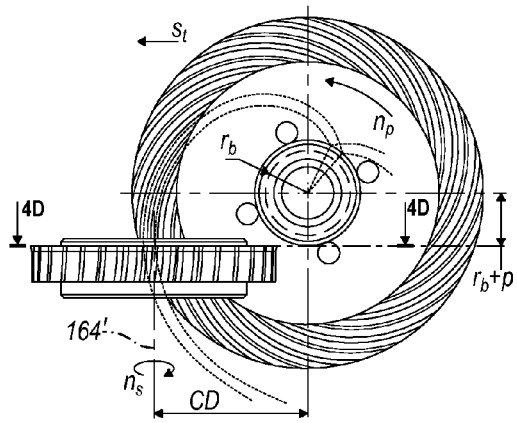
Figure 4B:
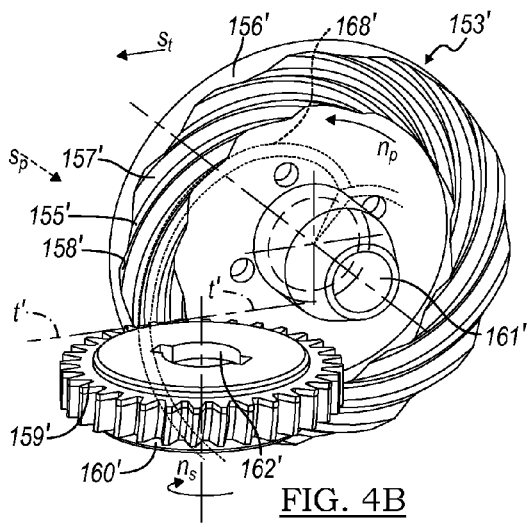
Figure 4D:
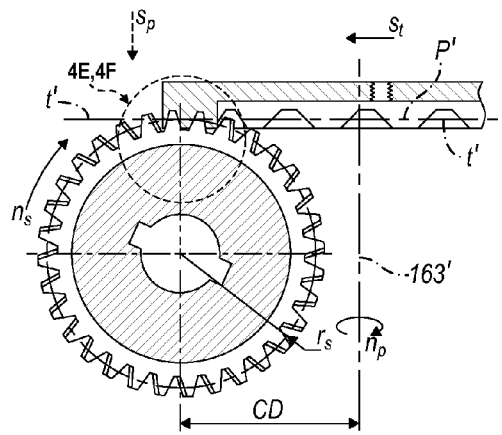
Figure 4E:
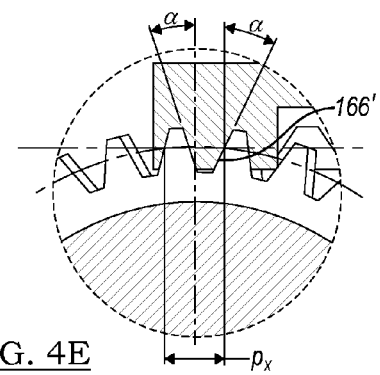
Figure 4F:
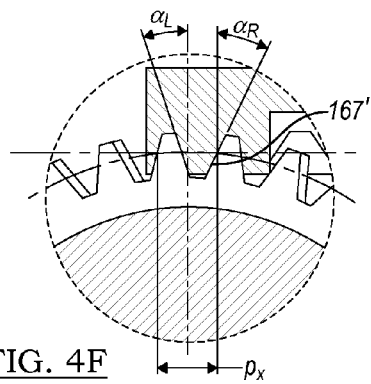
Figure 4G:
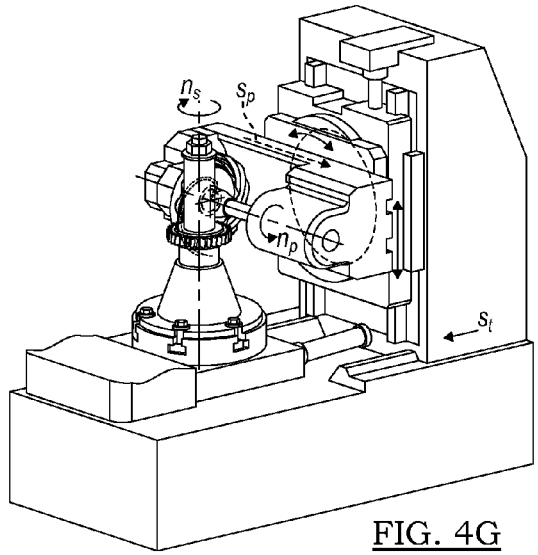
Figure 4I:
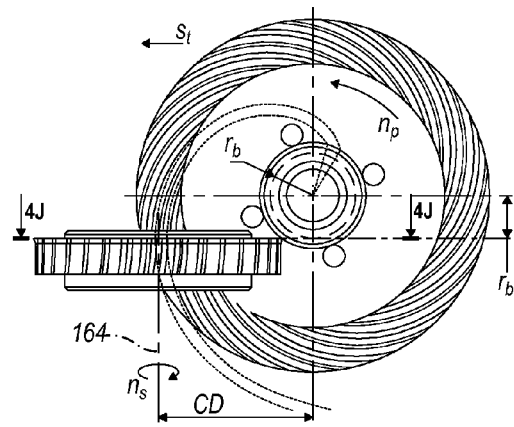
Figure 4H:
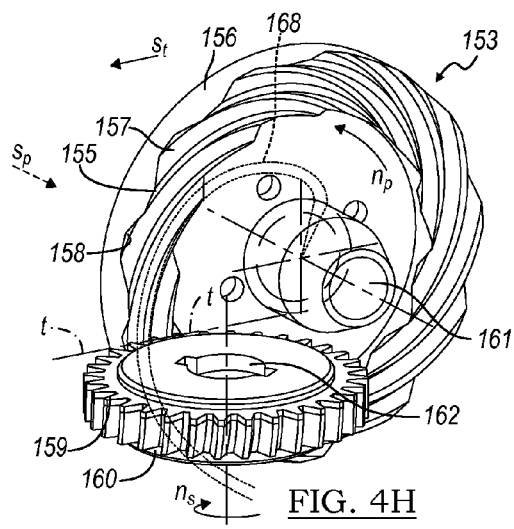
Figure 4J:
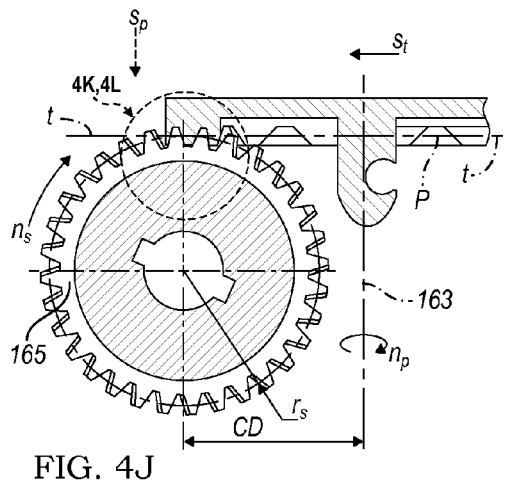
Figure 4K:
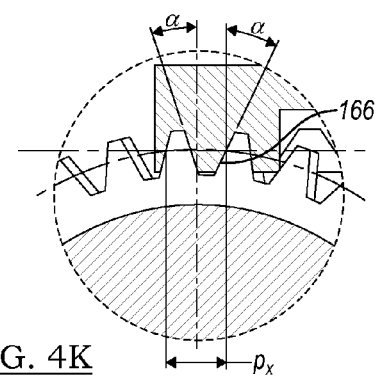
Figure 4L:
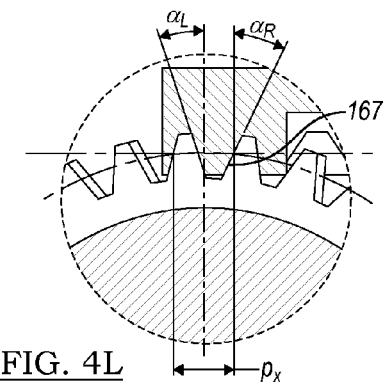
Figure 4M:
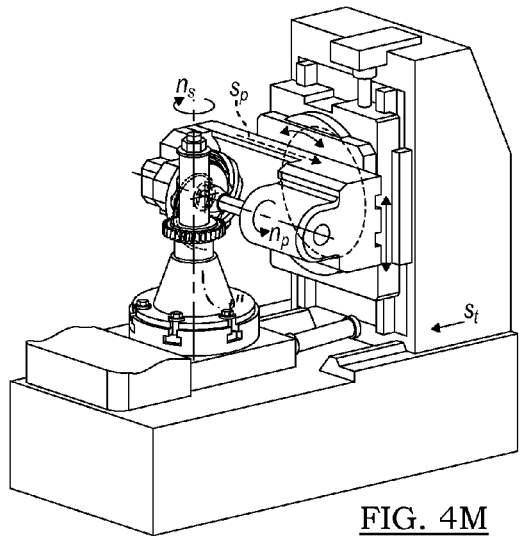
Figure 4O:
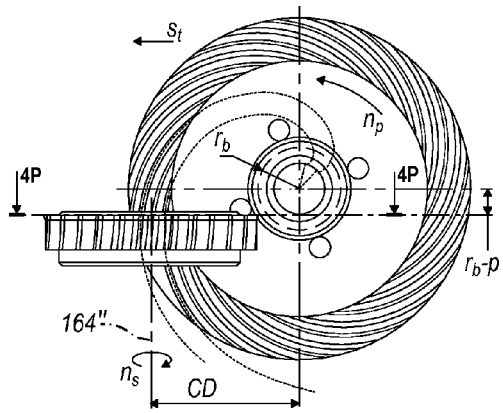
Figure 4N:
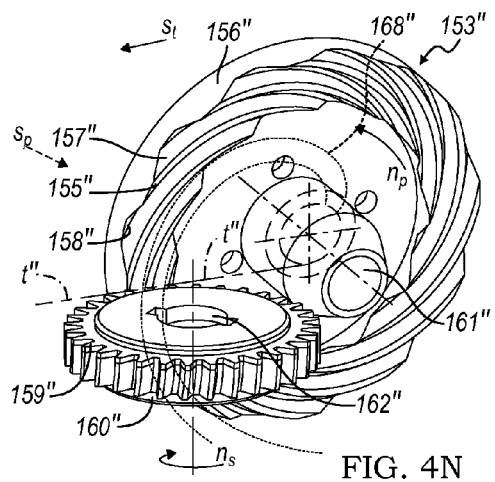
Figure 4P:
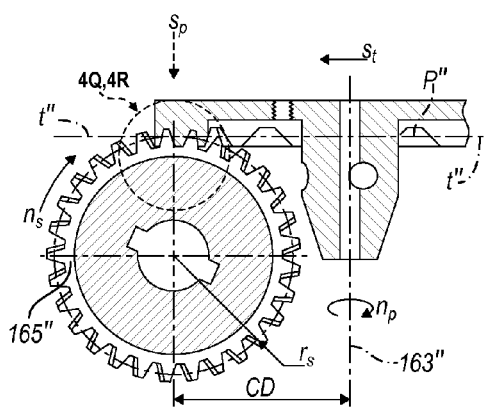
Figure 4Q:
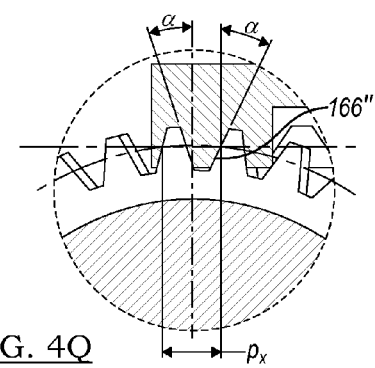
Figure 4R:
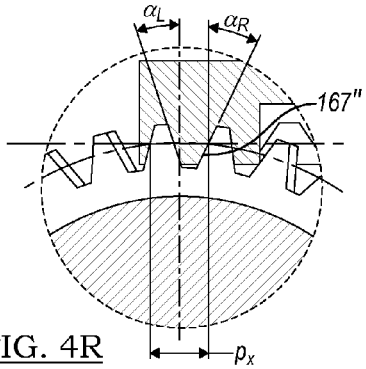
Figure 5:
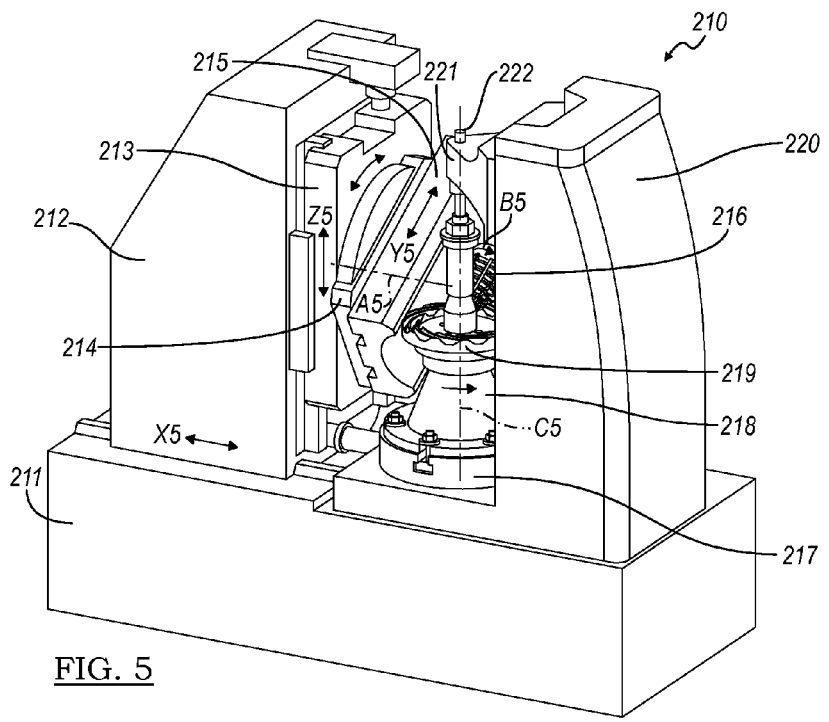
Figure 6:
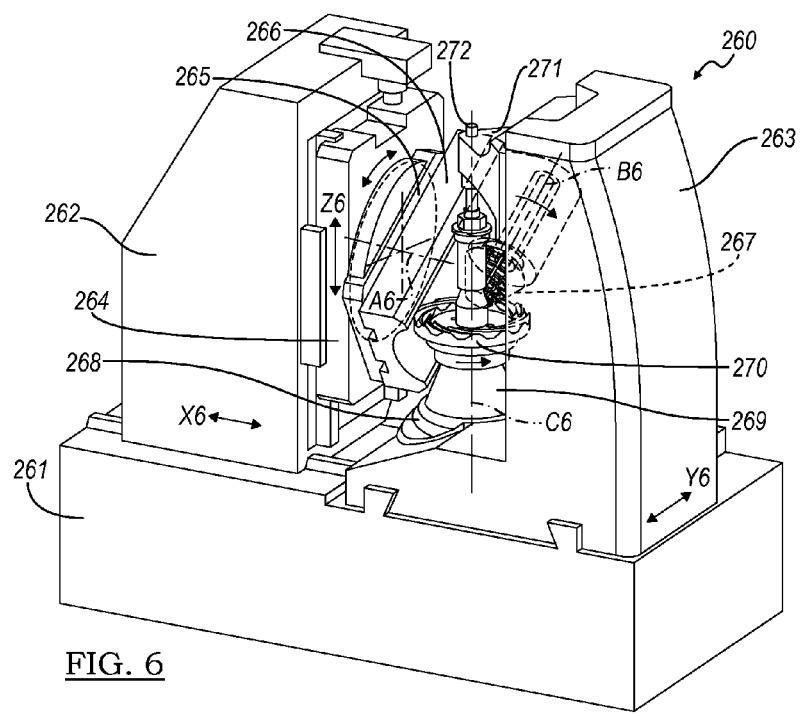
Figure 5A:
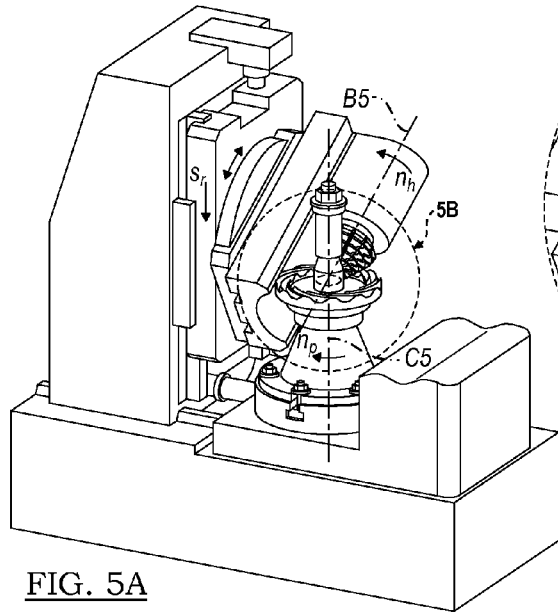
Figure 5B:
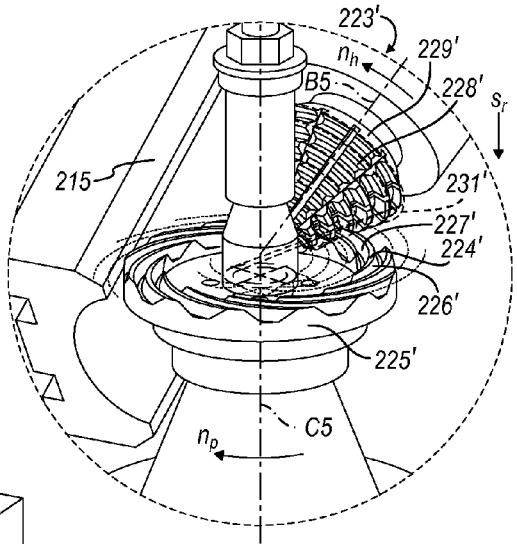
Figure 5G:
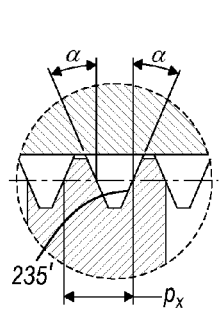
Figure 5D:
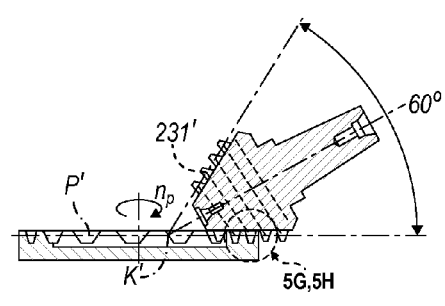
Figure 5H:
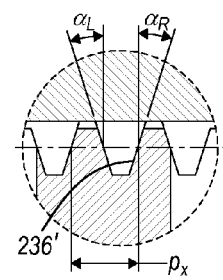
Figure 5E:
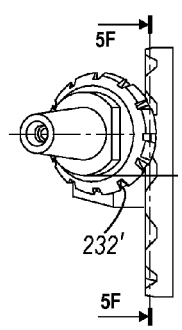
Figure 5C:
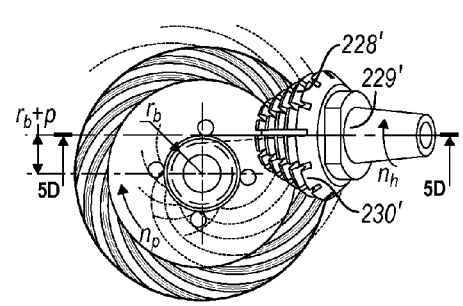
Figure 5F:
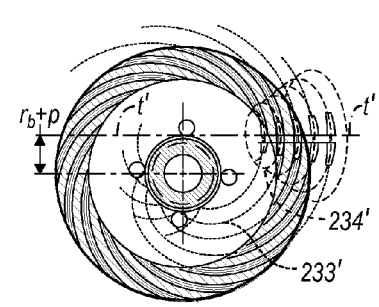
Figure 5I:
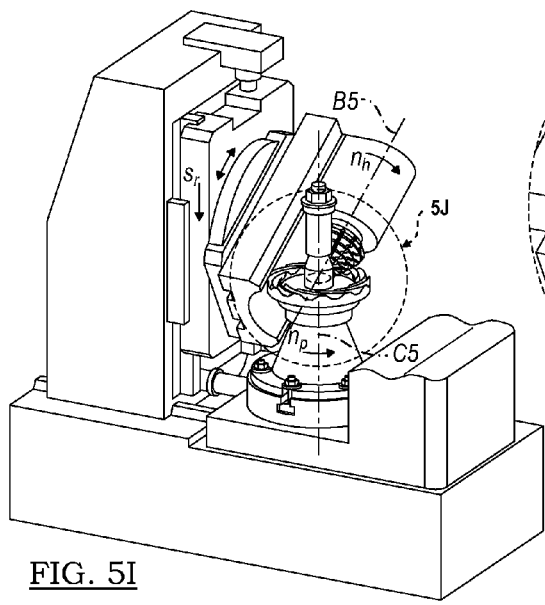
Figure 5J:
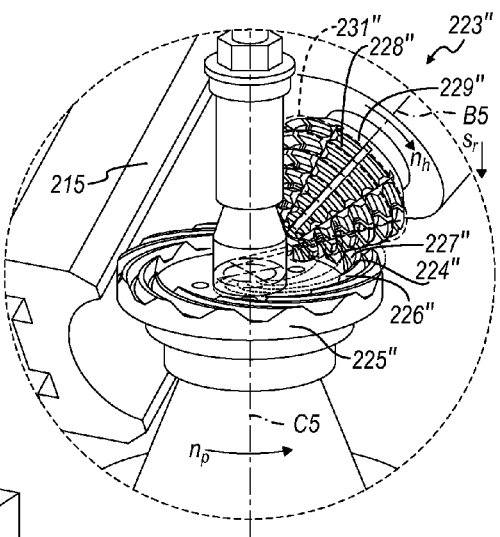
Figure 5O:
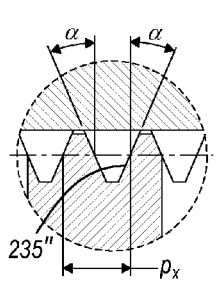
Figure 5L:
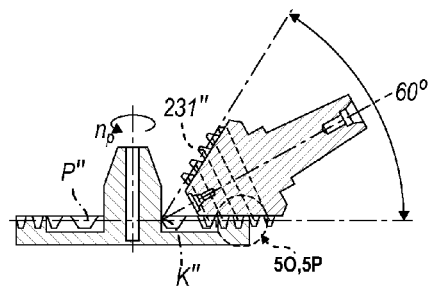
Figure 5P:
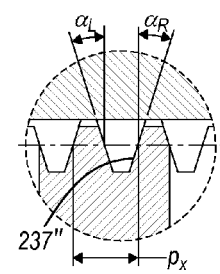
Figure 5M:
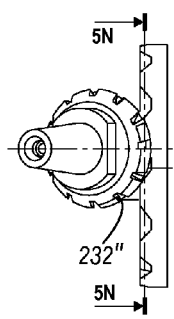
Figure 5K:
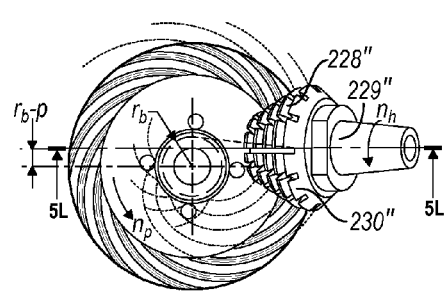
Figure 5N:
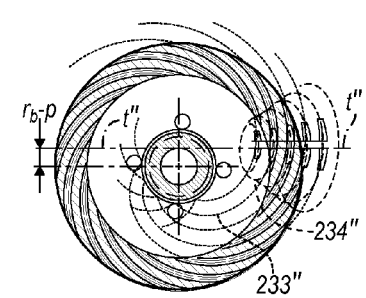

FIG. 1F is another embodiment of the first method of generating the teeth of a double involute pinion according to the present invention, longitudinally curved in form of a shortened involute curve of the face gear circle of radius rb, shown in FIG. 1A, utilizing a one-piece face hob of a specific design, with a radial or a tangential in-feed movement, on the conventional hobbing machine illustrated in FIG. 1;

FIGS. 1G and 1H are enlarged partial details of the cross-sectional view shown in FIG. 1D, illustrating the teeth flanks enveloping process simulation by the tool generating racks edges, of symmetrical and asymmetrical type, respectively, for double involute pinions having the teeth longitudinally curved in form of a shortened involute curve of the face gear circle of radius rb, according to the present invention;

FIG. 1I is a perspective view of a first method of generating the teeth of a double involute pinion according to the present invention, longitudinally curved in form of a normal involute curve of the face gear circle of radius rb, utilizing a built-up face hob of a specific design, with a radial or a tangential in-feed movement, on the conventional hobbing machine illustrated in FIG. 1;

FIG. 1J is a diagrammatic plane top view of the method of generating longitudinally curved teeth of a double involute pinion, as illustrated in FIG. 1I;

FIG. 1K is a diagrammatic cross-sectional view, through the face hob pitch plane, along the line 1K-1K, as illustrated in FIG. 1J;

FIG. 1L is a diagrammatic cross-sectional view, through the plane simultaneously perpendicular to the pinion blank axis and tangent to the face hob circle of radius rb, along the line 1L-1L, as illustrated in FIG. 1K;

FIG. 1M is an enlarged partial detail of the cross-sectional view shown in FIG. 1L;

FIG. 1N is another embodiment of the first method of generating the teeth of a double involute pinion according to the present invention, longitudinally curved in form of a normal involute curve of the face gear circle of radius rb, shown in FIG. 1I, utilizing a one-piece face hob of a specific design, with a radial or a tangential in-feed movement, on the conventional hobbing machine illustrated in FIG. 1;

FIGS. 1O and 1P are enlarged partial details of the cross-sectional view shown in FIG. 1L, illustrating the teeth flanks enveloping process simulation by the tool generating racks edges, of symmetrical and asymmetrical type, respectively, for double involute pinions having the teeth longitudinally curved in form of a normal involute curve of the face gear circle of radius rb, according to the present invention;

FIG. 1Q is a perspective view of a first method of generating the teeth of a double involute pinion according to the present invention, longitudinally curved in form of an extended involute curve of the face gear circle of radius rb, utilizing a built-up face hob of a specific design, with a radial or a tangential in-feed movement, on the conventional hobbing machine illustrated in FIG. 1;

FIG. 1R is a diagrammatic plane top view of the method of generating longitudinally curved teeth of a double involute pinion, as illustrated in FIG. 1Q;

FIG. 1S is a diagrammatic cross-sectional view, through the face hob pitch plane, along the line 1S-1S, as illustrated in FIG. 1R;

FIG. 1T is a diagrammatic cross-sectional view, through the plane simultaneously perpendicular to the pinion blank axis and tangent to the face hob circle of radius (rb−p), along the line 1T-1T, as illustrated in FIG. 1S;

FIG. 1U is an enlarged partial detail of the cross-sectional view shown in FIG. 1T;

FIG. 1V is another embodiment of the first method of generating the teeth of a double involute pinion according to the present invention, longitudinally curved in form of an extended involute curve of the face gear circle of radius rb, shown in FIG. 1Q, utilizing a one-piece face hob of a specific design, with a radial or a tangential in-feed movement, on the conventional hobbing machine illustrated in FIG. 1;

FIGS. 1W and 1X are enlarged partial details of the cross-sectional view shown in FIG. 1T, illustrating the teeth flanks enveloping process simulation by the tool generating racks edges, of symmetrical and asymmetrical type, respectively, for double involute pinions having the teeth longitudinally curved in shape of an extended involute curve of the face gear circle of radius rb, according to the present invention;

FIG. 2 is a diagrammatic view of a 6-axis CNC hobbing machine suitable for generating the teeth of double involute pinions according to the present invention, longitudinally curved in form of a shortened or an extended involute curve of the face gear circle of radius rb, respectively, utilizing a generic conical hob mounted in the machine cutting head;

FIG. 2A is a partial perspective view of the 6-axis CNC hobbing machine illustrated in FIG. 2, suitable for generation the teeth of double involute pinions according to the present invention, longitudinally curved in form of a shortened involute curve of the face gear circle of radius rb, utilizing a conical hob of a specific design;

FIG. 2B is an enlarged partial detail view of the second method of generating the teeth of a double involute pinion according to the present invention, longitudinally curved in form of a shortened involute curve of the face gear circle of radius rb, utilizing a one-piece or a built-up conical hob of a specific design, mounted in the 6-axis CNC hobbing machine cutting head illustrated in FIG. 2A, with a tangential plunging in-feed movement;

FIG. 2C is a diagrammatic plane top view of the second method of generating longitudinally curved teeth of a double involute pinion, as illustrated in FIG. 2B;

FIG. 2D is a diagrammatic partial cross-sectional view, through the face gear pitch plane and conical hob pitch cone generatrix, along the line 2D-2D, as illustrated in FIG. 2B;

FIG. 2E is a diagrammatic side view of the second method of generating longitudinally curved teeth of a double involute pinion, as illustrated in FIG. 2C;

FIG. 2F is a diagrammatic cross-sectional view, through the conical hob axial plane, along the line 2F-2F, as illustrated in FIG. 2E;

FIGS. 2G and 2H are enlarged partial details of the cross-sectional view shown in FIG. 2F, illustrating the intermesh between the teeth already cut and the tool axial generating racks, of symmetrical and asymmetrical type, respectively, of double involute pinions having the teeth longitudinally curved in form of a shortened involute curve of the face gear circle of radius rb, according to the present invention;

FIG. 2I is a diagrammatic side view of the initial manufacturing position of the tool relative to both, the pinion blank and, theoretical face gear circle of radius (rb+p) from its pitch plane, respectively, according to present invention second method of generating longitudinally curved teeth of a double involute pinion, in form of a shortened involute curve of the face gear circle of radius rb, as illustrated in FIG. 2D;

FIG. 2J is a diagrammatic top view of the initial manufacturing position of the tool relative to both, the pinion blank and, theoretical face gear circle of radius (rb+p) from its pitch plane, respectively, as illustrated in FIG. 2I;

FIG. 2K is a diagrammatic side view of the final manufacturing position of the tool relative to both, the pinion blank and, theoretical face gear circle of radius (rb+p) from its pitch plane, respectively, according to present invention second method of generating longitudinally curved teeth of a double involute pinion, in form of a shortened involute curve of the face gear circle of radius rb, as illustrated in FIG. 2D;

FIG. 2L is a diagrammatic top view of the final manufacturing position of the tool relative to both, the pinion blank and, theoretical face gear circle of radius (rb+p) from its pitch plane, respectively, as illustrated in FIG. 2K;

FIG. 2M is a partial perspective view of the 6-axis CNC hobbing machine illustrated in FIG. 2, suitable for generation the teeth of double involute pinions according to the present invention, longitudinally curved in form of an extended involute curve of the face gear circle of radius rb, utilizing a conical hob of a specific design;

FIG. 2N is an enlarged partial detail view of the second method of generating the teeth of a double involute pinion according to the present invention, longitudinally curved in form of an extended involute curve of the face gear circle of radius rb, utilizing a one-piece or a built-up conical hob of a specific design, mounted in the 6-axis CNC hobbing machine cutting head illustrated in FIG. 2M, with a tangential plunging in-feed movement;

FIG. 2O is a diagrammatic plane top view of the second method of generating longitudinally curved teeth of a double involute pinion, as illustrated in FIG. 2N;

FIG. 2P is a diagrammatic partial cross-sectional view, through the face gear pitch plane and conical hob pitch cone generatrix, along the line 2P-2P, as illustrated in FIG. 2N;

FIG. 2Q is a diagrammatic side view of the second method of generating longitudinally curved teeth of a double involute pinion, as illustrated in FIG. 2O;

FIG. 2R is a diagrammatic cross-sectional view, through the conical hob axial plane, along the line 2R-2R, as illustrated in FIG. 2Q;

FIGS. 2S and 2T are enlarged partial details of the cross-sectional view shown in FIG. 2R, illustrating the intermesh between the teeth already cut and the tool axial generating racks, of symmetrical and asymmetrical type, respectively, of double involute pinions having the teeth longitudinally curved in form of an extended involute curve of the face gear circle of radius rb, according to the present invention;

FIG. 2U is a diagrammatic side view of the initial manufacturing position of the tool relative to both, the pinion blank and theoretical face gear circle of radius (rb−p) from its pitch plane, respectively, according to present invention second method of generating longitudinally curved teeth of a double involute pinion, in form of an extended involute curve of the face gear circle of radius rb, as illustrated in FIG. 2P;

FIG. 2V is a diagrammatic top view of the initial manufacturing position of the tool relative to both, the pinion blank and theoretical face gear circle of radius (rb−p) from its pitch plane, respectively, as illustrated in FIG. 2U;

FIG. 2W is a diagrammatic side view of the final manufacturing position of the tool relative to both, the pinion blank and theoretical face gear circle of radius (rb−p) from its pitch plane, respectively, according to present invention second method of generating longitudinally curved teeth of a double involute pinion, in form of an extended involute curve of the face gear circle of radius rb, as illustrated in FIG. 2P;

FIG. 2X is a diagrammatic top view of the final manufacturing position of the tool relative to both, the pinion blank and theoretical face gear circle of radius (rb−p) from its pitch plane, respectively, as illustrated in FIG. 2W;

FIG. 3 is a diagrammatic view of a conventional hobbing machine suitable for generating the teeth of face gears according to the present invention, longitudinally curved in form of a shortened, a normal or an extended involute curve of the face gear circle of radius rb, respectively, utilizing a rack cutter mounted on the machine supporting spindle, with a tangential in-feed movement;

FIG. 3A is a perspective view of a first method of generating the teeth of face gears according to the present invention, longitudinally curved in form of a shortened involute curve of the face gear circle of radius rb, utilizing a one-piece or a built-up rack cutter of a specific design, with a tangential in-feed movement, on the conventional hobbing machine illustrated in FIG. 3;

FIG. 3B is a diagrammatic front view of the method of generating longitudinally curved teeth of a double involute pinion, with the rack cutter placed at the right gear drive center distance CD, as illustrated in FIG. 3A;

FIG. 3C is a diagrammatic cross-sectional view, through the plane simultaneously perpendicular to the rack cutter axis and tangent to the face gear blank circle of radius (rb+p), along the line 3C-3C, as illustrated in FIG. 3B;

FIG. 3D is a diagrammatic cross-sectional view, through the face gear pitch plane perpendicular to the face gear blank axis and tangent to the rack cutter pitch line, along the line 3D-3D, as illustrated in FIG. 3C;

FIGS. 3E and 3F are enlarged partial details of the cross-sectional view shown in FIG. 3C, illustrating the intermesh between the face gear teeth already cut and the tool generating racks of constant pitch and of symmetrical and asymmetrical type, respectively, for a face gear having the teeth longitudinally curved in form of a shortened involute curve of the face gear circle of radius rb, according to the present invention;

FIG. 3G is a perspective view of a first method of generating the teeth of face gears according to the present invention, longitudinally curved in form of a normal involute curve of the face gear circle of radius rb, utilizing a one-piece or a built-up rack cutter of a specific design, with a tangential in-feed movement, on the conventional hobbing machine illustrated in FIG. 3;

FIG. 3H is a diagrammatic front view of the method of generating longitudinally curved teeth of a double involute pinion, with the rack cutter placed at the right gear drive center distance CD, as illustrated in FIG. 3G;

FIG. 3I is a diagrammatic cross-sectional view, through the plane simultaneously perpendicular to the rack cutter axis and tangent to the face gear blank circle of radius rb, along the line 3I-3I, as illustrated in FIG. 3H;

FIG. 3J is a diagrammatic cross-sectional view, through the face gear pitch plane perpendicular to the face gear blank axis and tangent to the rack cutter pitch line, along the line 3J-3J, as illustrated in FIG. 3I;

FIGS. 3K and 3L are enlarged partial details of the cross-sectional view shown in FIG. 3I, illustrating the intermesh between the face gear teeth already cut and the tool generating racks of constant pitch and of symmetrical and asymmetrical type, respectively, for a face gear having the teeth longitudinally curved in form of a normal involute curve of the face gear circle of radius rb, according to the present invention;

FIG. 3M is a perspective view of a first method of generating the teeth of face gears according to the present invention, longitudinally curved in form of an extended involute curve of the face gear circle of radius rb, utilizing a one-piece or a built-up rack cutter of a specific design, with a tangential in-feed movement, on the conventional hobbing machine illustrated in FIG. 3;

FIG. 3N is a diagrammatic front view of the method of generating longitudinally curved teeth of a double involute pinion, with the rack cutter placed at the right gear drive center distance CD, as illustrated in FIG. 3M;

FIG. 3O is a diagrammatic cross-sectional view, through the plane simultaneously perpendicular to the rack cutter axis and tangent to the face gear blank circle of radius (rb−p), along the line 3O-3O, as illustrated in FIG. 3N;

FIG. 3P is a diagrammatic cross-sectional view, through the face gear pitch plane perpendicular to the face gear blank axis and tangent to the rack cutter pitch line, along the line 3P-3P, as illustrated in FIG. 3O;

FIGS. 3Q and 3R are enlarged partial details of the cross-sectional view shown in FIG. 3O, illustrating the intermesh between the face gear teeth already cut and the tool generating racks of constant pitch and of symmetrical and asymmetrical type, respectively, for a face gear having the teeth longitudinally curved in form of an extended involute curve of the face gear circle of radius rb, according to the present invention;

FIG. 4 is a diagrammatic view of a conventional hobbing machine suitable for generating the teeth of face gears according to the present invention, longitudinally curved in form of a shortened, a normal or an extended involute curve of the face gear circle of radius rb, respectively, utilizing a rotary shaper cutter mounted on the machine supporting spindle, with a tangential in-feed movement;

FIG. 4A is a partial perspective view of the conventional hobbing machine illustrated in FIG. 4, suitable for generation the teeth of face gears according to the present invention, longitudinally curved in form of a shortened involute curve of the face gear circle of radius rb, utilizing a rotary shaper cutter of a specific design;

FIG. 4B is a perspective view of a second method of generating the teeth of face gears according to the present invention, longitudinally curved in form of a shortened involute curve of the face gear circle of radius rb, utilizing a one-piece or a built-up shaper cutter of a specific design, with a tangential in-feed movement, on the conventional hobbing machine illustrated in FIG. 4A;

FIG. 4C is a diagrammatic front view of the method of generating longitudinally curved teeth of a face gear, with the shaper cutter placed at the right gear drive center distance CD, as illustrated in FIG. 4B;

FIG. 4D is a diagrammatic cross-sectional view, through the plane simultaneously perpendicular to the shaper cutter axis and tangent to the face gear blank circle of radius (rb+p), along the line 4D-4D, as illustrated in FIG. 4C;

FIGS. 4E and 4F are enlarged partial details of the cross-sectional view shown in FIG. 4D, illustrating the intermesh between the face gear teeth already cut and the tool generating teeth of constant pitch and of symmetrical and asymmetrical type, for a face gear having the teeth longitudinally curved in form of a shortened involute curve of the face gear circle of radius rb, according to the present invention;

FIG. 4G is a partial perspective view of the conventional hobbing machine illustrated in FIG. 4, suitable for generation the teeth of face gears according to the present invention, longitudinally curved in form of a normal involute curve of the face gear circle of radius rb, utilizing a rotary shaper cutter of a specific design;

FIG. 4H is a perspective view of a second method of generating the teeth of face gears according to the present invention, longitudinally curved in form of a normal involute curve of the face gear circle of radius rb, utilizing a one-piece or a built-up shaper cutter of a specific design, with a tangential in-feed movement, on the conventional hobbing machine illustrated in FIG. 4G;

FIG. 4I is a diagrammatic front view of the method of generating longitudinally curved teeth of a face gear, with the shaper cutter placed at the right gear drive center distance CD, as illustrated in FIG. 4H;

FIG. 4J is a diagrammatic cross-sectional view, through the plane simultaneously perpendicular to the shaper cutter axis and tangent to the face gear blank circle of radius rb, along the line 4J-4J, as illustrated in FIG. 4I;

FIGS. 4K and 4L are enlarged partial details of the cross-sectional view shown in FIG. 4J, illustrating the intermesh between the face gear teeth already cut and the tool generating teeth, respectively, for a face gear having the teeth longitudinally curved in form of a normal involute curve of the face gear circle of radius rb, according to the present invention;

FIG. 4M is a partial perspective view of the conventional hobbing machine illustrated in FIG. 4, suitable for generation the teeth of face gears according to the present invention, longitudinally curved in form of an extended involute curve of the face gear circle of radius rb, utilizing a rotary shaper cutter of a specific design;

FIG. 4N is a perspective view of a second method of generating the teeth of face gears according to the present invention, longitudinally curved in form of an extended involute curve of the face gear circle of radius rb, utilizing a one-piece or a built-up shaper cutter of a specific design, with a tangential in-feed movement, on the conventional hobbing machine illustrated in FIG. 4M;

FIG. 4O is a diagrammatic front view of the method of generating longitudinally curved teeth of a face gear, with the shaper cutter placed at the right gear drive center distance CD, as illustrated in FIG. 4N;

FIG. 4P is a diagrammatic cross-sectional view, through the plane simultaneously perpendicular to the shaper cutter axis and tangent to the face gear blank circle of radius (rb−p), along the line 4P-4P, as illustrated in FIG. 4O;

FIGS. 4Q and 4R are enlarged partial details of the cross-sectional view shown in FIG. 4P, illustrating the intermesh between the face gear teeth already cut and the tool generating teeth, respectively, for a face gear having the teeth longitudinally curved in form of an extended involute curve of the face gear circle of radius rb, according to the present invention;

FIG. 5 is a diagrammatic view of a conventional hobbing machine suitable for generating the teeth of face gears according to the present invention, longitudinally curved in form of a shortened or an extended involute curve of the face gear circle of radius rb, respectively, utilizing a conical hob mounted on the machine cutting head, with a radial in-feed movement;

FIG. 5A is a partial perspective view of the conventional hobbing machine illustrated in FIG. 5, suitable for generation the teeth of face gears according to the present invention, longitudinally curved in form of a shortened involute curve of the face gear circle of radius rb, utilizing a conical hob of a specific design;

FIG. 5B is an enlarged partial detail view of a third method of generating the teeth of a face gear according to the present invention, longitudinally curved in form of a shortened involute curve of the face gear circle of radius rb, utilizing a one-piece or a built-up conical hob of a specific design, mounted in the conventional hobbing machine cutting head illustrated in FIG. 5A, with a radial in-feed movement;

FIG. 5C is a diagrammatic plane top view of the third method of generating longitudinally curved teeth of a face gear, as illustrated in FIG. 5B;

FIG. 5D is a diagrammatic cross-sectional view, through the conical hob axial plane, along the line 5D-5D tangent to the face gear blank circle of radius (rb+p), as illustrated in FIG. 5C;

FIG. 5E is a diagrammatic side view of the third method of generating longitudinally curved teeth of a face gear, as illustrated in FIG. 5C;

FIG. 5F is a diagrammatic cross-sectional view, through the face gear blank pitch plane, and tangent to the conical hob pitch cone, as illustrated in FIG. 5E;

FIGS. 5G and 5H are enlarged partial details of the cross-sectional view shown in FIG. 5D, illustrating the intermesh between the teeth already cut and the tool axial generating racks, of symmetrical and asymmetrical type, respectively, of face gears having the teeth longitudinally curved in form of a shortened involute curve of the face gear circle of radius rb, according to the present invention;

FIG. 5I is a partial perspective view of the conventional hobbing machine illustrated in FIG. 5A, suitable for generation the teeth of face gears according to the present invention, longitudinally curved in form of an extended involute curve of the face gear circle of radius rb, utilizing a conical hob of a specific design;

FIG. 5J is an enlarged partial detail view of a third method of generating the teeth of a face gear according to the present invention, longitudinally curved in form of an extended involute curve of the face gear circle of radius rb, utilizing a one-piece or a built-up conical hob of a specific design, mounted in the conventional hobbing machine cutting head illustrated in FIG. 5I, with a radial in-feed movement;

FIG. 5K is a diagrammatic plane top view of the third method of generating longitudinally curved teeth of a face gear, as illustrated in FIG. 5J;

FIG. 5L is a diagrammatic cross-sectional view, through the conical hob axial plane, along the line 5L-5L tangent to the face gear blank circle of radius (rb−p), as illustrated in FIG. 5K;

FIG. 5M is a diagrammatic side view of the third method of generating longitudinally curved teeth of a face gear, as illustrated in FIG. 5K;

FIG. 5N is a diagrammatic cross-sectional view, through the face gear blank pitch plane, and tangent to the conical hob pitch cone, as illustrated in FIG. 5M;

FIGS. 5O and 5P are enlarged partial details of the cross-sectional view shown in FIG. 5L, illustrating the intermesh between the teeth already cut and the tool axial generating racks, of symmetrical and asymmetrical type, respectively, of face gears having the teeth longitudinally curved in form of an extended involute curve of the face gear circle of radius rb, according to the present invention;

FIG. 6 is a diagrammatic view of a 6-axis CNC hobbing machine suitable for generating the teeth of face gears according to the present invention, longitudinally curved in form of a shortened or an extended involute curve of the face gear circle of radius rb, respectively, utilizing a conical hob mounted on the machine cutting head, with a tangential in-feed movement;

FIG. 6A is a partial perspective view of the 6-axis CNC hobbing machine illustrated in FIG. 6, suitable for generation the teeth of face gears according to the present invention, longitudinally curved in form of a shortened involute curve of the face gear circle of radius rb, utilizing a conical hob of a specific design;

FIG. 6B is an enlarged partial detail view of a third method of generating the teeth of a face gear according to the present invention, longitudinally curved in form of a shortened involute curve of the face gear circle of radius rb, utilizing a one-piece or a built-up conical hob of a specific design, mounted in the 6-axis CNC hobbing machine cutting head illustrated in FIG. 6A, with a tangential in-feed movement;

FIG. 6C is a diagrammatic plane top view of the third method of generating longitudinally curved teeth of a face gear, as illustrated in FIG. 6B;

FIG. 6D is a diagrammatic cross-sectional view, through the conical hob axial plane, along the line 6D-6D tangent to the face gear blank circle of radius (rb+p), as illustrated in FIG. 6C;

FIG. 6E is a diagrammatic side view of the third method of generating longitudinally curved teeth of a face gear, as illustrated in FIG. 6C;

FIG. 6F is a diagrammatic cross-sectional view, through the face gear blank pitch plane, and tangent to the conical hob pitch cone, as illustrated in FIG. 6E;

FIGS. 6G and 6H are enlarged partial details of the cross-sectional view shown in FIG. 6D, illustrating the intermesh between the teeth already cut and the tool axial generating racks, of symmetrical and asymmetrical type, respectively, of face gears having the teeth longitudinally curved in form of a shortened involute curve of the face gear circle of radius rb, according to the present invention;

FIG. 6I is a partial perspective view of the 6-axis CNC hobbing machine illustrated in FIG. 6, suitable for generation the teeth of face gears according to the present invention, longitudinally curved in form of an extended involute curve of the face gear circle of radius rb, utilizing a conical hob of a specific design;

FIG. 6J is an enlarged partial detail view of a third method of generating the teeth of a face gear according to the present invention, longitudinally curved in form of an extended involute curve of the face gear circle of radius rb, utilizing a one-piece or a built-up conical hob of a specific design, mounted in the 6-axis CNC hobbing machine cutting head illustrated in FIG. 6I, with a tangential in-feed movement;

FIG. 6K is a diagrammatic plane top view of the third method of generating longitudinally curved teeth of a face gear, as illustrated in FIG. 6J;

FIG. 6L is a diagrammatic cross-sectional view, through the conical hob axial plane, along the line 6L-6L tangent to the face gear blank circle of radius (rb–p), as illustrated in FIG. 6K;

FIG. 6M is a diagrammatic side view of the third method of generating longitudinally curved teeth of a face gear, as illustrated in FIG. 6K;

FIG. 6N is a diagrammatic cross-sectional view, through the face gear blank pitch plane, and tangent to the conical hob pitch cone, as illustrated in FIG. 6M;

FIGS. 6O and 6P are enlarged partial details of the cross-sectional view shown in FIG. 6L, illustrating the intermesh between the teeth already cut and the tool axial generating racks, of symmetrical and asymmetrical type, respectively, of face gears having the teeth longitudinally curved in form of an extended involute curve of the face gear circle of radius rb, according to the present invention;

DETAILED DESCRIPTION

The following description is merely exemplary in nature and is not intended to limit the present disclosure, application, or uses.

FIG. 1 shows a schematic diagram of a conventional hobbing machine 10, suitable for generating of longitudinally curved teeth of double involute pinions according to the present invention. It has a base 11 comprised of a table bottom part and a stand bottom part on which a radial carriage 12 is sliding in direction X1. The radial carriage 12 carries a vertical slide 13, which is movable in direction Z1. An angularly adjustable table 14, which is pivotable around its axis of rotation A1 is situated on the vertical slide 13, and carries a cutting head 15, displaceable in direction Y1. The sliding head 15 carries a corresponding generic cutting tool 16, with a corresponding drive with which the tool is rotatable about the axis B1. The base 11 table bottom part carries a table 17, rotatable about the axis C1, on which the supporting spindle 18, of the double involute pinion generic blank 19 is fixed. The base 11 table bottom part carries also a column 20 fixed thereto having a vertically adjustable arm 21 thereon supporting a member 22 which provides an outboard support for the work supporting spindle 18. The axis of the member 22 is accurately coaxially aligned with the axis C1 of the rotatable table 17.

With reference to FIGS. 1A through 1H, a first method of generating the teeth of a double involute pinion according to the present invention, longitudinally curved in form of a shortened involute curve of the face gear circle of radius rb, utilizing a rotating built-up face hob or a rotating one-piece face hob, on a conventional hobbing machine 10 shown in FIG. 1, is illustrated and generally designated by the reference numbers 23' and 24', respectively. According to the first method 23', the longitudinally curved teeth 25' of the double involute pinion blank 26', having the active surfaces 27' and 28' of convex and respectively, concave nature are machined in a continuous generating process, using a radial or a tangential in-feed movement, as envelopes to the family of cutting edges of the teeth of a plurality of rack cutter inserts 29' (in this embodiment a series of eight inserts are considered), mounted on a rotating built-up face hob body 30', as illustrated in FIG. 1A. Through its aperture journal 31', the face hob body 30' is placed and secured on the cutting head 15 spindle, rotatable around the axis B1 of the hobbing machine, in the position of generic cutting tool 16, shown in FIG. 1. It should be noted that the built-up face hob has the same axis of rotation as the face gear whose teeth will mesh with the teeth of the double involute pinion to be cut. The double pinion blank 26' is placed and secured through its bore journal 32' on the blank supporting spindle 18, rotatable around the axis C1 of the hobbing machine, in the position of the generic blank to be machined 19, as depicted also in FIG. 1. As illustrated in FIGS. 1B and 1C, the axes 33' and 34' of the built-up face hob and of the double involute pinion blank 26', respectively, are positioned in space, orthogonally off-set relative to each other, at the gear drive given centre distance CD. In its start machining position, the tool is not in engagement with the double involute pinion blank, while in its final machining position, illustrated for reference in FIG. 1B, the face hob pitch plane P', perpendicular to its axis of rotation 33' along the line 1C-1C, is tangent to the double involute pinion pitch cylinder of radius rp. FIGS. 1C through 1E illustrate the construction of the built-up face hob cutting tool. The plurality of equi-spaced rack cutter inserts 29' are mounted on the tool body 30' through a series of screws 35' such that the inserts cutting teeth 36' are projecting from the plane face 37' of the face hob body 30'. The teeth 36' of the rack cutter insert 29' have the rake surface 38' in form of a plane at a certain rake angle $\gamma_o$, whose value could be positive, negative, or even equal to zero, as shown in the embodiment presented in FIG. 1D, with respect to the perpendicular plan to the top land of the rack cutter teeth generating surface. The particularity of the tool consists in the arrangement of the rack cutter inserts 29' on the built-up face hob body such that their lines t' of intersection between the tool pitch plane P' and the teeth rake plane 38' are placed tangent to the tool circle of radius (rb–Fp), where rb is the face gear base circle radius and p is the modified involute curve polar subnormal. In addition, the rack cutter inserts are set at progressive positions along the tangent t', such that within the tool pitch plane the rack cutter inserts teeth have their convex and concave generating surfaces traces 39' and 40' following equi-spaced shortened involute curves d' of the face gear circle of radius rb, as shown in FIG. 1C. The top clearance surface 41' of the teeth 36' is shaped also in form of a plane, at a certain clearance angle $\alpha_o$, relative to the rack cutter teeth generating surface, through the top cutting edge of the rack cutter. As depicted in FIG. 1E, the cutting edges 42' of the rack cutter insert teeth of constant pitch $p_x$ result as the lines of intersection of the rack insert teeth generating surfaces by the rake plane. The convex and concave side clearance surfaces 43' and respectively 44', of the rack cutter insert teeth, pass through the cutting edges of both sides of the tooth profile at the desired clearance angles relative to corresponding generating surfaces 39' and respectively 40'. Commonly, the side clearance surfaces are machined on a specific operation, which is often referred to as a tooth relieving operation. It should be emphasized that all cutting edges 42', namely the cutting edges of both sides of the tooth profile of the rack cutter insert as well as the top cutting edges, are considered to be within the corresponding portions of the generating surfaces of the tooth profile of the rack cutter insert. FIG. 1F illustrates another embodiment 24' of the first method 23' shown in FIG. 1A, of generating the teeth of a double involute pinion according to the present invention, longitudinally curved in shape of a shortened involute curve of the face gear circle of radius rb, utilizing a one-piece face hob 45' of a specific design, with a radial or a tangential in-feed movement, on the conventional hobbing machine illustrated in FIG. 1. In this embodiment a series of twelve equi-spaced rack cutters 46' are considered projecting from the plane face 47' of the one-piece face hob body 45'. In this case the rake surface 48' of rack cutters teeth results by crosswise gashing the teeth generating surfaces by a number of twelve equi-spaced straight flutes 49'. The top and side surfaces of the rack cutters teeth are also relieved by means of suitable relieving tools. The rack cutters teeth geometry and position on the one-piece face hob body is similar to geometry and position of the above-described rack cutter inserts teeth on a built-up face hob used for machining longitudinally curved in shape of a shortened involute curve of the face gear circle of radius rb. As illustrated in FIG. 1G, the face hob auxiliary generating rack 50' of constant pitch $p_x$ can be of symmetrical type, case in which both sides of the tooth profile of the rack cutter insert have the same profile angles $\alpha_L = \alpha_R = \alpha$. If the two sides of the tooth profile of the rack cutter insert have different profile angles $\alpha_L$ and $\alpha_R$, on the left and respectively, right side, the face hob auxiliary generating rack 51' of constant pitch $p_x$ is considered of asymmetrical type, as shown in FIG. 1H. Using a face hob having its auxiliary generating rack of symmetrical or asymmetrical type led to machining the double involute pinion longitudinally curved teeth, in shape of a shortened involute curve of the face gear circle of radius rb, of symmetrical or asymmetrical type. After both axes of rotation are being set up orthogonally offset in space relative to each other at the required gear drive centre distance CD, the teeth width middle section plane of the double involute pinion blank is set up offset relative to the face hob axial plan perpendicular to pinion blank axis such that this plan is tangent to the tool base circle of radius $r_b$. When machining the double involute pinion teeth according to the first method 23' and 24', with a radial in-feed, the face hob rotates about its axis of rotation 33' with $n_h$ rotations per minute, while the double involute pinion blank rotates about its axis of rotation 34' with $n_p$ rotations per minute, in the directions shown in FIG. 1A and FIG. 1F, the two rotations being timed correlated. During the timed synchronized rotation of both face hob and double involute pinion blank, the face hob 30' or 45' travels radially toward the pinion blank, from outside of the pinion blank 26' to the full depth of the double involute pinion teeth 25', in the direction parallel to its axis of rotation 33', with a continuous radial in-feed rate $s_r$, defined as mm of radial travel of the tool per one rotation of the double involute pinion blank. It is obvious that the radial in-feed rate $s_r$ of the face hob tool toward the double pinion blank 25' is, in fact, an axial translation of the face hob tool 30' or 45' in the direction parallel to their axes of rotation. In case of using a tangential in-feed, both axes of rotation are being set up orthogonally offset in space relative to each other at a predetermined depth of double involute pinion teeth to be cut, such that teeth width middle section plane is set up tangent to the tool base circle of radius $r_b$. During the timed synchronized rotation of both face hob and double involute pinion blank, the face hob 30' or 45' travels tangentially in the direction of the tangent t'-t' to the face hob circle of radius (rb+p) with a continuous in-feed rate $s_t$, defined as mm of tangential travel of the tool per one rotation of the double involute pinion blank. In this case a proper timed relationship between the tangential in-feed rate $s_t$ and the rotation of the face hob is required. Outside of the continuous tangentially in-feed period of time that allows a certain amount of material stock to be removed, discretely protrusion in-feed motions $s_p$ are necessary to set up the tool progressively from outside of the pinion blank 26' to the full depth of the double involute pinion teeth 25', in the direction parallel to its axis of rotation 33'. It should be understood that the above-noted radial and tangential in-feed movements of the tool could also be achieved by radial and tangential in-feed movements of the double involute pinion blank toward the rotatable face hob tool, if machining is performed on a hobbing machine of a different kinematic design, compared to that illustrated in FIG. 1;

With reference to FIGS. 1I through 1P, a first method of generating the teeth of a double involute pinion according to the present invention, longitudinally curved in form of a normal involute curve of the face gear circle of radius rb, utilizing a rotating built-up face hob or a rotating one-piece face hob, on a conventional hobbing machine 10 shown in FIG. 1, is illustrated and generally designated by the reference numbers 23 and 24, respectively. According to the first method 23, the longitudinally curved teeth 25 of the double involute pinion blank 26, having the active surfaces 27 and 28 of convex and respectively, concave nature are machined in a continuous generating process, using a radial or a tangential in-feed movement, as envelopes to the family of cutting edges of the teeth of a plurality of rack cutter inserts 29 (in this embodiment a series of eight inserts are considered), mounted on a rotating built-up face hob body 30, as illustrated in FIG. 1I. Through its aperture journal 31, the face hob body 30 is placed and secured on the cutting head 15 spindle, rotatable around the axis B1 of the hobbing machine, in the position of generic cutting tool 16 shown in FIG. 1. It should be noted that the built-up face hob has the same axis of rotation as the face gear whose teeth will mesh with the teeth of the double involute pinion to be cut. The double pinion blank 26 is placed and secured through its bore journal 32 on the blank supporting spindle 18, rotatable around the axis C1 of the hobbing machine, in the position of the generic blank to be machined 19, as depicted also in FIG. 1. As illustrated in FIGS. 1J and 1K, the axes 33 and 34 of the built-up face hob and of the double involute pinion blank 26, respectively, are positioned in space, orthogonally offset relative to each other, at the gear drive given centre distance CD. In its start machining position, the tool is not in engagement with the double involute pinion blank, while in its final machining position, illustrated for reference in FIG. 1J, the face hob pitch plane P, perpendicular to its axis of rotation 33 along the line 1K-1K, is tangent to the double involute pinion pitch cylinder of radius rp. FIGS. 1K through 1M illustrate the construction of the built-up face hob cutting tool. The plurality of equi-spaced rack cutter inserts 29 are mounted on the tool body 30 through a series of screws 35 such that the inserts cutting teeth 36 are projecting from the plane face 37 of the face hob body 30. The teeth 36 of the rack cutter insert 29 have the rake surface 38 in form of a plane at a certain rake angle $\gamma_0$, whose value could be positive, negative, or even equal to zero as shown in the embodiment presented in FIG. 1L, with respect to the perpendicular plan to the top land of the rack cutter teeth generating surface. The particularity of the tool consists in the arrangement of the rack cutter inserts 29 on the built-up face hob body such that their lines t of intersection between the tool pitch plane P and the teeth rake plane 38 are placed tangent to the tool circle of radius rb, where rb is the face gear base circle radius and p is the normal involute curve polar subnormal. In addition, the rack cutter inserts are set at progressive positions along the tangent t, such that within the tool pitch plane the teeth have their convex and concave generating surfaces traces 39 and 40 following equi-spaced normal involute curves d of the face gear circle of radius rb, as shown in FIG. 1K. The top clearance surface 41 of the teeth 36 is shaped also in form of a plane, at a certain clearance angle $\alpha_0$, relative to the rack cutter teeth generating surface, through the top cutting edge of the rack cutter. As depicted in FIG. 1M, the cutting edges 42 of the rack cutter insert teeth of constant pitch $p_x$ result as the lines of intersection of the rack insert teeth generating surfaces by the rake plane. The convex and concave side clearance surfaces 43 and respectively 44, of the rack cutter insert teeth, pass through the cutting edges of both sides of the tooth profile at the desired clearance angles relative to corresponding generating surfaces 39 and respectively 40. Commonly, the side clearance surfaces are machined on a specific operation, which is often referred to as a tooth relieving operation. It should be emphasized that all cutting edges 42, namely the cutting edges of both sides of the tooth profile of the rack cutter insert as well as the top cutting edges, are considered to be within the corresponding portions of the generating surfaces of the tooth profile of the rack cutter insert. FIG. 1N illustrates another embodiment 24 of the first method 23 shown in FIG. 1I, of generating the teeth of a double involute pinion according to the present invention, longitudinally curved in shape of a normal involute curve of the face gear circle of radius rb, utilizing a one-piece face hob 45 of a specific design, with a radial or a tangential in-feed movement, on the conventional hobbing machine illustrated in FIG. 1. In this embodiment a series of twelve equi-spaced rack cutters 46 are considered projecting from the plane face 47 of the one-piece face hob body 45. In this case the rake surface 48 of rack cutters teeth results by crosswise gashing the teeth generating surfaces by a number of twelve equi-spaced straight flutes 49. The top and side surfaces of the rack cutters teeth are also relieved by means of suitable relieving tools. The rack cutters teeth geometry and position on the one-piece face hob body is similar to geometry and position of the above-described rack cutter inserts teeth on a built-up face hob used for machining longitudinally curved in shape of a normal involute curve of the face gear circle of radius rb. As illustrated in FIG. 1O, the face hob auxiliary generating rack 50 of constant pitch $p_x$ can be of symmetrical type, case in which both sides of the tooth profile of the rack cutter insert have the same profile angles $\alpha_L = \alpha_R = \alpha$. If the two sides of the tooth profile of the rack cutter insert have different profile angles $\alpha_L$ and $\alpha_R$, on the left and respectively, right side, the face hob auxiliary generating rack 51 of constant pitch $p_x$ is considered of asymmetrical type, as shown in FIG. 1P. Using a face hob having its auxiliary generating rack of symmetrical or asymmetrical type led to machining the double involute pinion longitudinally curved teeth, in shape of a normal involute curve of the face gear circle of radius rb, of symmetrical or asymmetrical type. After both axes of rotation are being set up orthogonally offset in space relative to each other at the required gear drive centre distance CD, the teeth width middle section plane of the double involute pinion blank is set up offset relative to the face hob axial plan perpendicular to pinion blank axis such that this plan is tangent to the tool base circle of radius $r_b$. When machining the double involute pinion teeth according to the first method 23 and 24, with a radial in-feed, the face hob rotates about its axis of rotation 33 with $n_h$ rotations per minute, while the double involute pinion blank rotates about its axis of rotation 34 with $n_p$ rotations per minute, in the directions shown in FIG. 1I and FIG. 1N, the two rotations being timed correlated. During the timed synchronized rotation of both face hob and double involute pinion blank, the face hob 30 or 45 travels radially toward the pinion blank, from outside of the pinion blank 26 to the full depth of the double involute pinion teeth 25, in the direction parallel to its axis of rotation 33, with a continuous radial in-feed rate $s_r$, defined as mm of radial travel of the tool per one rotation of the double involute pinion blank. It is obvious that the radial in-feed rate $s_r$ of the face hob tool toward the double pinion blank 25 is, in fact, an axial translation of the face hob tool 30 or 45 in the direction parallel to their axes of rotation. In case of using a tangential in-feed, both axes of rotation are being set up orthogonally offset in space relative to each other at a predetermined depth of double involute pinion teeth to be cut, such that teeth width middle section plane is tangent to the tool base circle of radius $r_b$. During the timed synchronized rotation of both face hob and double involute pinion blank, the face hob 30 or 45 travels tangentially in the direction of the tangent t-t to the face hob circle of radius rb with a continuous in-feed rate $s_t$, defined as mm of tangential travel of the tool per one rotation of the double involute pinion blank. In this case a proper timed relationship between the tangential in-feed rate $s_t$ and the rotation of the face hob is required. Outside of the continuous tangentially in-feed period of time that allows a certain amount of material stock to be removed, discretely protrusion in-feed motions $s_p$ are necessary to set up the tool progressively from outside of the pinion blank 26 to the full depth of the double involute pinion teeth 25, in the direction parallel to its axis of rotation 33. It should be understood that the above-noted radial and tangential in-feed movements of the tool could also be achieved by radial and tangential in-feed movements of the double involute pinion blank toward the rotatable face hob tool, if machining is performed on a hobbing machine of a different kinematic design, compared to that illustrated in FIG. 1;

With reference to FIGS. 1Q through 1Y, a first method of generating the teeth of a double involute pinion according to the present invention, longitudinally curved in form of an extended involute curve of the face gear circle of radius rb, utilizing a rotating built-up face hob or a rotating one-piece face hob, on a conventional hobbing machine 10 shown in FIG. 1, is illustrated and generally designated by the reference numbers 23" and 24", respectively. According to the first method 23", the longitudinally curved teeth 25" of the double involute pinion blank 26", having the active surfaces 27" and 28" of convex and respectively, concave nature are machined in a continuous generating process, using a radial or a tangential in-feed movement, as envelopes to the family of cutting edges of the teeth of a plurality of rack cutter inserts 29" (in this embodiment a series of eight inserts are considered), mounted on a rotating built-up face hob body 30", as illustrated in FIG. 1Q. Through its aperture journal 31", the face hob body 30" is placed and secured on the cutting head 15 spindle, rotatable around the axis B1 of the hobbing machine, in the position of generic cutting tool 16, shown in FIG. 1. It should be noted that the built-up face hob has the same axis of rotation as the face gear whose teeth will mesh with the teeth of the double involute pinion to be cut. The double pinion blank 26" is placed and secured through its bore journal 32" on the blank supporting spindle 18, rotatable around the axis C1 of the hobbing machine, in the position of the generic blank to be machined 19, as depicted also in FIG. 1. As illustrated in FIGS. 1R and 1S, the axes 33" and 34" of the built-up face hob and of the double involute pinion blank 26", respectively, are positioned in space, orthogonally offset relative to each other, at the gear drive given centre distance CD. In its start machining position, the tool is not in engagement with the double involute pinion blank, while in its final machining position, illustrated for reference in FIG. 1R, the face hob pitch plane P", perpendicular to its axis of rotation 33" along the line 1S-1S, is tangent to the double involute pinion pitch cylinder of radius rp. FIGS. 1S through 1U illustrate the construction of the built-up face hob cutting tool. The plurality of equi-spaced rack cutter inserts 29" are mounted on the tool body 30" through a series of screws 35" such that the inserts cutting teeth 36" are projecting from the plane face 37" of the face hob body 30". The teeth 36" of the rack cutter insert 29" have the rake surface 38" in form of a plane at a certain rake angle $\gamma_0$, whose value could be positive, negative, or even equal to zero as shown in the embodiment presented in FIG. 1T, with respect to the perpendicular plan to the top land of the rack cutter teeth generating surface. The particularity of the tool consists in the arrangement of the rack cutter inserts 29" on the built-up face hob body such that their lines t" of intersection between the tool pitch plane P" and the teeth rake plane 38" are placed tangent to the tool circle of radius (rb−p), where rb is the face gear base circle radius and p is the modified involute curve polar subnormal. In addition, the rack cutter inserts are set at progressive positions along the tangent t", such that within the tool pitch plane the teeth have their convex and concave generating surfaces traces 39" and 40" following equi-spaced shortened involute curves d" of the face gear circle of radius rb, as shown in FIG. 1S. The top clearance surface 41" of the teeth 36" is shaped also in form of a plane, at a certain clearance angle $\alpha_0$, relative to the rack cutter teeth generating surface, through the top cutting edge of the rack cutter. As depicted in FIG. 1U, the cutting edges 42" of the rack cutter insert teeth of constant pitch $p_x$ result as the lines of intersection of the rack insert teeth generating surfaces by the rake plane. The convex and concave side clearance surfaces 43" and respectively 44", of the rack cutter insert teeth, pass through the cutting edges of both sides of the tooth profile at the desired clearance angles relative to corresponding generating surfaces 39" and respectively 40". Commonly, the side clearance surfaces are machined on a specific operation, which is often referred to as a tooth relieving operation. It should be emphasized that all cutting edges 42", namely the cutting edges of both sides of the tooth profile of the rack cutter insert as well as the top cutting edges, are considered to be within the corresponding portions of the generating surfaces of the tooth profile of the rack cutter insert. FIG. 1V illustrates another embodiment 24" of the first method 23" shown in FIG. 1Q, of generating the teeth of a double involute pinion according to the present invention, longitudinally curved in shape of an extended involute curve of the face gear circle of radius rb, utilizing a one-piece face hob 45" of a specific design, with a radial or a tangential in-feed movement, on the conventional hobbing machine illustrated in FIG. 1. In this embodiment a series of twelve equi-spaced rack cutters 46" are considered projecting from the plane face 47" of the one-piece face hob body 45". In this case the rake surface 48" of rack cutters teeth results by crosswise gashing the teeth generating surfaces by a number of twelve equi-spaced straight flutes 49". The top and side surfaces of the rack cutters teeth are also relieved by means of suitable relieving tools. The rack cutters teeth geometry and position on the one-piece face hob body is similar to geometry and position of the above-described rack cutter inserts teeth on a built-up face hob used for machining longitudinally curved in shape of an extended involute curve of the face gear circle of radius rb. As illustrated in FIG. 1W, the face hob auxiliary generating rack 50" of constant pitch $p_x$ can be of symmetrical type, case in which both sides of the tooth profile of the rack cutter insert have the same profile angles $\alpha_L = \alpha_R = \alpha$. If the two sides of the tooth profile of the rack cutter insert have different profile angles $\alpha_L$ and $\alpha_R$, on the left and respectively, right side, the face hob auxiliary generating rack 51" of constant pitch $p_x$ is considered of asymmetrical type, as shown in FIG. 1X. Using a face hob having its auxiliary generating rack of symmetrical or asymmetrical type led to machining the double involute pinion longitudinally curved teeth, in shape of an extended involute curve of the face gear circle of radius rb, of symmetrical or asymmetrical type. After both axes of rotation are being set up orthogonally offset in space relative to each other at the required gear drive centre distance CD, the teeth width middle section plane of the double involute pinion blank is set up offset relative to the face hob axial plan perpendicular to pinion blank axis such that this plan is tangent to the tool base circle of radius $r_b$. When machining the double involute pinion teeth according to the first method 23" and 24", with a radial in-feed, the face hob rotates about its axis of rotation 33" with $n_h$ rotations per minute, while the double involute pinion blank rotates about its axis of rotation 34" with $n_p$ rotations per minute, in the directions shown in FIG. 1Q and FIG. 1V, the two rotations being timed correlated. During the timed synchronized rotation of both face hob and double involute pinion blank, the face hob 30" or 45" travels radially toward the pinion blank, from outside of the pinion blank 26" to the full depth of the double involute pinion teeth 25", in the direction parallel to its axis of rotation 33", with a continuous radial in-feed rate $s_r$, defined as mm of radial travel of the tool per one rotation of the double involute pinion blank. It is obvious that the radial in-feed rate $s_r$ of the face hob tool toward the double pinion blank 25" is, in fact, an axial translation of the face hob tool 30" or 45" in the direction parallel to their axes of rotation. In case of using a tangential in-feed, both axes of rotation are being set up orthogonally offset in space relative to each other at a predetermined depth of double involute pinion teeth to be cut, such that the teeth width middle section plane is set up tangent to the tool base circle of radius $r_b$. During the timed synchronized rotation of both face hob and double involute pinion blank, the face hob 30" or 45" travels tangentially in the direction of the tangent t"-t" to the face hob circle of radius (rb−p) with a continuous in-feed rate $s_t$, defined as mm of tangential travel of the tool per one rotation of the double involute pinion blank. In this case a proper timed relationship between the tangential in-feed rate $s_t$ and the rotation of the face hob is required. Outside of the continuous tangentially in-feed period of time that allows a certain amount of material stock to be removed, discretely protrusion in-feed motions $s_p$ are necessary to set up the tool progressively from outside of the pinion blank 26" to the full depth of the double involute pinion teeth 25", in the direction parallel to its axis of rotation 33". It should be understood that the above-noted radial and tangential in-feed movements of the tool could also be achieved by radial and tangential in-feed movements of the double involute pinion blank toward the rotatable face hob tool, if machining is performed on a hobbing machine of a different kinematic design, compared to that illustrated in FIG. 1;

FIG. 2 shows a schematic diagram of a 6-axis CNC hobbing machine 60, suitable for generating of longitudinally curved teeth of double involute pinions according to the present invention. It has a base 61, comprised of a table bottom part and two stand bottom parts on which a radial column carriage 62 is sliding in direction X2 and a tangential column carriage 63 is sliding in direction Y2. The radial column carriage 62 carries a vertical slide 64, which is movable in direction Z2. An angularly adjustable table 65, which is pivotable around its axis of rotation A2 is situated on the vertical slide 64, and carries a cutting head 66 that can swivel around axis of rotation A2. The cutting head 66, which is tangentially slidable in ways formed in the top of table 65, only for initial set up though, incorporates a rotatable tool spindle that carries a generic conical hob tool 67, with a corresponding drive with which the tool is rotatable about the axis B2. The tangential column carriage 63 carries a table 68, rotatable about the axis C2, on which the supporting spindle 69, of the generic double involute pinion blank 70 is fixed. The tangential column carriage 63 has also a vertically adjustable arm 71 thereon supporting a member 72 which provides an outboard support for the work supporting spindle 69. The axis of the member 72 is accurately coaxially aligned with the axis C2 of the rotatable table 68.

With reference to FIGS. 2A through 2L, a second method of generating the teeth of a double involute pinion according to the present invention, longitudinally curved in form of a shortened involute curve of the face gear circle of radius rb, utilizing a one-piece or a built-up rotating conical hob, of modified shortened involute type, on a 6-axis CNC hobbing machine 60 shown in FIG. 2, is illustrated and generally designated by the reference number 73'. The imaginary pitch plane 74 of the 6-axis CNC hobbing machine 60, that coincides with the pitch plane P', of the face gear teeth that will intermesh with the double involute pinion teeth 75' to be cut, is shown in FIG. 2A, and is defined as being perpendicular to the axis A2 of machine 60 and tangent to the pitch cylinder of the double involute pinion blank 76' of radius rp. The second method 73', specific for generating the teeth of a double involute pinion longitudinally curved in form of a shortened involute curve is illustrated for reference in FIG. 2B, as a detailed perspective view captured from FIG. 2A. The longitudinally curved teeth of the double involute pinion blank 76', having the active surfaces 77' and 78' of convex and concave nature, respectively, are machined in a continuous generating process along their entire lengths, using a tangential plunging in-feed movement, as envelopes to the family of cutting edges 79' of the teeth 80' of an one-piece or a built-up conical hob 67' (in this embodiment only a one-piece end-type conical hob is shown), mounted in the cutting head 66 spindle, rotatable around its axis B2. The axis B2 of conical hob 67' spindle intersects the common tangent plane 74, at an angle θh', preferably 30°, so that the side of the hob contacting the pinion blank 76' is always parallel to said tangent plane 74. The tool 67' consists of a truncated conical body 81', as depicted in FIG. 2C, which is provided with a plurality of corresponding teeth 80' arranged in a continuous circumferentially thread or threads along a conical helix 82' of apex K' and constant lead $p_x$. In its plan development the conical pitch helix becomes an Archimedean spiral, whom polar subnormal will be selected to coincide with the amount p of involute modification of a shortened involute curve of the face gear circle of radius rb, chosen as the longitudinally shape of the double involute pinion teeth to be cut that will mesh with the teeth of said face gear. The hob cutting edges 79' are formed by longitudinally gashing the thread with a number of equally spaced straight flutes 83', as shown in FIG. 2C, and by reliving the remaining portions of the thread, e.g. the top clearance surface 84' as well as the concave and convex clearance side surfaces 85' and 86', respectively, as depicted in FIG. 2D. Positioning the hob 67' such that its pitch cone generatrix t'–t' is simultaneously tangent to the double involute pinion pitch circle of radius rp, and to the face gear teeth circle of radius (rb+p), having its centre O' set up at the right centre distance CD within the imaginary plane 74, it can be demonstrated that the double involute pinion tooth space longitudinally curve 87', in form of a shortened involute is tangent to the hob Archimedean spiral 88' on fixed plane 74, along the line t' that defines the projection of hob axis on fixed plane 74. Positioning the conical hob with its axial section along the plane perpendicular to the double involute pinion blank axis along the line t', as illustrated in FIG. 2E, the hob rack elements 89' all converge in the apex K' as depicted in FIG. 2F. The rack generating elements 89' of constant pitch $p_x$ can be of symmetrical type, case in which both sides of the tooth profile of the conical hob axial rack have the same profile angles $α_L=α_R=α$, as shown in FIG. 2G. If the two sides of the conical hob axial rack have different profile angles $α_L$ and $α_R$, on the left and right side, respectively, the face hob auxiliary generating rack 90' of constant pitch $p_x$ is considered of asymmetrical type being depicted in FIG. 2H. The double involute pinion teeth are machined in one continuous operation, both flanks being cut simultaneously and along their entire length. At start or initial manufacturing position, the axis C2 of double involute pinion blank supporting spindle and the swivel axis A2 of the cutting head supporting table 65 are set up orthogonally offset in space relative to each other at a certain centre distance CDinit', the teeth width middle section plane of double involute pinion blank being set up offset at the distance $r_b$, relative to the imaginary face gear axial plan perpendicular to the pinion blank. In the same time, as shown in FIG. 2I, the projection of conical hob axis on the imaginary face gear pitch plan P' is tangent to the face gear circle of radius (rb+p), being inclined at an angle δinit' relative to the parallel to the pinion blank axis passing through the center O' of the face gear circle of radius $r_b$. When generating the double involute pinion teeth according to the second method 73', using a tangential plunging in-feed movement, the conical hob rotates about axis of rotation B2 with $n_h$ rotations per minute, while the double involute pinion blank 76' rotates about axis C2 with $n_p$ rotations per minute, in the directions shown in FIGS. 2A through 2L, the two rotations being timed correlated. During the timed synchronized rotation of both conical hob and double involute pinion blank, respectively, the double involute pinion blank 76' travels tangentially with a st' in-feed rate in the direction of the tangent t'–t' to the face hob circle of radius (rb+p), toward the centre O', movement sincronized with a continuous plunging rotation $n_{tp}'$ of the conical hob axis projection on face gear pitch plane P', around the center O' of the face gear circle or radius rb, such that each point of the tool axial rack pitch profile describe a shortened involute curve 87' of the face gear circle of radius $r_b$, within the face gear fixed pitch plane P' shown in FIG. 2J. When the double pinion teeth will be generated along their entire lengths, as illustrated in FIG. 2K, the axes of pinion blank and imaginary face gear will still be disposed orthogonally offset in space to each other but now at their final centre distance CDfin'. In its final position, the projection of conical hob axis on face gear pitch plane P' is inclined at an angle δ fin' relative to the parallel to the pinion blank axis passing through the center O' of the face gear circle of radius $r_b$. During the entire process of pinion teeth generation, while rotating around the center O', the projection of conical hob axis on imaginary face gear pitch plan P' should remain permanently tangent to the face gear circle of radius (rb+p). It should be emphasized that the rotation of the double involute pinion blank 76' about axis C2 with $n_p$ rotations per minute includes the rotation component timed correlated with the rotation of the conical hob about axis of rotation B2 with $n_h$ rotations per minute, as well as an additional rotation component to compensate the tangential sliding st' of the double involute pinion blank in the direction of the tangent t' to the face hob circle of radius (rb+p), toward the centre O'. Moreover, during the entire process of teeth generation, one side of conical hob pitch cone will remain permanently tangent to the pinion blank cylinder of radius rp, as depicted in both FIGS. 2J and 2K, respectively. Practically, the tangential plunging in-feed movement is realized by a timed rotation $n_{tp}'$ of the swivel table 65 around axis A2 of the 6-axis CNC hobbing machine, correlated with a tangential controllable sliding of tangential column carriage 63 in direction Y2 with a $s_t'$ in-feed rate. The direction of rotation around their own axes of rotation is the same for both conical hob and pinion blank, respectively, if a double involute pinion of a shortened involute type is being cut.

With reference to FIGS. 2M through 2X, a second method of generating the teeth of a double involute pinion according to the present invention, longitudinally curved in form of an extended involute curve of the face gear circle of radius rb, utilizing a one-piece or a built-up rotating conical hob, of modified extended involute type, on a 6-axis CNC hobbing machine 60 shown in FIG. 2, is illustrated and generally designated by the reference number 73". The imaginary pitch plane 74 of the 6-axis CNC hobbing machine 60, that coincides with the face gear teeth pitch plane P''', will intermesh with the double involute pinion teeth 75" to be cut is shown in FIG. 2M, and is defined as being perpendicular to the axis A2 of machine 60, and tangent to the pitch cylinder of the double involute pinion blank 76" of radius rp. According to the second method 73", illustrated for reference in FIG. 2N, as a detailed perspective view captured from FIG. 2M, specific for generating the teeth of a double involute pinion longitudinally curved in form of an extended involute curve, the longitudinally curved teeth of the double involute pinion blank 76", having the active surfaces 77" and 78" of convex and respectively, concave nature are machined in a continuous generating process along their entire lengths, using a tangential plunging in-feed movement, as envelopes to the family of cutting edges 79" of the teeth 80" of a one-piece conical hob 67" (in this embodiment only a one-piece end-type conical hob is shown), mounted in rotatable spindle around axis B2 of cutting head 66. The axis B2 of conical hob 67" spindle intersects the common tangent plane 74 at an angle θh", preferably 30°, so that the side of the hob contacting with the pinion blank 76" is always parallel to said tangent plane. The tool 67" consists of a truncated conical body 81", as depicted in FIG. 2O, which is provided with a plurality of corresponding teeth 80" arranged in a continuous circumferentially thread or threads along a conical helix 82" of apex K" and constant lead $p_x$. In its plan development the conical pitch helix becomes an Archimedean spiral, whom polar subnormal will be selected to coincide with the amount p of involute modification, of an extended involute curve of the face gear circle of radius rb, chosen as the longitudinally shape of the double involute pinion teeth to be cut that will mesh with the teeth of said face gear. The hob cutting edges 79" are formed by longitudinally gashing the thread with a number of equally spaced straight flutes 83", as shown in FIG. 2O and, by reliving the remaining portions of the thread, e.g. the top clearance surface 84" as well as the clearance side concave and convex surfaces 85" and 86", respectively, as illustrated in FIG. 2P. Positioning the hob such that its pitch cone generatrix t" is simultaneously tangent to the double involute pinion pitch circle of radius rp, and to the face gear teeth circle of radius (rb−p), having its centre O" set up at the right centre distance CD within the imaginary plane 74, it can be demonstrated that the double involute pinion tooth space directrix curve 87" in form of an extended involute is tangent to the hob pitch cone helix projection curve 88" on fixed plane 74, along the line t"-t" that defines the projection of hob axis on fixed plane 74, as shown in FIG. 2P. As illustrated in FIG. 2Q and FIG. 2R, positioning the conical hob with its axial section along the plane perpendicular to the double involute pinion blank axis along the line t"-t", the hob rack elements 89" all converge in the apex K". The rack generating elements 89" of constant pitch $p_x$ can be of symmetrical type, case in which both sides of the tooth profile of the conical hob axial rack have the same profile angles $\alpha_L = \alpha_R = \alpha$, as shown in FIG. 2S. If the two sides of the conical hob axial rack have different profile angles $\alpha_L$ and $\alpha_R$, on the left and right side, respectively, the face hob auxiliary generating rack 90" of constant pitch $p_x$ is considered of asymmetrical type being depicted in FIG. 2T. The double involute pinion teeth are machined in one continuous operation, both flanks being cut simultaneously and along their entire length. At start or initial manufacturing position, the axis C2 of double involute pinion blank supporting spindle and the swivel axis A2 of the cutting head supporting table 65 are set up orthogonally offset in space relative to each other at a certain centre distance CDinit", the teeth width middle section plane of double involute pinion blank being set up offset at the distance $r_b$, relative to the imaginary face gear axial plan perpendicular to the pinion blank. In the same time, as shown in FIG. 2U, the projection of conical hob axis on the imaginary face gear pitch plan P''' is tangent to the face gear circle of radius (rb−p), being inclined at an angle δinit" relative to the parallel to the pinion blank axis passing through the center O" of the face gear circle of radius $r_b$. When generating the double involute pinion teeth according to the second method 73", using a tangential plunging in-feed movement, the conical hob rotates about axis of rotation B2 with $n_h$ rotations per minute, while the double involute pinion blank 76" rotates about axis C2 with $n_p$ rotations per minute, in the directions shown in FIGS. 2M through 2X, the two rotations being timed correlated. During the timed synchronized rotation of both conical hob and double involute pinion blank, respectively, the double involute pinion blank 76" travels tangentially with a st" in-feed rate in the direction of the tangent t"-t" to the face hob circle of radius (rb−p), away from the centre O", movement synchronized with a continuous plunging rotation $n_{tp}$" of the conical hob axis projection on face gear pitch plane P''', around the center O" of the face gear circle or radius rb, such that each point of the tool axial rack pitch profile describe an extended involute curve 87" of the face gear circle of radius $r_b$, within the face gear fixed pitch plane P''' shown in FIG. 2V. When the double pinion teeth will be generated along their entire lengths, as illustrated in FIG. 2X, the axes of pinion blank and imaginary face gear will still be disposed orthogonally offset in space to each other but now at their final centre distance CDfin". In its final position, the projection of conical hob axis on face gear pitch plane P''' is inclined at an angle δ fin" relative to the parallel to the pinion blank axis passing through the center O" of the face gear circle of radius $r_b$. During the entire process of pinion teeth generation, while rotating around the center O", the projection of conical hob axis on imaginary face gear pitch plan P''' should remain permanently tangent to the face gear circle of radius (rb−p). It should be emphasized that the rotation of the double involute pinion blank 76" about axis C2 with $n_p$ rotations per minute includes the rotation component timed correlated with the rotation of the conical hob about axis of rotation B2 with $n_h$ rotations per minute, as well as an additional rotation component to compensate the tangential sliding st" of the double involute pinion blank in the direction of the tangent t" to the face hob circle of radius (rb+p), away from the centre O". Moreover, during the entire process of teeth generation, one side of conical hob pitch cone will remain tangent permanently to the pinion blank cylinder of radius rp, as depicted in both FIGS. 2V and 2W, respectively. Practically, the tangential plunging in-feed movement is realized by a timed rotation $n_{tp}$" of the swivel table 65 around axis A2 of the 6-axis CNC hobbing machine, correlated with a tangential controllable sliding of tangential column carriage 63 in direction Y2 with a $s_t$" in-feed rate. The direction of rotation around their own axes of rotation is different for conical hob and pinion blank, if a double involute pinion of an extended involute type is being cut.

It should be noticed that the face hob tool described within the first method of manufacturing the teeth of a double involute pinion can be considered a particular case of the conical hob used within the second method of manufacturing the teeth of a double involute pinion, in which the pitch cone angle θh=90°. Thus, the conical hob degenerates to a face hob. The conical pitch surface of the conical hob is converted to a pitch plane of the face hob, perpendicular to the axis of rotation of the face hob. In general, the use of conical hobs makes it possible to optimize the parameters of the entering and exiting zones in gears hobbing operation.

FIG. 3 shows a schematic diagram of a conventional hobbing machine 110, suitable for generating of longitudinally curved teeth of face gears according to the present invention. It has a base 111 comprised of a table bottom part and a stand bottom part on which a radial carriage 112 is sliding in direction X3. The radial carriage 112 carries a vertical slide 113, which is movable in direction Z3. An angularly adjustable table 14, which is pivotable around its axis of rotation A3 is situated on the vertical slide 113, and carries a cutting head 115, displaceable in direction Y3. The sliding head 115 carries the face gear generic blank 116, with a corresponding drive that rotates the face gear blank about the axis B3. The base 111 table bottom part carries a table 117, rotatable about the axis C3, on which the supporting spindle 118, of the corresponding generic cutting tool 119 is fixed. The base 11 table bottom part carries also a column 120 fixed thereto having a vertically adjustable arm 121 thereon supporting a member 122 which provides an outboard support for the tool supporting spindle 118. The axis of the member 122 is accurately coaxially aligned with the axis C3 of the rotatable table 117. It should be noticed that during the generation process, the table 117 and, implicitly the generic cutting tool 119 is not rotating about the axis C3, being held stationary.

With reference to FIGS. 3A through 3F, a first method of generating the teeth of a face gear according to the present invention, longitudinally curved in form of a shortened involute curve of the face gear circle of radius rb, utilizing a stationary one-piece or a built-up rack cutter, on a conventional hobbing machine 110 shown in FIG. 3, is illustrated and generally designated by the reference number 123'. According to the first method 123', the longitudinally curved teeth 125' of the face gear blank 126', having the active surfaces 127' and 128' of convex and respectively, concave nature are machined in a discontinuous milling process using a tangential in-feed movement of the face gear blank, as the negative space traces of teeth 129' considered on the stationary rack cutter body 130', in the face gear blank 126', as illustrated in FIG. 3A. Through its aperture journal 131' the face gear blank body 126' is placed and secured on the cutting head 115 spindle, rotatable around the axis B3 of the hobbing machine, in the position of generic cutting tool 116, shown in FIG. 3. The rack cutter body 130' is placed and secured through its bore journal 132' on supporting spindle 118, rotatable around the axis C3 of the hobbing machine, in the position of the generic cutting tool 119, depicted also in FIG. 3. In final machining position, as illustrated in FIGS. 3B through 3D, the axes 133' and 134' of the face gear blank 126' and rack cutter body 130', respectively, are considered positioned in space, orthogonally offset relative to each other, at the gear drive given center distance CD, while the tool teeth pitch line t'-t' from its rake surface 135' is positioned tangent to the face gear blank circle of radius (rb+p), where rb is the face gear base circle radius and p is the amount of involute modification. In start machining position, although the tool still has its teeth pitch line t'-t' positioned tangent to the face gear blank cylinder of radius (rb+p), the tool is not in engagement with the face gear blank. The teeth 129' of the rack cutter have the rake surface 135' in form of a plane at a certain rake angle, whose value could be positive, negative, or even equal to zero, with respect to the perpendicular plan to the rack cutter axis 134'. As illustrated in FIG. 3E, the tool teeth generating rack 136' of constant pitch $p_x$ can be of symmetrical type, case in which both sides of rack cutter tooth profile have the same profile angles $\alpha_k=\alpha_R=\alpha$. If the two sides of the rack cutter tooth profile have different profile angles $\alpha_L$ and $\alpha_R$, on the left and right side, respectively, the tool teeth generating rack 137' of constant pitch $p_x$ is considered of asymmetrical type, as shown in FIG. 3F. When machining the face gear teeth according to the first method 123' using a tangential in-feed movement, both axes of rotation are being set up orthogonally offset in space relative to each other at a predetermined depth of face gear teeth to be cut such that the tool teeth pitch line t'-t' is positioned tangent to the face gear blank cylinder of radius (rb+p). The active component of the first method 123' of generating the space between the teeth on the face gear blank, longitudinally curved in form of a shortened involute curve 138', of the face gear teeth base circle of radius rb is the active discontinuously swing-rotation of the face gear blank 126' about its axis such that certain teeth of the face gear blank are machined longitudinally on their whole length at a predetermined depth, timed correlated with a discontinuous tangential translation, with an in-feed rate $s_t$, of the same face gear blank along a common perpendicular to both, rack cutter and face gear blank axes, respectively, while the tool axis is held stationary. This active movement is followed by a reverse idle swing-rotation to the initial position of the face gear blank, which is also correlated with an idle translation of the same face gear blank to the initial position and an indexing rotation of the face gear blank to the next tooth space or spaces to be machined, dependent of rack cutter width or number of teeth. After all spaces between teeth are machined at the same predetermined depth, discretely protrusion translations $s_p$, of the face gear blank along its axis of rotation to the next tooth space depth to be removed are done, until the face gear teeth whole depth is achieved, through a multiple number of bi-directional paths.

With reference to FIGS. 3G through 3L, a first method of generating the teeth of a face gear according to the present invention, longitudinally curved in form of a normal involute curve of the face gear circle of radius rb, utilizing a stationary one-piece or a built-up rack cutter, on a conventional hobbing machine 110 shown in FIG. 3, is illustrated and generally designated by the reference number 123. According to the first method 123, the longitudinally curved teeth 125 of the face gear blank 126, having the active surfaces 127 and 128 of convex and respectively, concave nature are machined in a discontinuous milling process using a tangential in-feed movement of the face gear blank, as the negative space traces of teeth 129 considered on the stationary rack cutter body 130, in the face gear blank 126, as illustrated in FIG. 3G. Through its aperture journal 131 the face gear blank body 126 is placed and secured on the cutting head 115 spindle, rotatable around the axis B3 of the hobbing machine, in the position of generic cutting tool 116, shown in FIG. 3. The rack cutter body 130 is placed and secured through its bore journal 132 on supporting spindle 118, rotatable around the axis C3 of the hobbing machine, in the position of the generic cutting tool 119, depicted also in FIG. 3. In final machining position, as illustrated in FIGS. 3H through 3J, the axes 133 and 134 of the face gear blank 126 and rack cutter body 130, respectively, are considered positioned in space, orthogonally offset relative to each other, at the gear drive given center distance CD, while the tool teeth pitch line t-t from its rake surface 135 is positioned tangent to the face gear blank circle of radius rb, where rb is the face gear base circle radius and p is the amount of involute modification. In start machining position, although the tool still has its teeth pitch line t-t positioned tangent to the face gear blank cylinder of radius rb, the tool is not in engagement with the face gear blank. The teeth 129 of the rack cutter have the rake surface 135 in form of a plane at a certain rake angle, whose value could be positive, negative, or even equal to zero, with respect to the perpendicular plan to the rack cutter axis 134. As illustrated in FIG. 3K, the tool teeth generating rack 136 of constant pitch $p_x$ can be of symmetrical type, case in which both sides of rack cutter tooth profile have the same profile angles $\alpha_L = \alpha_R = \alpha$. If the two sides of the rack cutter tooth profile have different profile angles $\alpha_L$ and $\alpha_R$, on the left and right side, respectively, the tool teeth generating rack 137 of constant pitch $p_x$ is considered of asymmetrical type, as shown in FIG. 3L. When machining the face gear teeth according to the first method 123 using a tangential in-feed movement, both axes of rotation are being set up orthogonally offset in space relative to each other at a predetermined depth of face gear teeth to be cut such that the tool teeth pitch line t-t is positioned tangent to the face gear blank cylinder of radius rb. The active component of the first method 123 of generating the space between the teeth on the face gear blank, longitudinally curved in form of a normal involute curve 138, of the face gear teeth base circle of radius rb m is the active discontinuously swing-rotation of the face gear blank 126 about its axis such that certain teeth of the face gear blank are machined longitudinally on their whole length at a predetermined depth, timed correlated with a discontinuous tangential translation, with an in-feed rate $s_t$, of the same face gear blank along a common perpendicular to both, rack cutter and face gear blank axes, respectively, while the tool axis is held stationary. This active movement is followed by a reverse idle swing-rotation to the initial position of the face gear blank, which is also correlated with an idle translation of the same face gear blank to the initial position and an indexing rotation of the face gear blank to the next tooth space or spaces to be machined, dependent of rack cutter width or number of teeth. After all spaces between teeth are machined at the same predetermined depth, discretely protrusion translations $s_p$, of the face gear blank along its axis of rotation to the next tooth space depth to be removed are done, until the face gear teeth whole depth is achieved, through a multiple number of bi-directionally paths.

With reference to FIGS. 3M through 3R, a first method of generating the teeth of a face gear according to the present invention, longitudinally curved in form of an extended involute curve of the face gear circle of radius rb, utilizing a stationary one-piece or a built-up rack cutter, on a conventional hobbing machine 110 shown in FIG. 3, is illustrated and generally designated by the reference number 123". According to the first method 123", the longitudinally curved teeth 125" of the face gear blank 126", having the active surfaces 127" and 128" of convex and respectively, concave nature are machined in a discontinuous milling process using a tangential in-feed movement of the face gear blank, as the negative space traces of teeth 129" considered on the stationary rack cutter body 130", in the face gear blank 126", as illustrated in FIG. 3M. Through its aperture journal 131" the face gear blank body 126" is placed and secured on the cutting head 115 spindle, rotatable around the axis B3 of the hobbing machine, in the position of generic cutting tool 116, shown in FIG. 3. The rack cutter body 130" is placed and secured through its bore journal 132" on supporting spindle 118, rotatable around the axis C3 of the hobbing machine, in the position of the generic cutting tool 119, depicted also in FIG. 3. In final machining position, as illustrated in FIGS. 3N through 3P, the axes 133" and 134" of the face gear blank 126" and rack cutter body 130", respectively, are considered positioned in space, orthogonally offset relative to each other, at the gear drive given center distance CD, while the tool teeth pitch line t"-t" from its rake surface 135" is positioned tangent to the face gear blank circle of radius (rb−p), where rb is the face gear base circle radius and p is the amount of involute modification. In start machining position, although the tool still has its teeth pitch line t'-t' positioned tangent to the face gear blank cylinder of radius (rb+p), the tool is not in engagement with the face gear blank. The teeth 129" of the rack cutter have the rake surface 135" in form of a plane at a certain rake angle, whose value could be positive, negative, or even equal to zero, with respect to the perpendicular plan to the rack cutter axis 134". As illustrated in FIG. 3Q, the tool teeth generating rack 136" of constant pitch $p_x$ can be of symmetrical type, case in which both sides of rack cutter tooth profile have the same profile angles $\alpha_L = \alpha_R = \alpha$. If the two sides of the rack cutter tooth profile have different profile angles $\alpha_L$ and $\alpha_R$, on the left and right side, respectively, the tool teeth generating rack 137" of constant pitch $p_x$ is considered of asymmetrical type, as shown in FIG. 3R. When machining the face gear teeth according to the first method 123" using a tangential in-feed movement, both axes of rotation are being set up orthogonally offset in space relative to each other at a predetermined depth of face gear teeth to be cut such that the tool teeth pitch line t"-t" is positioned tangent to the face gear blank cylinder of radius (rb−p). The active component of the first method 123" of generating the space between the teeth on the face gear blank, longitudinally curved in form of an extended involute curve 138", of the face gear teeth base circle of radius rb is the active discontinuously swing-rotation of the face gear blank 126" about its axis such that certain teeth of the face gear blank are machined longitudinally on their whole length at a predetermined depth, timed correlated with a discontinuous tangential translation, with an in-feed rate $s_t$, of the same face gear blank along a common perpendicular to both, rack cutter and face gear blank axes, respectively, while the tool axis is held stationary. This active movement is followed by a reverse idle swing-rotation to the initial position of the face gear blank, which is also correlated with an idle translation of the same face gear blank to the initial position and an indexing rotation of the face gear blank to the next tooth space or spaces to be machined, dependent of rack cutter width or number of teeth. After all spaces between teeth are machined at the same predetermined depth, discretely protrusion translations $s_p$, of the face gear blank along its axis of rotation to the next tooth space depth to be removed are done, until the face gear teeth whole depth is achieved, through a multiple number of bi-directional paths.

FIG. 4 shows a schematic diagram of a conventional hobbing machine 140, suitable for generating of longitudinally curved teeth of face gears according to the present invention. It has a base 141 comprised of a table bottom part and a stand bottom part on which a tangential carriage 142 is sliding in direction X4. The tangential carriage 142 carries a vertical slide 143, which is movable in direction Z4. An angularly adjustable table 144, which is pivotable around its axis of rotation A4 is situated on the vertical slide 143, and carries a cutting head 145, displaceable in direction Y4. The sliding head 145 carries the face gear generic blank 146, with a corresponding drive that rotates the face gear blank about the axis B4. The base 141 table bottom part carries a table 147, rotatable about the axis C4, on which the supporting spindle 148, of the corresponding generic cutting tool 149 is fixed. The base 141 table bottom part carries also a column 150 fixed thereto having a vertically adjustable arm 151 thereon supporting a member 152 which provides an outboard support for the tool supporting spindle 148. The axis of the member 142 is accurately coaxially aligned with the axis C4 of the rotatable table 147.

With reference to FIGS. 4A through 4F, a second method of generating the teeth of a face gear according to the present invention, longitudinally curved in form of a shortened involute curve of the face gear circle of radius rb, utilizing a rotary one-piece or a built-up shaper cutter, on a conventional hobbing machine 140 shown in detail in FIG. 4A, is illustrated and generally designated by the reference number 153'. According to the second method 153', depicted in FIG. 4B, the longitudinally curved teeth 155' of the face gear blank 156', having the active surfaces 157' and 158' of convex and respectively, concave nature are machined in a continuous generating process using a tangential in-feed movement of the face gear blank as envelopes to the family of cutting edges of the teeth 159' of rotary shaper cutter 160'. Through its aperture journal 161' the face gear blank body 156' is placed and secured on the cutting head 145 spindle, rotatable around the axis B4 of the hobbing machine, in the position of generic cutting tool 146, shown in FIG. 4. The shaper cutter body 160' is placed and secured through its bore journal 162' on supporting spindle 148, rotatable around the axis C4 of the hobbing machine, in the position of the generic cutting tool 149, shown also in FIG. 4. In final machining position, as illustrated in FIGS. 4B through 4D, the axes 163' and 164' of the face gear blank 156' and shaper cutter body 160', respectively, are considered positioned in space, orthogonally offset relative to each other, at the gear drive given center distance CD, while the tool teeth pitch line t'-t' from its rake surface 165' is positioned tangent to the face gear blank circle of radius (rb+p), where rb is the face gear base circle radius and p is the amount of involute modification. In start machining position, although the tool still has its teeth pitch line t'-t' positioned tangent to the face gear blank cylinder of radius (rb+p), the tool is not in engagement with the face gear blank. The teeth 159' of the shaper cutter have the rake surface 165' in form of a plane or a conical surface at a certain rake angle, whose value could be positive, negative, or even equal to zero, with respect to the perpendicular plan to the shaper cutter axis 164'. As illustrated in FIG. 4E, the tool teeth generating rack 166' of constant pitch $p_x$ can be of symmetrical type, case in which both sides of rack cutter tooth profile have the same profile angles $\alpha_L = \alpha_R = \alpha$. If the two sides of the rack cutter tooth profile have different profile angles $\alpha_L$ and $\alpha_R$, on the left and right side, respectively, the tool teeth generating rack 167' of constant pitch $p_x$ is considered of asymmetrical type, as shown in FIG. 4F. When machining the face gear teeth, longitudinally curved in form of a shortened involute curve 168', according to the second method 153' using a tangential in-feed movement, both axes of rotation are being set up orthogonally offset in space relative to each other at a predetermined depth of face gear teeth to be cut such that the tool teeth pitch circle of radius rs from tool rake surface 165' is positioned tangent to the face gear blank cylinder of radius (rb+p). During timed synchronized rotation of face gear blank around its axis of rotation 163' with np rotations per minute with rotation of shaper cutter tool around its axis of rotation 164' with ns rotations per minute, the face gear blank 156,' travels tangentially in the direction of common perpendicular to their axes with a continuous in-feed rate $s_t$, defined as mm of tangential travel of the tool per one rotation of the face gear blank. In this case a proper timed relationship between the tangential in-feed rate $s_t$ and the rotation of the face hob is required. Outside of the continuous tangentially in-feed period of time that allows a certain amount of material stock to be removed, discretely protrusion in-feed motions $s_p$ are necessary to set up the tool progressively from outside of the face gear blank 156' to the full depth of the face gear teeth 155', in the direction parallel to its axis of rotation 163'.

With reference to FIGS. 4G through 4L, a second method of generating the teeth of a face gear according to the present invention, longitudinally curved in form of a normal involute curve of the face gear circle of radius rb, utilizing a rotary one-piece or a built-up shaper cutter, on a conventional hobbing machine 140 shown in detail in FIG. 4G, is illustrated and generally designated by the reference number 153. According to the second method 153, depicted in FIG. 4H, the longitudinally curved teeth 155 of the face gear blank 156, having the active surfaces 157 and 158 of convex and respectively, concave nature are machined in a continuous generating process using a tangential in-feed movement of the face gear blank as envelopes to the family of cutting edges of the teeth 159 of rotary shaper cutter 160. Through its aperture journal 161 the face gear blank body 156' is placed and secured on the cutting head 145 spindle, rotatable around the axis B4 of the hobbing machine, in the position of generic cutting tool 146, shown in FIG. 4. The shaper cutter body 160 is placed and secured through its bore journal 162 on supporting spindle 148, rotatable around the axis C4 of the hobbing machine, in the position of the generic cutting tool 149, shown also in FIG. 4. In final machining position, as illustrated in FIGS. 4H through 4J, the axes 163 and 164 of the face gear blank 156 and shaper cutter body 160, respectively, are considered positioned in space, orthogonally offset relative to each other, at the gear drive given center distance CD, while the tool teeth pitch line t-t from its rake surface 165 is positioned tangent to the face gear blank circle of radius rb, where rb is the face gear base circle radius and p is the amount of involute modification. At start machining position, although the tool still has its teeth pitch line t-t positioned tangent to the face gear blank cylinder of radius rb, the tool is not in engagement with the face gear blank. The teeth 159 of the shaper cutter have the rake surface 165 in form of a plane or a conical surface at a certain rake angle, whose value could be positive, negative, or even equal to zero, with respect to the perpendicular plan to the shaper cutter axis 164. As illustrated in FIG. 4K, the tool teeth generating rack 166 of constant pitch $p_x$ can be of symmetrical type, case in which both sides of rack cutter tooth profile have the same profile angles $\alpha_L = \alpha_R = \alpha$. If the two sides of the rack cutter tooth profile have different profile angles $\alpha_L$ and $\alpha_R$, on the left and right side, respectively, the tool teeth generating rack 167 of constant pitch $p_x$ is considered of asymmetrical type, as shown in FIG. 4L. When machining the face gear teeth, longitudinally curved in form of a normal involute curve 168, according to the second method 153 using a tangential in-feed movement, both axes of rotation are being set up orthogonally offset in space relative to each other at a predetermined depth of face gear teeth to be cut such that the tool teeth pitch circle of radius rs from tool rake surface 165 is positioned tangent to the face gear blank cylinder of radius rb. During timed synchronized rotation of face gear blank around its axis of rotation 163 with np rotations per minute with shaper cutter tool rotation around its axis of rotation 164 with ns rotations per minute the face gear blank 156 travels tangentially in the direction of common perpendicular to their axes with a continuous in-feed rate $s_t$, defined as mm of tangential travel of the tool per one rotation of the face gear blank. In this case a proper timed relationship between the tangential in-feed rate $s_t$ and the rotation of the face hob is required. Outside of the continuously tangential in-feed period of time that allows a certain amount of material stock to be removed, discretely protrusion in-feed motions $s_p$ are necessary to set up the tool progressively from outside of the face gear blank 156 to the full depth of the face gear teeth 155, in the direction parallel to its axis of rotation 163.

With reference to FIGS. 4M through 4R, a second method of generating the teeth of a face gear according to the present invention, longitudinally curved in form of an extended involute curve of the face gear circle of radius rb, utilizing a rotary one-piece or a built-up shaper cutter, on a conventional hobbing machine 140 shown in detail in FIG. 4M, is illustrated and generally designated by the reference number 153". According to the second method 153", depicted in FIG. 4N, the longitudinally curved teeth 155" of the face gear blank 156", having the active surfaces 157" and 158" of convex and respectively, concave nature are machined in a continuous generating process using a tangential in-feed movement of the face gear blank as envelopes to the family of cutting edges of the teeth 159" of rotary shaper cutter 160". Through its aperture journal 161" the face gear blank body 156" is placed and secured on the cutting head 145 spindle, rotatable around the axis B4 of the hobbing machine, in the position of generic cutting tool 146, shown in FIG. 4. The shaper cutter body 160" is placed and secured through its bore journal 162" on supporting spindle 148, rotatable around the axis C4 of the hobbing machine, in the position of the generic cutting tool 149, shown also in FIG. 4. In final machining position, as illustrated in FIGS. 4N through 4P, the axes 163" and 164" of the face gear blank 156" and shaper cutter body 160", respectively, are considered positioned in space, orthogonally offset relative to each other, at the gear drive given center distance CD, while the tool teeth pitch line t"-t" from its rake surface 165" is positioned tangent to the face gear blank circle of radius (rb−p), where rb is the face gear base circle radius and p is the amount of involute modification. In start machining position, although the tool still has its teeth pitch line t"-t" positioned tangent to the face gear blank cylinder of radius (rb−p), the tool is not in engagement with the face gear blank. The teeth 159" of the shaper cutter have the rake surface 165" in form of a plane or a conical surface at a certain rake angle, whose value could be positive, negative, or even equal to zero, with respect to the perpendicular plan to the shaper cutter axis 164'. As illustrated in FIG. 4Q, the tool teeth generating rack 166" of constant pitch $p_x$ can be of symmetrical type, case in which both sides of rack cutter tooth profile have the same profile angles $\alpha_L = \alpha_R = \alpha$. If the two sides of the rack cutter tooth profile have different profile angles $\alpha_L$ and $\alpha_R$, on the left and right side, respectively, the tool teeth generating rack 167" of constant pitch $p_x$ is considered of asymmetrical type, as shown in FIG. 4R. When machining the face gear teeth, longitudinally curved in form of an extended involute curve 168", according to the second method 153" using a tangential in-feed movement, both axes of rotation are being set up orthogonally offset in space relative to each other at a predetermined depth of face gear teeth to be cut such that the tool teeth pitch circle of radius rs from tool rake surface 165" is positioned tangent to the face gear blank cylinder of radius (rb−p). During timed synchronized rotation of face gear blank around its axis of rotation 163" with np rotations per minute with shaper cutter rotation tool around its axis of rotation 164" with ns rotations per minute the face gear blank 156" travels tangentially in the direction of common perpendicular to their axes with a continuous in-feed rate $s_t$, defined as mm of tangential travel of the tool per one rotation of the face gear blank. In this case a proper timed relationship between the tangential in-feed rate $s_t$ and the rotation of the face hob is required. Outside of the continuously tangential in-feed period of time that allows a certain amount of material stock to be removed, discretely protrusion in-feed motions $s_p$ are necessary to set up the tool progressively from outside of the face gear blank 156" to the full depth of the face gear teeth 155", in the direction parallel to its axis of rotation 163".

FIG. 5 shows a schematic diagram of a conventional hobbing machine 210, suitable for generating of longitudinally curved teeth of face gears according to the present invention. It has a base 211 comprised of a table bottom part and a stand bottom part on which a radial carriage 112 is sliding in direction X5. The radial carriage 212 carries a vertical slide 213, which is movable in direction Z5. An angularly adjustable table 214, which is pivotable around its axis of rotation A5 is situated on the vertical slide 213, and carries a cutting head 215, displaceable in direction Y5. The cutting head 215 slidable in ways formed in the top of table 214, only for initial set up though, incorporates a rotatable tool spindle that carries a generic conical hob tool 216, with a corresponding drive with which the tool is rotatable about the axis B5. The base 211 table bottom part carries a table 217, rotatable about the axis C5, on which the supporting spindle 218, of the generic face gear blank 219 is fixed. The base 211 table bottom part carries also a column 220 fixed thereto having a vertically adjustable arm 221 thereon supporting a member 222 which provides an outboard support for the face gear blank supporting spindle 218. The axis of the member 222 is accurately coaxially aligned with the axis C5 of the rotatable table 217.

With reference to FIGS. 5A through 5H, a third method of generating the teeth of face gears according to the present invention, longitudinally curved in form of a shortened involute curve of the face gear circle of radius rb, utilizing a one-piece or a built-up rotating conical hob, of modified shortened involute type, on a conventional hobbing machine 210 shown in FIG. 5, is illustrated and generally designated by the reference number 223' in FIG. 5B which is a detailed perspective view captured from FIG. 5A. According to this method 223', longitudinally curved teeth 224' on face gear blank 225', having the active surfaces 226' and 227' of convex and concave nature, respectively, are machined in a continuous generating process along their entire lengths, using a radial in-feed movement, as envelopes to the family of cutting edges of the teeth 228' of an one-piece or a built-up conical hob 229' (in this embodiment only a one-piece end-type conical hob is shown), mounted in the cutting head 215 spindle, rotatable around its axis B5. The axis B5 of conical hob 229' intersects the face gear blank 225' pitch plane at an angle preferably 30°. As depicted in FIGS. 5C and 5D the conical hob tool 229' consists of a truncated conical body 230', which is provided with a plurality of corresponding teeth 228' arranged in a continuous circumferentially thread or threads along a conical helix 231' of apex K' and constant lead $p_x$. In its plan development the conical pitch helix becomes an Archimedean spiral, whom polar subnormal will be selected to coincide with the amount p of involute modification of a shortened involute curve of the face gear circle of radius rb, chosen as the longitudinally shape of the face gear teeth to be cut. The hob cutting edges are formed by longitudinally gashing the thread with a number of equally spaced straight flutes 232' and by reliving the remaining portions of the thread, e.g. the top clearance surface as well as the concave and convex clearance side surfaces, respectively. Positioning the hob 229' such that its pitch cone generatrix t'-t' is tangent to the face gear teeth circle of radius (rb+p), within face gear blank pitch plane P', it can be demonstrated that the face gear tooth space longitudinally curve 233', in form of a shortened involute is tangent to the hob Archimedean spiral 234', along the line t'-t' that defines the projection of hob axis on face gear pitch plane P'. The rack generating elements 235' of constant pitch $p_x$ can be of symmetrical type, case in which both sides of the tooth profile of the conical hob axial rack have the same profile angles $\alpha_L = \alpha_R = \alpha$, as shown in FIG. 5G. If the two sides of the conical hob axial rack have different profile angles $\alpha_L$ and $\alpha_R$, on the left and right side, respectively, the face hob auxiliary generating rack 236' of constant pitch $p_x$ is considered of asymmetrical type being depicted in FIG. 5H. The double involute pinion teeth are machined in one continuous operation, both flanks being cut simultaneously and along their entire length. At start or initial manufacturing position, the machine axis B5 and implicitly the conical hob axis is inclined under an angle equal to half of tool pitch cone angle, preferably 30° relative to face gear blank pitch plane P', such that the projection of this axis on face gear blank pitch plane is tangent to the face gear blank circle of radius (rb+p), though the tool teeth are adjacent but not in contact with the face gear blank yet. When generating the face gear teeth according to the third method 223', using a radial in-feed movement, the conical hob rotates about axis of rotation B5 with $n_h$ rotations per minute, while the face gear blank rotates about the axis C5 with $n_p$ rotations per minute, the two rotations being timed correlated. During the timed synchronized rotation of both conical hob and face gear blank, respectively, the conical hob is fed toward the face gear blank with a $s_r$ in-feed rate in a direction parallel to the axis of rotation of face gear blank, until the tool pitch cone generatrix become tangent to the face gear blank pitch plane. Thus, face gear teeth of constant height and circular pitch, curved in form of a shortened involute of the face gear circle of radius rb, are generated on their entire length.

With reference to FIGS. 5I through 5P, a third method of generating the teeth of face gears according to the present invention, longitudinally curved in form of an extended involute curve of the face gear circle of radius rb, utilizing a one-piece or a built-up rotating conical hob, of modified extended involute type, on a conventional hobbing machine 210 shown in FIG. 5, is illustrated and generally designated by the reference number 223" in FIG. 5B which is a detailed perspective view captured from FIG. 5A. According to this method 223", longitudinally curved teeth 224" on face gear blank 225", having the active surfaces 226" and 227" of convex and concave nature, respectively, are machined in a continuous generating process along their entire lengths, using a radial in-feed movement, as envelopes to the family of cutting edges of the teeth 228" of an one-piece or a built-up conical hob 229" (in this embodiment only a one-piece end-type conical hob is shown), mounted in the cutting head 215 spindle, rotatable around its axis B5. The axis B5 of conical hob 229" intersects the face gear blank 225" pitch plane at an angle preferably 30°. As depicted in FIGS. 5K and 5L the conical hob tool 229" consists of a truncated conical body 230", which is provided with a plurality of corresponding teeth 228" arranged in a continuous circumferentially thread or threads along a conical helix 231" of apex K" and constant lead $p_x$. In its plan development the conical pitch helix becomes an Archimedean spiral, whom polar subnormal will be selected to coincide with the amount p of involute modification of an extended involute curve of the face gear circle of radius rb, chosen as the longitudinally shape of the face gear teeth to be cut. The hob cutting edges are formed by longitudinally gashing the thread with a number of equally spaced straight flutes 232" and by reliving the remaining portions of the thread, e.g. the top clearance surface, as well as, the concave and convex clearance side surfaces, respectively. Positioning the hob 229" such that its pitch cone generatrix t"-t" is tangent to the face gear teeth circle of radius (rb−p), within face gear blank pitch plane P'", it can be demonstrated that the face gear tooth space longitudinally curve 233", in form of an extended involute is tangent to the hob Archimedean spiral 234", along the line t"-t" that defines the projection of hob axis on face gear pitch plane P'". The rack generating elements 235" of constant pitch $p_x$ can be of symmetrical type, case in which both sides of the tooth profile of the conical hob axial rack have the same profile angles $\alpha_L = \alpha_R = \alpha$, as shown in FIG. 5O. If the two sides of the conical hob axial rack have different profile angles $\alpha_L$ and $\alpha_R$, on the left and right side, respectively, the face hob auxiliary generating rack 236" of constant pitch $p_x$ is considered of asymmetrical type being depicted in FIG. 5P. The double involute pinion teeth are machined in one continuous operation, both flanks being cut simultaneously and along their entire length. At start or initial manufacturing position, the machine axis B5 and implicitly the conical hob axis is inclined under an angle equal to half of tool pitch cone angle, preferably 30° relative to face gear blank pitch plane P'", such that the projection of this axis on face gear blank pitch plane is tangent to the face gear blank circle of radius (rb−p), though the tool teeth are adjacent but not in contact with the face gear blank yet. When generating the face gear teeth according to the third method 223", using a radial in-feed movement, the conical hob rotates about axis of rotation B5 with $n_h$ rotations per minute, while the face gear blank rotates about the axis C5 with $n_p$ rotations per minute, the two rotations being timed correlated. During the timed synchronized rotation of both conical hob and face gear blank, respectively, the conical hob is fed toward the face gear blank with a $s_r$ in-feed rate in a direction parallel to the axis of rotation of face gear blank, until the tool pitch cone generatrix become tangent to the face gear blank pitch plane. Thus, face gear teeth of constant height and circular pitch, curved in form of an extended involute of the face gear circle of radius rb, are generated on their entire length.

FIG. 6 shows a schematic diagram of a 6-axis CNC hobbing machine 260, suitable for generating of longitudinally curved teeth of double involute pinions according to the present invention. It has a base 261, comprised of a table bottom part and two stand bottom parts on which a radial column carriage 262 is sliding in direction X6 and a tangential column carriage 263 is sliding in direction Y6. The radial column carriage 262 carries a vertical slide 264, which is movable in direction Z6. An angularly adjustable table 265, which is pivotable around its axis of rotation A6 is situated on the vertical slide 264, and carries a cutting head 266 that can swivel around axis of rotation A6. The cutting head 266, which is tangentially slidable in ways formed in the top of table 265, only for initial set up though, incorporates a rotatable tool spindle that carries a generic conical hob tool 267, with a corresponding drive with which the tool is rotatable about the axis B6. The tangential column carriage 263 carries a table 268, rotatable about the axis C6, on which the supporting spindle 269, of the generic face gear blank 270 is fixed. The tangential column carriage 263 has also a vertically adjustable arm 271 thereon supporting a member 272 which provides an outboard support for the work supporting spindle 269. The axis of the member 272 is accurately coaxially aligned with the axis C6 of the rotatable table 268.

With reference to FIGS. 6A through 5H, a third method of generating the teeth of face gears according to the present invention, longitudinally curved in form of a shortened involute curve of the face gear circle of radius rb, utilizing a one-piece or a built-up rotating conical hob, of modified shortened involute type, on a 6-axis CNC machine 260 shown in FIG. 6, is illustrated and generally designated by the reference number 273' in FIG. 6B which is a detailed perspective view captured from FIG. 6A. According to this method 273', longitudinally curved teeth 274' on face gear blank 275', having the active surfaces 276' and 277' of convex and concave nature, respectively, are machined in a continuous generating process along their entire lengths, using a tangential in-feed movement, as envelopes to the family of cutting edges of the teeth 278' of an one-piece or a built-up conical hob 279' (in this embodiment only a one-piece end-type conical hob is shown), mounted in the cutting head 265 spindle, rotatable around its axis B6. The axis B6 of conical hob 279' intersects the face gear blank 275' pitch plane at an angle preferably 30°. As depicted in FIGS. 6C and 6D the conical hob tool 279' consists of a truncated conical body 280', which is provided with a plurality of corresponding teeth 278' arranged in a continuous circumferentially thread or threads along a conical helix 281' of apex K' and constant lead $p_x$. In its plan development the conical pitch helix becomes an Archimedean spiral, whom polar subnormal will be selected to coincide with the amount p of involute modification of a shortened involute curve of the face gear circle of radius rb, chosen as the longitudinally shape of the face gear teeth to be cut. The hob cutting edges are formed by longitudinally gashing the thread with a number of equally spaced straight flutes 282' and by reliving the remaining portions of the thread, e.g. the top clearance surface as well as the concave and convex clearance side surfaces, respectively. Positioning the hob 279' such that its pitch cone generatrix t'-t' is tangent to the face gear teeth circle of radius (rb+p), within face gear blank pitch plane P', it can be demonstrated that the face gear tooth space longitudinally curve 283', in form of a shortened involute is tangent to the hob Archimedean spiral 284', along the line t'-t' that defines the projection of hob axis on face gear pitch plane P'. The rack generating elements 285' of constant pitch $p_x$ can be of symmetrical type, case in which both sides of the tooth profile of the conical hob axial rack have the same profile angles $\alpha_L = \alpha_R = \alpha$, as shown in FIG. 6G. If the two sides of the conical hob axial rack have different profile angles $\alpha_L$ and $\alpha_R$, on the left and right side, respectively, the face hob auxiliary generating rack 286' of constant pitch $p_x$ is considered of asymmetrical type being depicted in FIG. 6H. The double involute pinion teeth are machined in one continuous operation, both flanks being cut simultaneously and along their entire length. At start or initial machining position, the machine axis B5 and implicitly the conical hob axis is inclined under an angle equal to half of tool pitch cone angle, preferably 30° relative to face gear blank pitch plane P', such that the projection of this axis on face gear blank pitch plane is tangent to the face gear blank circle of radius (rb+p), though the tool teeth are adjacent but not in contact with the face gear blank yet. When generating the face gear teeth according to the third method 273', using a tangential in-feed movement, the conical hob rotates about axis of rotation B6 with $n_h$ rotations per minute, while the face gear blank rotates about the axis C6 with $n_p$ rotations per minute, the two rotations being timed correlated. During the timed synchronized rotation of both conical hob and face gear blank, respectively, the face gear blank is fed toward and in generating engagement with the conical hob with a $s_t$ in-feed rate in a direction parallel to the conical hob generatrix tangent to the face gear circle of radius (rb+p) from its pitch plane. Thus, the conical hob tool, generates the teeth on one face side of the face gear blank, of certain depth, multiple continuously tangential in-feed paths followed by protrusion in-feeds outside of continuously tangential in-feeds being necessary to generate the teeth of face gear of full depth, constant height and circular pitch, of symmetrical or asymmetrical type and, curved in their longitudinal direction in form of a shortened involute curve of the face gear circle of radius rb, With reference to FIGS. 6I through 6P, a third method of generating the teeth of face gears according to the present invention, longitudinally curved in form of anextended involute curve of the face gear circle of radius rb, utilizing a one-piece or a built-up rotating conical hob, of modified extended involute type, on a 6-axis CNC machine 260 shown in FIG. 6, is illustrated and generally designated by the reference number 273" in FIG. 6J which is a detailed perspective view captured from FIG. 6I. According to this method 273", longitudinally curved teeth 274" on face gear blank 275", having the active surfaces 276" and 277" of convex and concave nature, respectively, are machined in a continuous generating process along their entire lengths, using a tangential in-feed movement, as envelopes to the family of cutting edges of the teeth 278" of an one-piece or a built-up conical hob 279" (in this embodiment only a one-piece end-type conical hob is shown), mounted in the cutting head 265 spindle, rotatable around its axis B6. The axis B6 of conical hob 279" intersects the face gear blank 275" pitch plane at an angle preferably 30°. As depicted in FIGS. 6K and 6L the conical hob tool 279" consists of a truncated conical body 280", which is provided with a plurality of corresponding teeth 278" arranged in a continuous circumferentially thread or threads along a conical helix 281" of apex K" and constant lead $p_x$. In its plan development the conical pitch helix becomes an Archimedean spiral, whom polar subnormal will be selected to coincide with the amount p of involute modification of an extended involute curve of the face gear circle of radius rb, chosen as the longitudinally shape of the face gear teeth to be cut. The hob teeth cutting edges are formed by longitudinally gashing the thread with a number of equally spaced straight flutes 282" and by reliving the remaining portions of the thread, e.g. the top clearance surface, as well as, the concave and convex clearance side surfaces, respectively. Positioning the hob 279" such that its pitch cone generatrix t"-t" is tangent to the face gear teeth circle of radius (rb−p), within face gear blank pitch plane P", it can be demonstrated that the face gear tooth space longitudinally curve 283", in form of an extended involute is tangent to the hob Archimedean spiral 284", along the line t"-t" that defines the projection of hob axis on face gear pitch plane P". The rack generating elements 285" of constant pitch $p_x$ can be of symmetrical type, case in which both sides of the tooth profile of the conical hob axial rack have the same profile angles $\alpha_L = \alpha_R = \alpha$, as shown in FIG. 6O. If the two sides of the conical hob axial rack have different profile angles $\alpha_L$ and $\alpha_R$, on the left and right side, respectively, the face hob auxiliary generating rack 286" of constant pitch $p_x$ is considered of asymmetrical type being depicted in FIG. 6P. The double involute pinion teeth are machined in one continuous operation, both flanks being cut simultaneously and along their entire length. At start or initial manufacturing position, the machine axis B5 and implicitly the conical hob axis is inclined under an angle equal to half of tool pitch cone angle, preferably 30° relative to face gear blank pitch plane P", such that the projection of this axis on face gear blank pitch plane is tangent to the face gear blank circle of radius (rb−p), though the tool teeth are adjacent but not in contact with the face gear blank yet. When generating the face gear teeth according to the third method 273", using a tangential in-feed movement, the conical hob rotates about axis of rotation B6 with $n_h$ rotations per minute, while the face gear blank rotates about the axis C6 with $n_p$ rotations per minute, the two rotations being timed correlated. During the timed synchronized rotation of both conical hob and face gear blank, respectively, the face gear blank is fed toward and in generating engagement with the conical hob with a $s_t$ in-feed rate in a direction parallel to the conical hob generatrix tangent to the face gear circle of radius (rb−p) from its pitch plane. Thus, the conical hob tool, generates the teeth on one face side of the face gear blank, of certain depth, multiple continuously tangential in-feed paths followed by protrusion in-feeds outside of continuously tangential in-feeds being necessary to generate the teeth of face gear of full depth, constant height and circular pitch, of symmetrical or asymmetrical type and, curved in their longitudinal direction in form of an extended involute curve of said face gear base circle.

What is claimed is:

1. A method of generating teeth of a double involute pinion on a conventional hobbing machine that mesh with face gear teeth of a double involute pinion-face gear drive system, comprising the steps of:
   providing a double involute pinion blank, of cylindrical shape, having a blank face width center plane and a blank axis perpendicular to said blank face width center plane, that rotates continuously about said blank axis,
   providing a face hob tool having a tool axis and a tool pitch plane perpendicular to said tool axis within which a tool base circle identical to the teeth base circle of radius rb of said face gear is defined, including a plurality of equi-spaced rack cutters, with cutting teeth of symmetrical or asymmetrical type projecting from one plane face of said face hob tool body in a direction of said tool axis and arranged such that lines of intersection between said tool pitch plane and rake surfaces of said cutting teeth are tangent to a tool circle concentric to said tool base circle,
   positioning said face hob tool offset from and perpendicular to said blank axis at a predetermined center distance of said double involute pinion-face gear drive system, such that a teeth width middle section plane of said double involute pinion blank is tangent to said tool base circle and, at a start machining position, said face hob tool is adjacent but not in generating engagement with said double involute pinion blank,
   rotating said face hob tool continuously about said tool axis in timed relation with said continuous rotation of said double involute pinion blank about said blank axis, while simultaneously and continuously radially feeding said face hob tool toward an outer peripheral cylindrical surface of said double involute pinion blank along the direction of said tool axis and into generating engagement with said double involute pinion blank,
   whereby said face hob tool, of modified involute type, is specifically designed such that a concentric circle of said face hob tool has its radius equal to either (rb+p) or (rb−p) where p is the amount of involute modification of said face gear teeth, generates double involute external teeth of constant height and circular pitch, of symmetrical or asymmetrical type, on an outer cylindrical surface of said double involute pinion blank, shaped in form of a normal involute in their profile direction and curved in their longitudinal direction in form of an either shortened or an extended involute curve of said face gear base circle, respectively.

2. The method of generating a double involute pinion of claim 1 wherein said face hob tool, of normal involute type, having said cutting teeth of symmetrical type, is specifically designed such that said concentric circle of said face hob tool has its radius equal to face gear circle radius rb, generates double involute teeth of symmetrical type on said double involute pinion blank, shaped in form of a normal involute in a profile direction and curved in a longitudinal direction in form of a normal involute curve of said face gear base circle.

3. The method of generating a double involute pinion of claim 1 wherein said face hob tool, of normal involute type, having said cutting teeth of asymmetrical type, is specifically designed such that said face hob tool concentric circle has its radius equal to face gear circle radius rb, generates double involute teeth of asymmetrical type on said double involute pinion blank, shaped in a form of a normal involute in a profile direction and curved in a longitudinal direction in form of a normal involute curve of said face gear base circle.

4. A method of generating teeth with a hobbing machine on a double involute pinion that mesh with face gear teeth of a double involute pinion-face gear drive system, comprising the steps of:
   providing a double involute cylindrical pinion blank having an outer surface, a blank face width center plane and a blank axis perpendicular to said blank face width center plane,
   rotating said double involute cylindrical pinion blank continuously about said blank axis,
   providing a face hob tool having a tool axis and a tool pitch plane perpendicular to said tool axis within which a tool base circle identical to a teeth base circle of radius rb of said face gear is defined, including a plurality of equally spaced rack cutters, with cutting teeth of symmetrical or asymmetrical type projecting from one plane face of said face hob tool in a direction of said tool axis and arranged such that lines of intersection between said tool pitch plane and rake surfaces of said cutting teeth are tangent to a tool circle concentric to said tool base circle,
   positioning said face hob tool offset from and perpendicular to said blank axis at a predetermined center distance of said double involute pinion-face gear drive system, such that a teeth width middle section plane of said double involute pinion blank is tangent to said tool base circle and, at an initial machining position, said face hob tool is adjacent but not in engagement with said double involute pinion blank,
   rotating said face hob tool continuously about said tool axis in timed relation with said continuous rotation of said double involute pinion blank while simultaneously and continuously radially feeding said face hob tool toward said outer surface of said double involute pinion blank along the direction of said tool axis and into engagement with said double involute pinion blank,
   whereby said face hob tool is configured so that a concentric circle of said face hob tool has its radius equal to either (rb+p) or (rb−p) where p is the amount of involute modification of said face gear teeth which generates double involute external teeth of constant height and circular pitch on said outer surface of said double involute pinion blank which are shaped in a normal involute in a profile direction and curved in a longitudinal direction.

5. The method of generating a double involute pinion of claim 4 wherein said face hob tool is of normal involute type and has cutting teeth of symmetrical type which are configured so that said concentric circle of said face hob tool has its radius equal to face gear circle radius rb, generates double involute teeth of symmetrical type on said double involute pinion blank, are shaped in a normal involute in a profile direction and curved in a longitudinal direction.

6. The method of generating a double involute pinion of claim 4 wherein said face hob tool of normal involute type has cutting teeth of asymmetrical type, configured such that said face hob tool concentric circle has its radius equal to face gear circle radius rb, generates double involute teeth of asymmetrical type on said double involute pinion blank, shaped in a normal involute in their profile direction and curved in a longitudinal direction.

7. A method of generating teeth with a hobbing machine on a double involute pinion that mesh with face gear teeth of a double involute pinion-face gear drive system, comprising the steps of:

providing a double involute cylindrical pinion blank having an outer surface, a blank face width center plane and a blank axis perpendicular to said blank face width center plane, rotating said double involute cylindrical pinion blank continuously about said blank axis, providing a face hob tool having a tool axis and a tool pitch plane perpendicular to said tool axis within which a tool base circle identical to a teeth base circle of radius rb of said face gear is defined, including a plurality of equally spaced rack cutters, with cutting teeth projecting from one plane face of said face hob tool in a direction of said tool axis and arranged such that lines of intersection between said tool pitch plane and rake surfaces of said cutting teeth are tangent to a tool circle concentric to said tool base circle, positioning said face hob tool offset from and perpendicular to said blank axis at a predetermined center distance of said double involute pinion-face gear drive system, such that a teeth width middle section plane of said double involute pinion blank is tangent to said tool base circle and, at an initial machining position, said face hob tool is adjacent but not in engagement with said double involute pinion blank, rotating said face hob tool continuously about said tool axis in timed relation with said continuous rotation of said double involute pinion blank while simultaneously and continuously radially feeding said face hob tool toward said outer surface of said double involute pinion blank along the direction of said tool axis and into engagement with said double involute pinion blank, whereby said face hob tool is configured so that a concentric circle of said face hob tool has its radius equal to either (rb+p) or (rb−p) where p is the amount of involute modification of said face gear teeth which generates double involute external teeth of constant height and circular pitch on said outer surface of said double involute pinion blank which are shaped in a normal involute in a profile direction and curved in a longitudinal direction.

8. The method of generating a double involute pinion of claim 7 wherein said face hob tool is of normal involute type and has cutting teeth of symmetrical type which are configured so that said concentric circle of said face hob tool has its radius equal to face gear circle radius rb, generates double involute teeth of symmetrical type on said double involute pinion blank, are shaped in a normal involute in a profile direction and curved in a longitudinal direction.

9. The method of generating a double involute pinion of claim 7 wherein said face hob tool of normal involute type has cutting teeth of asymmetrical type, configured such that said face hob tool concentric circle has its radius equal to face gear circle radius rb, generates double involute teeth of asymmetrical type on said double involute pinion blank, shaped in a normal involute in their profile direction and curved in a longitudinal direction.

* * * * *